US012584394B2

(12) United States Patent
Yeung et al.

(10) Patent No.: US 12,584,394 B2
(45) Date of Patent: Mar. 24, 2026

(54) SYSTEMS AND METHODS TO OPERATE A DUAL-SHAFT GAS TURBINE ENGINE FOR HYDRAULIC FRACTURING

(71) Applicant: BJ Energy Solutions, LLC, The Woodlands, TX (US)

(72) Inventors: Tony Yeung, The Woodlands, TX (US); Ricardo Rodriguez-Ramon, The Woodlands, TX (US); Diankui Fu, The Woodlands, TX (US); Warren Zemlak, The Woodlands, TX (US); Caleb Barclay, The Woodlands, TX (US)

(73) Assignee: BJ Energy Solutions, LLC, The Woodlands, TX (US)

( * ) Notice: Subject to any disclaimer, the term of this patent is extended or adjusted under 35 U.S.C. 154(b) by 0 days.

(21) Appl. No.: 18/402,518

(22) Filed: Jan. 2, 2024

(65) Prior Publication Data

US 2024/0133282 A1      Apr. 25, 2024

Related U.S. Application Data

(63) Continuation of application No. 18/138,319, filed on Apr. 24, 2023, now Pat. No. 11,898,429, which is a
(Continued)

(51) Int. Cl.
E21B 43/26        (2006.01)
F02C 3/10        (2006.01)
(Continued)

(52) U.S. Cl.
CPC ............ E21B 43/2607 (2020.05); F02C 3/10 (2013.01); F02C 7/268 (2013.01); F02C 7/32 (2013.01);
(Continued)

(58) Field of Classification Search
CPC ........ F04B 17/05; F04B 49/103; F04B 49/20; F04B 49/08; F02C 7/36; F02C 7/268;
(Continued)

(56) References Cited

U.S. PATENT DOCUMENTS 1,716,049 A      6/1929      Greve
1,726,633 A      9/1929      Smith
(Continued)

FOREIGN PATENT DOCUMENTS

AU        9609498 A      7/1999
AU        737970 B2      9/2001
(Continued)

OTHER PUBLICATIONS

US 11,459,865 B2, 10/2022, Cui et al. (withdrawn)
(Continued)

*Primary Examiner* — Christopher S Bobish
(74) *Attorney, Agent, or Firm* — Norton Rose Fulbright US LLP

(57)        ABSTRACT

Systems and methods to pump fracturing fluid into a wellhead may include a gas turbine engine including a compressor turbine shaft connected to a compressor, and a power turbine output shaft connected to a power turbine. The compressor turbine shaft and the power turbine output shaft may be rotatable at different rotational speeds. The systems may also include a transmission including a transmission input shaft connected to the power turbine output shaft and a transmission output shaft connected to a hydraulic fracturing pump. The systems may also include a fracturing unit controller configured to control one or more of the rotational speeds of the compressor turbine shaft, the power turbine output shaft, or the transmission output shaft based at least in part on target signals and fluid flow signals indicative of
(Continued)

one or more of pressure or flow rate associated with fracturing fluid pumped into the wellhead.

20 Claims, 8 Drawing Sheets

Related U.S. Application Data continuation of application No. 18/064,699, filed on Dec. 12, 2022, now Pat. No. 11,732,565, which is a continuation of application No. 17/684,613, filed on Mar. 2, 2022, now Pat. No. 11,639,655, which is a continuation of application No. 17/396,914, filed on Aug. 9, 2021, now Pat. No. 11,572,774, which is a continuation of application No. 17/173,475, filed on Feb. 11, 2021, now Pat. No. 11,125,066.

(60) Provisional application No. 62/705,334, filed on Jun. 22, 2020.

(51) Int. Cl.

| | |
|---|---|
| *F02C 7/268* | (2006.01) |
| *F02C 7/32* | (2006.01) |
| *F02C 7/36* | (2006.01) |
| *F02C 9/20* | (2006.01) |
| *F04B 17/05* | (2006.01) |
| *F04B 49/08* | (2006.01) |
| *F04B 49/10* | (2006.01) |
| *F04B 49/20* | (2006.01) |

(52) U.S. Cl.
CPC .................. *F02C 7/36* (2013.01); *F02C 9/20* (2013.01); *F04B 17/05* (2013.01); *F04B 49/08* (2013.01); *F04B 49/103* (2013.01); *F04B 49/20* (2013.01)

(58) Field of Classification Search
CPC ...... F02C 7/32; F02C 3/10; F02C 9/20; E21B 43/2607
See application file for complete search history.

(56) References Cited

U.S. PATENT DOCUMENTS

| | | | |
|---|---|---|---|
| 2,178,662 A | | 11/1939 | Lars et al. |
| 2,427,638 A | | 9/1947 | Vilter et al. |
| 2,498,229 A | | 2/1950 | Adler |
| 2,535,703 A | | 12/1950 | Smith et al. |
| 2,572,711 A | | 10/1951 | Fischer, V |
| 2,820,341 A | | 1/1958 | Amann |
| 2,868,004 A | | 1/1959 | Runde |
| 2,940,377 A | | 6/1960 | Darnell et al. |
| 2,947,141 A | | 8/1960 | Russ |
| 2,956,738 A | | 10/1960 | Af et al. |
| 3,068,796 A | | 12/1962 | Pfluger et al. |
| 3,191,517 A | | 6/1965 | Solzman, I |
| 3,257,031 A | | 6/1966 | Dietz |
| 3,274,768 A | | 9/1966 | Hans-Christof et al. |
| 3,378,074 A | | 4/1968 | Kiel |
| 3,382,671 A | | 5/1968 | Ehni, III et al. |
| 3,401,873 A | | 9/1968 | Privon et al. |
| 3,463,612 A | | 8/1969 | Whitsel, Jr. et al. |
| 3,496,880 A | | 2/1970 | Wolff et al. |
| 3,521,446 A | * | 7/1970 | Maljanian ................. F02K 1/16 60/791 |
| 3,529,419 A | * | 9/1970 | Reed ......................... F02C 9/22 477/30 |
| 3,550,696 A | | 12/1970 | Kenneday et al. |
| 3,560,053 A | | 2/1971 | Ortloff et al. |
| 3,586,459 A | * | 6/1971 | Zerlauth ................... F02C 7/20 415/60 |

| | | | |
|---|---|---|---|
| 3,632,222 A | * | 1/1972 | Cronstedt ................. F02C 7/36 416/500 |
| 3,656,582 A | | 4/1972 | Alcock et al. |
| 3,667,868 A | | 6/1972 | Brunner et al. |
| 3,692,434 A | | 9/1972 | Schnear et al. |
| 3,739,872 A | | 6/1973 | Mc et al. |
| 3,757,581 A | | 9/1973 | Mankin et al. |
| 3,759,063 A | | 9/1973 | Bendall et al. |
| 3,765,173 A | | 10/1973 | Harris et al. |
| 3,771,916 A | | 11/1973 | Flanigan et al. |
| 3,773,438 A | | 11/1973 | Hall et al. |
| 3,781,135 A | | 12/1973 | Nickell et al. |
| 3,786,835 A | | 1/1974 | Finger et al. |
| 3,791,682 A | | 2/1974 | Mitchell et al. |
| 3,796,045 A | | 3/1974 | Foster et al. |
| 3,814,537 A | * | 6/1974 | Stoltman ................... F02C 9/22 415/36 |
| 3,814,549 A | * | 6/1974 | Cronstedt ................. F02C 7/36 417/406 |
| 3,820,922 A | | 6/1974 | Buse et al. |
| 3,847,511 A | | 11/1974 | Cole et al. |
| 3,858,390 A | * | 1/1975 | Jansen ...................... F02C 9/22 60/39.17 |
| 3,866,108 A | | 2/1975 | Yannone et al. |
| 3,875,380 A | | 4/1975 | Rankin |
| 3,952,502 A | * | 4/1976 | Davis ........................ F02C 9/28 60/39.17 |
| 3,963,372 A | | 6/1976 | McLain et al. |
| 4,010,613 A | | 3/1977 | McInerney |
| 4,019,477 A | | 4/1977 | Overton |
| 4,031,407 A | | 6/1977 | Reed |
| 4,050,862 A | | 9/1977 | Buse |
| 4,059,045 A | | 11/1977 | McClain |
| 4,086,976 A | | 5/1978 | Holm et al. |
| 4,117,342 A | | 9/1978 | Melley, Jr. et al. |
| 4,173,121 A | | 11/1979 | Yu |
| 4,204,808 A | | 5/1980 | Clayton et al. |
| 4,209,079 A | | 6/1980 | Deschamps et al. |
| 4,209,979 A | | 7/1980 | Mattson et al. |
| 4,222,229 A | | 9/1980 | Uram |
| 4,239,396 A | | 12/1980 | Arribau et al. |
| 4,269,027 A | * | 5/1981 | Mattson ................... F02C 6/20 477/181 |
| 4,269,569 A | | 5/1981 | Hoover |
| 4,311,395 A | | 1/1982 | Douthitt et al. |
| 4,330,237 A | | 5/1982 | Battah |
| 4,341,508 A | | 7/1982 | Rambin, Jr. et al. |
| 4,357,027 A | | 11/1982 | Zeitlow |
| 4,383,478 A | | 5/1983 | Jones et al. |
| 4,402,504 A | | 9/1983 | Christian |
| 4,430,047 A | | 2/1984 | Ilg |
| 4,442,665 A | | 4/1984 | Fick et al. |
| 4,457,325 A | | 7/1984 | Green |
| 4,470,771 A | | 9/1984 | Hall et al. |
| 4,483,684 A | | 11/1984 | Black |
| 4,505,650 A | | 3/1985 | Hannett et al. |
| 4,574,880 A | | 3/1986 | Handke |
| 4,584,654 A | | 4/1986 | Crane |
| 4,620,330 A | | 11/1986 | Izzi, Sr. |
| 4,672,813 A | | 6/1987 | David |
| 4,754,607 A | | 7/1988 | Mackay |
| 4,782,244 A | | 11/1988 | Wakimoto |
| 4,796,777 A | | 1/1989 | Keller |
| 4,869,209 A | | 9/1989 | Young |
| 4,913,625 A | | 4/1990 | Gerlowski |
| 4,983,259 A | | 1/1991 | Duncan et al. |
| 4,990,058 A | | 2/1991 | Eslinger |
| 5,032,065 A | | 7/1991 | Yamamuro et al. |
| 5,135,361 A | | 8/1992 | Dion |
| 5,167,493 A | | 12/1992 | Kobari |
| 5,184,526 A | * | 2/1993 | Watanabe ........... B60W 10/101 477/31 |
| 5,245,970 A | | 9/1993 | Iwaszkiewicz et al. |
| 5,291,842 A | | 3/1994 | Sallstrom et al. |
| 5,326,231 A | | 7/1994 | Pandeya et al. |
| 5,362,219 A | | 11/1994 | Paul et al. |
| 5,511,956 A | | 4/1996 | Hasegawa et al. |
| 5,537,813 A | | 7/1996 | Davis et al. |
| 5,553,514 A | | 9/1996 | Walkowc |

(56)     References Cited

U.S. PATENT DOCUMENTS

| | | | |
|---|---|---|---|
| 5,560,195 A | 10/1996 | Anderson et al. | |
| 5,586,444 A | 12/1996 | Fung | |
| 5,622,245 A | 4/1997 | Reik et al. | |
| 5,626,103 A | 5/1997 | Haws et al. | |
| 5,634,777 A | 6/1997 | Albertin et al. | |
| 5,651,400 A | 7/1997 | Corts et al. | |
| 5,678,460 A | 10/1997 | Walkowc | |
| 5,717,172 A | 2/1998 | Griffin, Jr. et al. | |
| 5,720,598 A | 2/1998 | De | |
| 5,761,084 A | 6/1998 | Edwards | |
| 5,795,262 A * | 8/1998 | Robinson | B60W 30/18 |
| | | | 477/92 |
| 5,811,676 A | 9/1998 | Spalding et al. | |
| 5,839,888 A | 11/1998 | Harrison | |
| 5,846,062 A | 12/1998 | Yanagisawa et al. | |
| 5,875,744 A | 3/1999 | Vallejos | |
| 5,983,962 A | 11/1999 | Gerardot | |
| 5,992,944 A | 11/1999 | Hara | |
| 6,041,856 A | 3/2000 | Thrasher et al. | |
| 6,050,080 A | 4/2000 | Horner | |
| 6,067,962 A | 5/2000 | Bartley et al. | |
| 6,071,188 A | 6/2000 | O'Neill et al. | |
| 6,074,170 A | 6/2000 | Bert et al. | |
| 6,123,751 A | 9/2000 | Nelson et al. | |
| 6,129,335 A | 10/2000 | Yokogi | |
| 6,145,318 A | 11/2000 | Kaplan et al. | |
| 6,230,481 B1 | 5/2001 | Jahr | |
| 6,279,309 B1 | 8/2001 | Lawlor et al. | |
| 6,321,860 B1 | 11/2001 | Reddoch | |
| 6,334,746 B1 | 1/2002 | Nguyen et al. | |
| 6,401,472 B2 | 6/2002 | Pollrich et al. | |
| 6,530,224 B1 | 3/2003 | Conchieri | |
| 6,543,395 B2 | 4/2003 | Green | |
| 6,655,922 B1 | 12/2003 | Flek | |
| 6,669,453 B1 | 12/2003 | Breeden et al. | |
| 6,765,304 B2 | 7/2004 | Baten et al. | |
| 6,786,051 B2 | 9/2004 | Kristich et al. | |
| 6,832,900 B2 | 12/2004 | Leu | |
| 6,851,514 B2 | 2/2005 | Han et al. | |
| 6,859,740 B2 | 2/2005 | Stephenson et al. | |
| 6,901,735 B2 | 6/2005 | Lohn | |
| 6,962,057 B2 | 11/2005 | Kurokawa et al. | |
| 7,007,966 B2 | 3/2006 | Campion | |
| 7,047,747 B2 | 5/2006 | Tanaka | |
| 7,065,953 B1 | 6/2006 | Kopko | |
| 7,143,016 B1 | 11/2006 | Discenzo et al. | |
| 7,222,015 B2 | 5/2007 | Davis et al. | |
| 7,281,519 B2 | 10/2007 | Schroeder et al. | |
| 7,388,303 B2 | 6/2008 | Seiver | |
| 7,404,294 B2 | 7/2008 | Sundin | |
| 7,442,239 B2 | 10/2008 | Armstrong et al. | |
| 7,524,173 B2 | 4/2009 | Cummins | |
| 7,545,130 B2 | 6/2009 | Latham | |
| 7,552,903 B2 | 6/2009 | Dunn et al. | |
| 7,563,076 B2 | 7/2009 | Brunet et al. | |
| 7,563,413 B2 | 7/2009 | Naets et al. | |
| 7,574,325 B2 | 8/2009 | Dykstra | |
| 7,581,379 B2 | 9/2009 | Yoshida et al. | |
| 7,594,424 B2 | 9/2009 | Fazekas | |
| 7,614,239 B2 * | 11/2009 | Herzog | F01D 19/00 |
| | | | 60/778 |
| 7,627,416 B2 | 12/2009 | Batenburg et al. | |
| 7,677,316 B2 | 3/2010 | Butler et al. | |
| 7,721,521 B2 | 5/2010 | Kunkle et al. | |
| 7,730,711 B2 | 6/2010 | Kunkle et al. | |
| 7,779,961 B2 | 8/2010 | Matte | |
| 7,789,452 B2 | 9/2010 | Dempsey et al. | |
| 7,836,949 B2 | 11/2010 | Dykstra | |
| 7,841,394 B2 | 11/2010 | McNeel et al. | |
| 7,845,413 B2 | 12/2010 | Shampine et al. | |
| 7,861,679 B2 | 1/2011 | Lemke et al. | |
| 7,886,702 B2 | 2/2011 | Jerrell et al. | |
| 7,900,724 B2 | 3/2011 | Promersberger et al. | |
| 7,921,914 B2 | 4/2011 | Bruins et al. | |
| 7,938,151 B2 | 5/2011 | Hoeckner | |
| 7,955,056 B2 | 6/2011 | Pettersson | |
| 7,980,357 B2 | 7/2011 | Edwards | |
| 8,056,635 B2 | 11/2011 | Shampine et al. | |
| 8,083,504 B2 | 12/2011 | Williams et al. | |
| 8,099,942 B2 | 1/2012 | Alexander et al. | |
| 8,186,334 B2 | 5/2012 | Ooyama | |
| 8,196,555 B2 | 6/2012 | Ikeda et al. | |
| 8,202,354 B2 | 6/2012 | Iijima | |
| 8,316,936 B2 | 11/2012 | Roddy et al. | |
| 8,336,631 B2 | 12/2012 | Shampine et al. | |
| 8,388,317 B2 | 3/2013 | Sung | |
| 8,414,673 B2 | 4/2013 | Raje et al. | |
| 8,469,826 B2 * | 6/2013 | Brosowske | F16D 31/06 |
| | | | 464/27 |
| 8,500,215 B2 | 8/2013 | Gastauer et al. | |
| 8,506,267 B2 | 8/2013 | Gambier et al. | |
| 8,575,873 B2 | 11/2013 | Peterson et al. | |
| 8,616,005 B1 | 12/2013 | Cousino, Sr. | |
| 8,621,873 B2 | 1/2014 | Robertson et al. | |
| 8,641,399 B2 | 2/2014 | Mucibabic et al. | |
| 8,656,990 B2 | 2/2014 | Kajaria et al. | |
| 8,672,606 B2 | 3/2014 | Glynn et al. | |
| 8,707,853 B1 | 4/2014 | Dille et al. | |
| 8,708,667 B2 | 4/2014 | Collingborn | |
| 8,714,253 B2 | 5/2014 | Sherwood et al. | |
| 8,757,918 B2 | 6/2014 | Ramnarain et al. | |
| 8,763,583 B2 | 7/2014 | Hofbauer et al. | |
| 8,770,329 B2 | 7/2014 | Spitler | |
| 8,784,081 B1 | 7/2014 | Blume | |
| 8,789,601 B2 | 7/2014 | Broussard et al. | |
| 8,794,307 B2 | 8/2014 | Coquilleau et al. | |
| 8,801,394 B2 | 8/2014 | Anderson | |
| 8,851,186 B2 | 10/2014 | Shampine et al. | |
| 8,851,441 B2 | 10/2014 | Acuna et al. | |
| 8,894,356 B2 | 11/2014 | Lafontaine et al. | |
| 8,905,056 B2 | 12/2014 | Kendrick | |
| 8,951,019 B2 | 2/2015 | Hains et al. | |
| 8,973,560 B2 | 3/2015 | Krug | |
| 8,997,904 B2 | 4/2015 | Cryer et al. | |
| 9,011,111 B2 | 4/2015 | Lesko | |
| 9,016,383 B2 | 4/2015 | Shampine et al. | |
| 9,032,620 B2 | 5/2015 | Frassinelli et al. | |
| 9,057,247 B2 | 6/2015 | Kumar et al. | |
| 9,097,249 B2 | 8/2015 | Petersen | |
| 9,103,193 B2 | 8/2015 | Coli et al. | |
| 9,121,257 B2 | 9/2015 | Coli et al. | |
| 9,140,110 B2 | 9/2015 | Coli et al. | |
| 9,175,810 B2 | 11/2015 | Hains et al. | |
| 9,187,982 B2 | 11/2015 | Dehring et al. | |
| 9,206,667 B2 | 12/2015 | Khvoshchev et al. | |
| 9,212,643 B2 | 12/2015 | Deliyski | |
| 9,222,346 B1 | 12/2015 | Walls | |
| 9,324,049 B2 | 4/2016 | Thomeer et al. | |
| 9,341,055 B2 | 5/2016 | Weightman et al. | |
| 9,346,662 B2 | 5/2016 | Van Vliet et al. | |
| 9,366,114 B2 | 6/2016 | Coli et al. | |
| 9,376,786 B2 | 6/2016 | Numasawa | |
| 9,394,829 B2 | 7/2016 | Cabeen et al. | |
| 9,395,049 B2 | 7/2016 | Vicknair et al. | |
| 9,401,670 B2 | 7/2016 | Minato | |
| 9,410,410 B2 | 8/2016 | Broussard et al. | |
| 9,410,546 B2 | 8/2016 | Jaeger et al. | |
| 9,429,078 B1 | 8/2016 | Crowe et al. | |
| 9,435,333 B2 | 9/2016 | Mccoy et al. | |
| 9,488,169 B2 | 11/2016 | Cochran et al. | |
| 9,493,997 B2 | 11/2016 | Liu et al. | |
| 9,512,783 B2 | 12/2016 | Veilleux, Jr. et al. | |
| 9,534,473 B2 | 1/2017 | Morris et al. | |
| 9,546,652 B2 | 1/2017 | Yin | |
| 9,550,501 B2 | 1/2017 | Ledbetter et al. | |
| 9,556,721 B2 | 1/2017 | Jang et al. | |
| 9,562,420 B2 | 2/2017 | Morris et al. | |
| 9,570,945 B2 | 2/2017 | Fischer | |
| 9,579,980 B2 | 2/2017 | Cryer et al. | |
| 9,587,649 B2 | 3/2017 | Oehring | |
| 9,593,710 B2 | 3/2017 | Laimboeck et al. | |
| 9,611,728 B2 | 4/2017 | Oehring | |
| 9,617,808 B2 | 4/2017 | Liu et al. | |
| 9,638,101 B1 | 5/2017 | Crowe et al. | |

(56) References Cited

U.S. PATENT DOCUMENTS

| | | | |
|---|---|---|---|
| 9,638,194 B2 | 5/2017 | Wiegman et al. | |
| 9,650,871 B2 | 5/2017 | Oehring et al. | |
| 9,656,762 B2 | 5/2017 | Kamath et al. | |
| 9,689,316 B1 | 6/2017 | Crom | |
| 9,695,808 B2 | 7/2017 | Giessbach et al. | |
| 9,739,130 B2 | 8/2017 | Young | |
| 9,764,266 B1 | 9/2017 | Carter | |
| 9,777,748 B2 | 10/2017 | Lu et al. | |
| 9,803,467 B2 | 10/2017 | Tang et al. | |
| 9,803,793 B2 | 10/2017 | Davi et al. | |
| 9,809,308 B2 | 11/2017 | Aguilar et al. | |
| 9,829,002 B2 | 11/2017 | Crom | |
| 9,840,897 B2 | 12/2017 | Larson | |
| 9,840,901 B2 | 12/2017 | Oehring et al. | |
| 9,845,730 B2 | 12/2017 | Betti et al. | |
| 9,850,422 B2 | 12/2017 | Lestz et al. | |
| 9,856,131 B1 | 1/2018 | Moffitt, Jr. | |
| 9,863,279 B2 | 1/2018 | Laing et al. | |
| 9,869,305 B1 * | 1/2018 | Crowe | F04B 23/04 |
| 9,871,406 B1 | 1/2018 | Churnock et al. | |
| 9,879,609 B1 | 1/2018 | Crowe et al. | |
| RE46,725 E | 2/2018 | Case et al. | |
| 9,893,500 B2 | 2/2018 | Oehring et al. | |
| 9,893,660 B2 | 2/2018 | Peterson et al. | |
| 9,897,003 B2 | 2/2018 | Motakef et al. | |
| 9,920,615 B2 | 3/2018 | Zhang et al. | |
| 9,945,365 B2 | 4/2018 | Hernandez et al. | |
| 9,964,052 B2 | 5/2018 | Millican et al. | |
| 9,970,278 B2 | 5/2018 | Broussard et al. | |
| 9,981,840 B2 | 5/2018 | Shock | |
| 9,995,102 B2 | 6/2018 | Dille et al. | |
| 9,995,218 B2 | 6/2018 | Oehring et al. | |
| 10,008,880 B2 | 6/2018 | Vicknair et al. | |
| 10,008,912 B2 | 6/2018 | Davey et al. | |
| 10,018,096 B2 | 7/2018 | Wallimann et al. | |
| 10,020,711 B2 | 7/2018 | Oehring et al. | |
| 10,024,123 B2 | 7/2018 | Steffenhagen et al. | |
| 10,029,289 B2 | 7/2018 | Wendorski et al. | |
| 10,030,579 B2 | 7/2018 | Austin et al. | |
| 10,036,238 B2 | 7/2018 | Oehring | |
| 10,040,541 B2 | 8/2018 | Wilson et al. | |
| 10,060,293 B2 | 8/2018 | Del | |
| 10,060,349 B2 | 8/2018 | Morales et al. | |
| 10,077,933 B2 | 9/2018 | Nelson et al. | |
| 10,082,137 B2 | 9/2018 | Graham et al. | |
| 10,094,366 B2 | 10/2018 | Marica | |
| 10,100,827 B2 | 10/2018 | Devan et al. | |
| 10,107,084 B2 | 10/2018 | Coli et al. | |
| 10,107,085 B2 | 10/2018 | Coli et al. | |
| 10,114,061 B2 | 10/2018 | Frampton et al. | |
| 10,119,381 B2 | 11/2018 | Oehring et al. | |
| 10,125,750 B2 | 11/2018 | Pfaff et al. | |
| 10,134,257 B2 | 11/2018 | Zhang et al. | |
| 10,138,098 B2 | 11/2018 | Sørensen et al. | |
| 10,151,244 B2 | 12/2018 | Giancotti et al. | |
| 10,161,423 B2 | 12/2018 | Rampen et al. | |
| 10,174,599 B2 | 1/2019 | Shampine et al. | |
| 10,184,397 B2 | 1/2019 | Austin et al. | |
| 10,196,258 B2 | 2/2019 | Kalala et al. | |
| 10,221,856 B2 | 3/2019 | Hernandez et al. | |
| 10,227,854 B2 | 3/2019 | Glass | |
| 10,227,855 B2 | 3/2019 | Coli et al. | |
| 10,246,984 B2 | 4/2019 | Payne et al. | |
| 10,247,182 B2 | 4/2019 | Zhang et al. | |
| 10,254,732 B2 | 4/2019 | Oehring et al. | |
| 10,267,439 B2 | 4/2019 | Pryce et al. | |
| 10,280,724 B2 | 5/2019 | Hinderliter | |
| 10,287,943 B1 | 5/2019 | Schiltz | |
| 10,288,519 B2 | 5/2019 | De | |
| 10,303,190 B2 | 5/2019 | Shock | |
| 10,305,350 B2 | 5/2019 | Johnson et al. | |
| 10,316,832 B2 | 6/2019 | Byrne | |
| 10,317,875 B2 | 6/2019 | Pandurangan et al. | |
| 10,337,402 B2 | 7/2019 | Austin et al. | |
| 10,358,035 B2 | 7/2019 | Cryer et al. | |
| 10,371,012 B2 | 8/2019 | Davis et al. | |
| 10,374,485 B2 | 8/2019 | Morris et al. | |
| 10,378,326 B2 | 8/2019 | Morris et al. | |
| 10,393,108 B2 | 8/2019 | Chong et al. | |
| 10,407,990 B2 | 9/2019 | Oehring et al. | |
| 10,408,031 B2 | 9/2019 | Oehring et al. | |
| 10,415,348 B2 | 9/2019 | Zhang et al. | |
| 10,415,557 B1 | 9/2019 | Crowe et al. | |
| 10,415,562 B2 | 9/2019 | Kajita et al. | |
| RE47,695 E | 11/2019 | Case et al. | |
| 10,465,689 B2 * | 11/2019 | Crom | F04D 7/04 |
| 10,478,753 B1 | 11/2019 | Elms et al. | |
| 10,526,882 B2 | 1/2020 | Oehring et al. | |
| 10,563,649 B2 | 2/2020 | Zhang et al. | |
| 10,577,910 B2 | 3/2020 | Stephenson | |
| 10,584,645 B2 | 3/2020 | Nakagawa et al. | |
| 10,590,867 B2 * | 3/2020 | Thomassin | F02C 7/26 |
| 10,598,258 B2 | 3/2020 | Oehring et al. | |
| 10,610,842 B2 | 4/2020 | Chong | |
| 10,662,749 B1 | 5/2020 | Hill et al. | |
| 10,711,787 B1 | 7/2020 | Darley | |
| 10,738,580 B1 | 8/2020 | Fischer et al. | |
| 10,753,153 B1 | 8/2020 | Fischer et al. | |
| 10,753,165 B1 | 8/2020 | Fischer et al. | |
| 10,760,556 B1 | 9/2020 | Crom et al. | |
| 10,760,645 B2 * | 9/2020 | Knopf | F16F 15/173 |
| 10,794,165 B2 | 10/2020 | Fischer et al. | |
| 10,794,166 B2 | 10/2020 | Reckels et al. | |
| 10,801,311 B1 | 10/2020 | Cui et al. | |
| 10,815,764 B1 | 10/2020 | Yeung et al. | |
| 10,815,978 B2 | 10/2020 | Glass | |
| 10,830,032 B1 | 11/2020 | Zhang et al. | |
| 10,830,225 B2 | 11/2020 | Repaci | |
| 10,859,203 B1 | 12/2020 | Cui et al. | |
| 10,864,487 B1 | 12/2020 | Han et al. | |
| 10,865,624 B1 | 12/2020 | Cui et al. | |
| 10,865,631 B1 | 12/2020 | Zhang et al. | |
| 10,870,093 B1 | 12/2020 | Zhong et al. | |
| 10,871,045 B2 | 12/2020 | Fischer et al. | |
| 10,892,596 B2 | 1/2021 | Enya et al. | |
| 10,895,202 B1 | 1/2021 | Yeung et al. | |
| 10,900,475 B2 | 1/2021 | Weightman et al. | |
| 10,907,459 B1 | 2/2021 | Yeung et al. | |
| 10,927,774 B2 | 2/2021 | Cai et al. | |
| 10,927,802 B2 | 2/2021 | Oehring et al. | |
| 10,954,770 B1 | 3/2021 | Yeung et al. | |
| 10,954,855 B1 | 3/2021 | Ji et al. | |
| 10,961,614 B1 | 3/2021 | Djavanroodi | |
| 10,961,908 B1 | 3/2021 | Yeung et al. | |
| 10,961,912 B1 | 3/2021 | Yeung et al. | |
| 10,961,914 B1 | 3/2021 | Yeung et al. | |
| 10,961,993 B1 * | 3/2021 | Ji | F04B 53/18 |
| 10,961,995 B2 | 3/2021 | Mayorca | |
| 10,962,086 B2 * | 3/2021 | Knopf | F16F 15/145 |
| 10,968,837 B1 | 4/2021 | Yeung et al. | |
| 10,982,523 B1 | 4/2021 | Hill et al. | |
| 10,989,019 B2 | 4/2021 | Cai et al. | |
| 10,989,180 B2 | 4/2021 | Yeung et al. | |
| 10,995,564 B2 | 5/2021 | Miller et al. | |
| 11,002,189 B2 | 5/2021 | Yeung et al. | |
| 11,008,950 B2 | 5/2021 | Ethier et al. | |
| 11,015,423 B1 | 5/2021 | Yeung et al. | |
| 11,015,536 B2 | 5/2021 | Yeung et al. | |
| 11,015,594 B2 | 5/2021 | Yeung et al. | |
| 11,022,526 B1 | 6/2021 | Yeung et al. | |
| 11,028,677 B1 | 6/2021 | Yeung et al. | |
| 11,028,897 B2 * | 6/2021 | Jia | F16F 15/1428 |
| 11,035,213 B2 | 6/2021 | Dusterhoft et al. | |
| 11,035,214 B2 | 6/2021 | Cui et al. | |
| 11,047,379 B1 | 6/2021 | Li et al. | |
| 11,053,853 B2 | 7/2021 | Li et al. | |
| 11,060,455 B1 | 7/2021 | Yeung et al. | |
| 11,066,915 B1 | 7/2021 | Yeung et al. | |
| 11,068,455 B2 | 7/2021 | Shabi et al. | |
| 11,085,281 B1 | 8/2021 | Yeung et al. | |
| 11,085,282 B2 | 8/2021 | Mazrooee et al. | |
| 11,092,152 B2 | 8/2021 | Yeung et al. | |
| 11,098,651 B1 | 8/2021 | Yeung et al. | |
| 11,105,250 B1 | 8/2021 | Zhang et al. | |

(56) References Cited

U.S. PATENT DOCUMENTS

| | | | |
|---|---|---|---|
| 11,105,266 B2 | 8/2021 | Zhou et al. | |
| 11,109,508 B1 | 8/2021 | Yeung et al. | |
| 11,111,768 B1 | 9/2021 | Yeung et al. | |
| 11,125,066 B1 | 9/2021 | Yeung et al. | |
| 11,125,156 B2 | 9/2021 | Zhang et al. | |
| 11,129,295 B1 | 9/2021 | Yeung et al. | |
| 11,143,000 B2 | 10/2021 | Li et al. | |
| 11,143,005 B2 | 10/2021 | Dusterhoft et al. | |
| 11,143,006 B1 | 10/2021 | Zhang et al. | |
| 11,149,533 B1 | 10/2021 | Yeung et al. | |
| 11,149,726 B1 | 10/2021 | Yeung et al. | |
| 11,156,159 B1 | 10/2021 | Yeung et al. | |
| 11,168,681 B2 | 11/2021 | Boguski et al. | |
| 11,174,716 B1 | 11/2021 | Yeung et al. | |
| 11,193,360 B1 | 12/2021 | Yeung et al. | |
| 11,193,361 B1 | 12/2021 | Yeung et al. | |
| 11,205,880 B1 | 12/2021 | Zhou | |
| 11,205,881 B2 | 12/2021 | Makino | |
| 11,208,879 B1 | 12/2021 | Yeung et al. | |
| 11,208,953 B1 | 12/2021 | Yeung et al. | |
| 11,220,895 B1 | 1/2022 | Yeung et al. | |
| 11,236,739 B2 | 2/2022 | Yeung et al. | |
| 11,242,737 B2 | 2/2022 | Zhang et al. | |
| 11,243,509 B2 | 2/2022 | Cai et al. | |
| 11,251,650 B1 | 2/2022 | Liu et al. | |
| 11,261,717 B2 | 3/2022 | Yeung et al. | |
| 11,268,346 B2 | 3/2022 | Yeung et al. | |
| 11,280,266 B2 | 3/2022 | Yeung et al. | |
| 11,306,835 B1 | 4/2022 | Dille et al. | |
| RE49,083 E | 5/2022 | Case et al. | |
| 11,339,638 B1 | 5/2022 | Yeung et al. | |
| 11,346,200 B2 | 5/2022 | Cai et al. | |
| 11,373,058 B2 | 6/2022 | Jaaskelainen et al. | |
| RE49,140 E | 7/2022 | Case et al. | |
| 11,377,943 B2 | 7/2022 | Kriebel et al. | |
| RE49,155 E | 8/2022 | Case et al. | |
| RE49,156 E | 8/2022 | Case et al. | |
| 11,401,927 B2 | 8/2022 | Li et al. | |
| 11,428,165 B2 | 8/2022 | Yeung et al. | |
| 11,441,483 B2 | 9/2022 | Li et al. | |
| 11,448,122 B2 | 9/2022 | Feng et al. | |
| 11,466,680 B2 | 10/2022 | Yeung et al. | |
| 11,480,040 B2 | 10/2022 | Han et al. | |
| 11,492,887 B2 | 11/2022 | Cui et al. | |
| 11,499,405 B2 | 11/2022 | Zhang et al. | |
| 11,506,039 B2 | 11/2022 | Zhang et al. | |
| 11,512,570 B2 | 11/2022 | Yeung et al. | |
| 11,519,395 B2 | 12/2022 | Zhang et al. | |
| 11,519,405 B2 | 12/2022 | Deng et al. | |
| 11,530,602 B2 | 12/2022 | Yeung et al. | |
| 11,549,349 B2 | 1/2023 | Wang et al. | |
| 11,555,390 B2 | 1/2023 | Cui et al. | |
| 11,555,756 B2 | 1/2023 | Yeung et al. | |
| 11,557,887 B2 | 1/2023 | Ji et al. | |
| 11,560,779 B2 | 1/2023 | Mao et al. | |
| 11,560,845 B2 | 1/2023 | Yeung et al. | |
| 11,572,775 B2 | 2/2023 | Mao et al. | |
| 11,575,249 B2 | 2/2023 | Ji et al. | |
| 11,592,020 B2 | 2/2023 | Chang et al. | |
| 11,596,047 B2 | 2/2023 | Liu et al. | |
| 11,598,263 B2 | 3/2023 | Yeung et al. | |
| 11,603,797 B2 | 3/2023 | Zhang et al. | |
| 11,607,982 B2 | 3/2023 | Tian et al. | |
| 11,608,726 B2 | 3/2023 | Zhang et al. | |
| 11,624,326 B2 | 4/2023 | Yeung et al. | |
| 11,629,583 B2 | 4/2023 | Yeung et al. | |
| 11,629,589 B2 | 4/2023 | Lin et al. | |
| 11,649,766 B1 | 5/2023 | Yeung et al. | |
| 11,662,384 B2 | 5/2023 | Liu et al. | |
| 11,668,173 B2 | 6/2023 | Zhang et al. | |
| 11,668,289 B2 | 6/2023 | Chang et al. | |
| 11,677,238 B2 | 6/2023 | Liu et al. | |
| 2002/0126922 A1 | 9/2002 | Cheng et al. | |
| 2002/0197176 A1 | 12/2002 | Kondo | |
| 2003/0031568 A1 | 2/2003 | Stiefel | |
| 2003/0061819 A1 | 4/2003 | Kuroki et al. | |
| 2003/0161212 A1 | 8/2003 | Neal et al. | |
| 2004/0016245 A1 | 1/2004 | Pierson | |
| 2004/0074238 A1 | 4/2004 | Wantanabe et al. | |
| 2004/0076526 A1 | 4/2004 | Fukano et al. | |
| 2004/0187950 A1 | 9/2004 | Cohen et al. | |
| 2004/0219040 A1 | 11/2004 | Kugelev et al. | |
| 2005/0051322 A1 | 3/2005 | Speer | |
| 2005/0056081 A1 | 3/2005 | Gocho | |
| 2005/0139286 A1 | 6/2005 | Poulter et al. | |
| 2005/0196298 A1 | 9/2005 | Manning | |
| 2005/0226754 A1 | 10/2005 | Orr et al. | |
| 2005/0274134 A1 | 12/2005 | Ryu et al. | |
| 2006/0061091 A1 | 3/2006 | Osterloh | |
| 2006/0062914 A1 | 3/2006 | Garg et al. | |
| 2006/0196251 A1 | 9/2006 | Richey | |
| 2006/0211356 A1 | 9/2006 | Grassman | |
| 2006/0228225 A1 | 10/2006 | Rogers | |
| 2006/0260331 A1 | 11/2006 | Andreychuk | |
| 2006/0272333 A1 | 12/2006 | Sundin | |
| 2007/0029090 A1 | 2/2007 | Andreychuk et al. | |
| 2007/0041848 A1 | 2/2007 | Wood et al. | |
| 2007/0066406 A1 | 3/2007 | Keller et al. | |
| 2007/0098580 A1 | 5/2007 | Petersen | |
| 2007/0107981 A1 | 5/2007 | Sicotte | |
| 2007/0125544 A1 | 6/2007 | Robinson et al. | |
| 2007/0169543 A1 | 7/2007 | Fazekas | |
| 2007/0181212 A1 | 8/2007 | Fell | |
| 2007/0277982 A1 | 12/2007 | Shampine et al. | |
| 2007/0295569 A1 | 12/2007 | Manzoor et al. | |
| 2008/0006089 A1 | 1/2008 | Adnan et al. | |
| 2008/0098891 A1 | 5/2008 | Feher et al. | |
| 2008/0161974 A1 | 7/2008 | Alston | |
| 2008/0212275 A1 | 9/2008 | Waryck et al. | |
| 2008/0229757 A1 | 9/2008 | Alexander et al. | |
| 2008/0264625 A1 | 10/2008 | Ochoa | |
| 2008/0264649 A1 | 10/2008 | Crawford | |
| 2008/0298982 A1 | 12/2008 | Pabst et al. | |
| 2009/0064685 A1 | 3/2009 | Busekros et al. | |
| 2009/0068031 A1 | 3/2009 | Gambier et al. | |
| 2009/0092510 A1 | 4/2009 | Williams et al. | |
| 2009/0124191 A1 | 5/2009 | Van | |
| 2009/0178412 A1 | 7/2009 | Spytek | |
| 2009/0212630 A1 | 8/2009 | Flegel et al. | |
| 2009/0249794 A1 | 10/2009 | Wilkes et al. | |
| 2009/0252616 A1 | 10/2009 | Brunet et al. | |
| 2009/0308602 A1 | 12/2009 | Bruins et al. | |
| 2010/0019626 A1 | 1/2010 | Stout et al. | |
| 2010/0071899 A1 | 3/2010 | Coquilleau et al. | |
| 2010/0218508 A1 | 9/2010 | Brown et al. | |
| 2010/0300683 A1 | 12/2010 | Looper et al. | |
| 2010/0310384 A1 | 12/2010 | Stephenson et al. | |
| 2011/0041681 A1 | 2/2011 | Duerr | |
| 2011/0052423 A1 | 3/2011 | Gambier et al. | |
| 2011/0054704 A1 | 3/2011 | Karpman et al. | |
| 2011/0085924 A1 | 4/2011 | Shampine et al. | |
| 2011/0146244 A1 | 6/2011 | Farman et al. | |
| 2011/0146246 A1 | 6/2011 | Farman et al. | |
| 2011/0173991 A1 | 7/2011 | Dean et al. | |
| 2011/0197988 A1 | 8/2011 | Van et al. | |
| 2011/0241888 A1 | 10/2011 | Lu et al. | |
| 2011/0265443 A1 | 11/2011 | Ansari et al. | |
| 2011/0272158 A1 | 11/2011 | Neal | |
| 2012/0023973 A1 | 2/2012 | Mayorca | |
| 2012/0048242 A1 | 3/2012 | Surnilla et al. | |
| 2012/0085541 A1 | 4/2012 | Love et al. | |
| 2012/0137699 A1 | 6/2012 | Montagne et al. | |
| 2012/0179444 A1 | 7/2012 | Ganguly et al. | |
| 2012/0192542 A1 | 8/2012 | Chillar et al. | |
| 2012/0199001 A1 | 8/2012 | Chillar et al. | |
| 2012/0204627 A1 | 8/2012 | Anderl et al. | |
| 2012/0255734 A1 | 10/2012 | Coli et al. | |
| 2012/0310509 A1 | 12/2012 | Pardo et al. | |
| 2012/0324903 A1* | 12/2012 | Dewis | F01D 15/02 |
| | | | 60/801 |
| 2013/0068307 A1 | 3/2013 | Hains et al. | |
| 2013/0087045 A1 | 4/2013 | Sullivan et al. | |
| 2013/0087945 A1 | 4/2013 | Kusters et al. | |
| 2013/0134702 A1 | 5/2013 | Boraas et al. | |

(56) References Cited

U.S. PATENT DOCUMENTS

| | | |
|---|---|---|
| 2013/0189915 A1 | 7/2013 | Hazard |
| 2013/0205798 A1 | 8/2013 | Kwok et al. |
| 2013/0233165 A1 | 9/2013 | Matzner et al. |
| 2013/0255953 A1 | 10/2013 | Tudor |
| 2013/0259707 A1 | 10/2013 | Yin |
| 2013/0284455 A1 | 10/2013 | Kajaria et al. |
| 2013/0300341 A1 | 11/2013 | Gillette, II |
| 2013/0306322 A1 | 11/2013 | Sanborn et al. |
| 2014/0000668 A1 | 1/2014 | Lessard |
| 2014/0010671 A1 | 1/2014 | Cryer et al. |
| 2014/0013768 A1 | 1/2014 | Laing et al. |
| 2014/0032082 A1 | 1/2014 | Gehrke et al. |
| 2014/0044517 A1 | 2/2014 | Saha et al. |
| 2014/0048253 A1 | 2/2014 | Andreychuk |
| 2014/0090729 A1 | 4/2014 | Coulter et al. |
| 2014/0090742 A1 | 4/2014 | Coskrey et al. |
| 2014/0094105 A1 | 4/2014 | Lundh et al. |
| 2014/0095114 A1 | 4/2014 | Thomeer et al. |
| 2014/0095554 A1 | 4/2014 | Thomeer et al. |
| 2014/0123621 A1 | 5/2014 | Driessens et al. |
| 2014/0130422 A1 | 5/2014 | Laing et al. |
| 2014/0138079 A1 | 5/2014 | Broussard et al. |
| 2014/0144641 A1 | 5/2014 | Chandler |
| 2014/0147291 A1 | 5/2014 | Burnette |
| 2014/0158345 A1 | 6/2014 | Jang et al. |
| 2014/0174097 A1 | 6/2014 | Hammer et al. |
| 2014/0196459 A1 | 7/2014 | Futa et al. |
| 2014/0216736 A1 | 8/2014 | Leugemors et al. |
| 2014/0219824 A1 | 8/2014 | Burnette |
| 2014/0250845 A1 | 9/2014 | Jackson et al. |
| 2014/0251623 A1 | 9/2014 | Lestz et al. |
| 2014/0277772 A1 | 9/2014 | Lopez et al. |
| 2014/0290266 A1 | 10/2014 | Veilleux, Jr. et al. |
| 2014/0318638 A1 | 10/2014 | Harwood et al. |
| 2014/0322050 A1 | 10/2014 | Marette et al. |
| 2015/0027730 A1 | 1/2015 | Hall et al. |
| 2015/0078924 A1 | 3/2015 | Zhang et al. |
| 2015/0101344 A1 | 4/2015 | Jarrier et al. |
| 2015/0114652 A1 | 4/2015 | Lestz et al. |
| 2015/0129210 A1 | 5/2015 | Chong et al. |
| 2015/0135659 A1 | 5/2015 | Jarrier et al. |
| 2015/0159553 A1 | 6/2015 | Kippel et al. |
| 2015/0192117 A1 | 7/2015 | Bridges |
| 2015/0204148 A1 | 7/2015 | Liu et al. |
| 2015/0204322 A1 | 7/2015 | Iund et al. |
| 2015/0211512 A1 | 7/2015 | Wiegman et al. |
| 2015/0214816 A1 | 7/2015 | Raad |
| 2015/0217672 A1 | 8/2015 | Shampine et al. |
| 2015/0226140 A1 | 8/2015 | Zhang et al. |
| 2015/0252661 A1 | 9/2015 | Glass |
| 2015/0275891 A1 | 10/2015 | Chong |
| 2015/0337730 A1 | 11/2015 | Kupiszewski et al. |
| 2015/0340864 A1 | 11/2015 | Compton |
| 2015/0345385 A1 | 12/2015 | Santini |
| 2015/0369351 A1 | 12/2015 | Hermann et al. |
| 2016/0032703 A1 | 2/2016 | Broussard et al. |
| 2016/0032836 A1 | 2/2016 | Hawkinson et al. |
| 2016/0076447 A1 | 3/2016 | Merlo et al. |
| 2016/0102581 A1 | 4/2016 | Del Bono |
| 2016/0105022 A1 | 4/2016 | Oehring et al. |
| 2016/0108713 A1 | 4/2016 | Dunaeva et al. |
| 2016/0123185 A1 | 5/2016 | Le Pache et al. |
| 2016/0168979 A1 | 6/2016 | Zhang et al. |
| 2016/0177675 A1 | 6/2016 | Morris et al. |
| 2016/0177945 A1 | 6/2016 | Byrne et al. |
| 2016/0186671 A1 | 6/2016 | Austin et al. |
| 2016/0195082 A1 | 7/2016 | Wiegman et al. |
| 2016/0215774 A1 | 7/2016 | Oklejas et al. |
| 2016/0230525 A1 | 8/2016 | Lestz et al. |
| 2016/0244314 A1 | 8/2016 | Van Vliet et al. |
| 2016/0248230 A1 | 8/2016 | Tawy et al. |
| 2016/0253634 A1 | 9/2016 | Thomeer et al. |
| 2016/0258267 A1 | 9/2016 | Payne et al. |
| 2016/0273328 A1 | 9/2016 | Oehring |
| 2016/0273346 A1 | 9/2016 | Tang et al. |
| 2016/0290114 A1 | 10/2016 | Oehring et al. |
| 2016/0319650 A1 | 11/2016 | Oehring et al. |
| 2016/0326845 A1 | 11/2016 | Djikpesse et al. |
| 2016/0348479 A1 | 12/2016 | Oehring et al. |
| 2016/0369609 A1 | 12/2016 | Morris et al. |
| 2017/0009905 A1 | 1/2017 | Arnold |
| 2017/0016433 A1 | 1/2017 | Chong et al. |
| 2017/0030177 A1 | 2/2017 | Oehring et al. |
| 2017/0038137 A1 | 2/2017 | Turney |
| 2017/0045055 A1 | 2/2017 | Hoefel et al. |
| 2017/0052087 A1 | 2/2017 | Faqihi et al. |
| 2017/0074074 A1 | 3/2017 | Joseph et al. |
| 2017/0074076 A1 | 3/2017 | Joseph et al. |
| 2017/0074089 A1 | 3/2017 | Agarwal et al. |
| 2017/0082110 A1 | 3/2017 | Lammers |
| 2017/0089189 A1 | 3/2017 | Norris et al. |
| 2017/0114613 A1 | 4/2017 | Lecerf et al. |
| 2017/0114625 A1 | 4/2017 | Norris et al. |
| 2017/0122310 A1 | 5/2017 | Ladrón |
| 2017/0131174 A1 | 5/2017 | Enev et al. |
| 2017/0145918 A1 | 5/2017 | Oehring et al. |
| 2017/0191350 A1 | 7/2017 | Johns et al. |
| 2017/0218727 A1 | 8/2017 | Oehring et al. |
| 2017/0226839 A1 | 8/2017 | Broussard et al. |
| 2017/0226842 A1 | 8/2017 | Omont et al. |
| 2017/0226998 A1 | 8/2017 | Zhang et al. |
| 2017/0227002 A1 | 8/2017 | Mikulski et al. |
| 2017/0233103 A1 | 8/2017 | Teicholz et al. |
| 2017/0234165 A1 | 8/2017 | Kersey et al. |
| 2017/0234308 A1 | 8/2017 | Buckley |
| 2017/0241336 A1 | 8/2017 | Jones et al. |
| 2017/0241671 A1 | 8/2017 | Ahmad |
| 2017/0248034 A1 | 8/2017 | Dzieciol et al. |
| 2017/0248208 A1 | 8/2017 | Tamura |
| 2017/0248308 A1 | 8/2017 | Makarychev-Mikhailov et al. |
| 2017/0275149 A1 | 9/2017 | Schmidt |
| 2017/0288400 A1 | 10/2017 | Williams |
| 2017/0292409 A1 | 10/2017 | Aguilar et al. |
| 2017/0302135 A1 | 10/2017 | Cory |
| 2017/0305736 A1 | 10/2017 | Haile et al. |
| 2017/0306847 A1 | 10/2017 | Suciu et al. |
| 2017/0306936 A1 | 10/2017 | Dole et al. |
| 2017/0322086 A1 | 11/2017 | Luharuka et al. |
| 2017/0333086 A1 | 11/2017 | Jackson |
| 2017/0334448 A1 | 11/2017 | Schwunk |
| 2017/0335842 A1 | 11/2017 | Robinson et al. |
| 2017/0350471 A1 | 12/2017 | Steidl et al. |
| 2017/0356470 A1 | 12/2017 | Jaffrey |
| 2017/0370199 A1 | 12/2017 | Witkowski et al. |
| 2017/0370480 A1 | 12/2017 | Witkowski et al. |
| 2018/0034280 A1 | 2/2018 | Pedersen |
| 2018/0038216 A1 | 2/2018 | Zhang et al. |
| 2018/0038328 A1 | 2/2018 | Louven et al. |
| 2018/0041093 A1 | 2/2018 | Miranda |
| 2018/0045202 A1 | 2/2018 | Crom |
| 2018/0058171 A1 | 3/2018 | Roesner et al. |
| 2018/0087499 A1 | 3/2018 | Zhang et al. |
| 2018/0087996 A1 | 3/2018 | De La Cruz |
| 2018/0156210 A1 | 6/2018 | Oehring et al. |
| 2018/0172294 A1 | 6/2018 | Owen |
| 2018/0183219 A1 | 6/2018 | Oehring et al. |
| 2018/0186442 A1 | 7/2018 | Maier |
| 2018/0187662 A1 | 7/2018 | Hill et al. |
| 2018/0209415 A1 | 7/2018 | Zhang et al. |
| 2018/0223640 A1 | 8/2018 | Keihany et al. |
| 2018/0224044 A1 | 8/2018 | Penney et al. |
| 2018/0229998 A1 | 8/2018 | Shock |
| 2018/0258746 A1 | 9/2018 | Broussard et al. |
| 2018/0266412 A1 | 9/2018 | Stokkevåg et al. |
| 2018/0278124 A1 | 9/2018 | Oehring et al. |
| 2018/0283102 A1 | 10/2018 | Cook |
| 2018/0283618 A1 | 10/2018 | Cook |
| 2018/0284817 A1 | 10/2018 | Cook et al. |
| 2018/0290877 A1 | 10/2018 | Shock |
| 2018/0291781 A1 | 10/2018 | Pedrini |
| 2018/0298731 A1 | 10/2018 | Bishop |
| 2018/0298735 A1 | 10/2018 | Conrad |
| 2018/0307255 A1 | 10/2018 | Bishop |
| 2018/0313456 A1 | 11/2018 | Bayyouk et al. |

(56) References Cited

U.S. PATENT DOCUMENTS

| 2018/0328157 | A1 | 11/2018 | Bishop |
|---|---|---|---|
| 2018/0334893 | A1 | 11/2018 | Oehring |
| 2018/0363435 | A1 | 12/2018 | Coli et al. |
| 2018/0363436 | A1 | 12/2018 | Coli et al. |
| 2018/0363437 | A1 | 12/2018 | Coli et al. |
| 2018/0363438 | A1 | 12/2018 | Coli et al. |
| 2019/0003272 | A1 | 1/2019 | Morris et al. |
| 2019/0003329 | A1 | 1/2019 | Morris et al. |
| 2019/0010793 | A1 | 1/2019 | Hinderliter |
| 2019/0011051 | A1 | 1/2019 | Yeung |
| 2019/0048993 | A1 | 2/2019 | Akiyama et al. |
| 2019/0063263 | A1 | 2/2019 | Davis et al. |
| 2019/0063341 | A1 | 2/2019 | Davis |
| 2019/0067991 | A1 | 2/2019 | Davis et al. |
| 2019/0071992 | A1 | 3/2019 | Feng |
| 2019/0072005 | A1 | 3/2019 | Fisher et al. |
| 2019/0078471 | A1 | 3/2019 | Braglia et al. |
| 2019/0088845 | A1 | 3/2019 | Sugi et al. |
| 2019/0091619 | A1 | 3/2019 | Huang |
| 2019/0106316 | A1 | 4/2019 | Van Vliet et al. |
| 2019/0106970 | A1 | 4/2019 | Oehring |
| 2019/0112908 | A1 | 4/2019 | Coli et al. |
| 2019/0112910 | A1 | 4/2019 | Oehring et al. |
| 2019/0119096 | A1 | 4/2019 | Haile et al. |
| 2019/0120024 | A1 | 4/2019 | Oehring et al. |
| 2019/0120031 | A1 | 4/2019 | Gilje |
| 2019/0120134 | A1 | 4/2019 | Goleczka et al. |
| 2019/0128247 | A1 | 5/2019 | Douglas, III |
| 2019/0128288 | A1 | 5/2019 | Konada et al. |
| 2019/0131607 | A1 | 5/2019 | Gillette |
| 2019/0136677 | A1 | 5/2019 | Shampine et al. |
| 2019/0153843 | A1 | 5/2019 | Headrick |
| 2019/0153938 | A1 | 5/2019 | Hammoud |
| 2019/0154020 | A1 | 5/2019 | Glass |
| 2019/0155318 | A1* | 5/2019 | Meunier ................. F02C 9/28 |
| 2019/0178234 | A1 | 6/2019 | Beisel |
| 2019/0178235 | A1 | 6/2019 | Coskrey et al. |
| 2019/0185312 | A1 | 6/2019 | Bush et al. |
| 2019/0203572 | A1 | 7/2019 | Morris et al. |
| 2019/0204021 | A1 | 7/2019 | Morris et al. |
| 2019/0211661 | A1 | 7/2019 | Reckels et al. |
| 2019/0211814 | A1 | 7/2019 | Weightman et al. |
| 2019/0217258 | A1 | 7/2019 | Bishop |
| 2019/0226317 | A1 | 7/2019 | Payne et al. |
| 2019/0245348 | A1 | 8/2019 | Hinderliter et al. |
| 2019/0249652 | A1 | 8/2019 | Stephenson et al. |
| 2019/0249754 | A1 | 8/2019 | Oehring et al. |
| 2019/0257297 | A1 | 8/2019 | Botting et al. |
| 2019/0264667 | A1 | 8/2019 | Byrne |
| 2019/0277279 | A1 | 9/2019 | Byrne et al. |
| 2019/0277295 | A1 | 9/2019 | Clyburn et al. |
| 2019/0309585 | A1 | 10/2019 | Miller et al. |
| 2019/0316447 | A1 | 10/2019 | Oehring et al. |
| 2019/0316456 | A1 | 10/2019 | Beisel et al. |
| 2019/0323337 | A1 | 10/2019 | Glass et al. |
| 2019/0330923 | A1 | 10/2019 | Gable et al. |
| 2019/0331117 | A1 | 10/2019 | Gable et al. |
| 2019/0337392 | A1 | 11/2019 | Joshi et al. |
| 2019/0338762 | A1 | 11/2019 | Curry et al. |
| 2019/0345920 | A1 | 11/2019 | Surjaatmadja et al. |
| 2019/0353103 | A1 | 11/2019 | Roberge |
| 2019/0356199 | A1 | 11/2019 | Morris et al. |
| 2019/0376449 | A1 | 12/2019 | Carrell |
| 2019/0383123 | A1 | 12/2019 | Hinderliter |
| 2020/0003205 | A1 | 1/2020 | Stokkevåg et al. |
| 2020/0011165 | A1 | 1/2020 | George et al. |
| 2020/0040878 | A1 | 2/2020 | Morris |
| 2020/0049136 | A1 | 2/2020 | Stephenson |
| 2020/0049153 | A1 | 2/2020 | Headrick et al. |
| 2020/0071998 | A1 | 3/2020 | Oehring et al. |
| 2020/0072201 | A1 | 3/2020 | Marica |
| 2020/0088202 | A1 | 3/2020 | Sigmar et al. |
| 2020/0095854 | A1 | 3/2020 | Hinderliter |
| 2020/0109610 | A1* | 4/2020 | Husoy et al. ......... F04B 9/1172 |
| 2020/0109616 | A1 | 4/2020 | Oehring et al. |
| 2020/0132058 | A1 | 4/2020 | Mollatt |
| 2020/0141219 | A1 | 5/2020 | Oehring et al. |
| 2020/0141326 | A1 | 5/2020 | Redford et al. |
| 2020/0141907 | A1 | 5/2020 | Meck et al. |
| 2020/0166026 | A1 | 5/2020 | Marica |
| 2020/0206704 | A1 | 7/2020 | Chong |
| 2020/0208733 | A1 | 7/2020 | Kim |
| 2020/0223648 | A1 | 7/2020 | Herman et al. |
| 2020/0224645 | A1 | 7/2020 | Buckley |
| 2020/0232454 | A1 | 7/2020 | Chretien et al. |
| 2020/0256333 | A1 | 8/2020 | Surjaatmadja et al. |
| 2020/0263498 | A1 | 8/2020 | Fischer et al. |
| 2020/0263525 | A1 | 8/2020 | Reid et al. |
| 2020/0263526 | A1 | 8/2020 | Fischer et al. |
| 2020/0263527 | A1 | 8/2020 | Fischer et al. |
| 2020/0263528 | A1 | 8/2020 | Fischer et al. |
| 2020/0267888 | A1 | 8/2020 | Putz |
| 2020/0291731 | A1 | 9/2020 | Haiderer et al. |
| 2020/0295574 | A1* | 9/2020 | Batsch-Smith ...... G05B 19/042 |
| 2020/0300050 | A1 | 9/2020 | Oehring et al. |
| 2020/0309027 | A1 | 10/2020 | Rytkönen |
| 2020/0309113 | A1 | 10/2020 | Hunter et al. |
| 2020/0325752 | A1 | 10/2020 | Clark et al. |
| 2020/0325760 | A1 | 10/2020 | Markham |
| 2020/0325761 | A1 | 10/2020 | Williams |
| 2020/0325791 | A1 | 10/2020 | Himmelmann |
| 2020/0325893 | A1 | 10/2020 | Kraige et al. |
| 2020/0332784 | A1 | 10/2020 | Zhang et al. |
| 2020/0332788 | A1 | 10/2020 | Cui et al. |
| 2020/0340313 | A1 | 10/2020 | Fischer et al. |
| 2020/0340322 | A1 | 10/2020 | Sizemore et al. |
| 2020/0340340 | A1 | 10/2020 | Oehring et al. |
| 2020/0340344 | A1* | 10/2020 | Reckels ............. E21B 43/2607 |
| 2020/0340404 | A1 | 10/2020 | Stockstill et al. |
| 2020/0347725 | A1 | 11/2020 | Morris et al. |
| 2020/0354928 | A1 | 11/2020 | Wehler et al. |
| 2020/0355055 | A1 | 11/2020 | Dusterhoft et al. |
| 2020/0362760 | A1 | 11/2020 | Morenko et al. |
| 2020/0362764 | A1 | 11/2020 | Saintignan et al. |
| 2020/0370394 | A1 | 11/2020 | Cai et al. |
| 2020/0370408 | A1 | 11/2020 | Cai et al. |
| 2020/0370429 | A1 | 11/2020 | Cai et al. |
| 2020/0371490 | A1 | 11/2020 | Cai et al. |
| 2020/0386169 | A1 | 12/2020 | Hinderliter et al. |
| 2020/0386222 | A1 | 12/2020 | Pham et al. |
| 2020/0388140 | A1 | 12/2020 | Gomez et al. |
| 2020/0392826 | A1 | 12/2020 | Cui et al. |
| 2020/0392827 | A1 | 12/2020 | George et al. |
| 2020/0393088 | A1 | 12/2020 | Sizemore et al. |
| 2020/0398238 | A1 | 12/2020 | Zhong et al. |
| 2020/0400000 | A1 | 12/2020 | Ghasripoor et al. |
| 2020/0400005 | A1 | 12/2020 | Han et al. |
| 2020/0407625 | A1 | 12/2020 | Stephenson |
| 2020/0408071 | A1 | 12/2020 | Li et al. |
| 2020/0408144 | A1 | 12/2020 | Feng et al. |
| 2020/0408147 | A1 | 12/2020 | Zhang et al. |
| 2020/0408149 | A1 | 12/2020 | Li et al. |
| 2021/0025324 | A1 | 1/2021 | Morris et al. |
| 2021/0025383 | A1 | 1/2021 | Bodishbaugh et al. |
| 2021/0032961 | A1 | 2/2021 | Hinderliter et al. |
| 2021/0054727 | A1 | 2/2021 | Floyd |
| 2021/0071503 | A1 | 3/2021 | Ogg et al. |
| 2021/0071574 | A1 | 3/2021 | Feng et al. |
| 2021/0071579 | A1 | 3/2021 | Li et al. |
| 2021/0071654 | A1 | 3/2021 | Brunson, Jr. |
| 2021/0071752 | A1 | 3/2021 | Cui et al. |
| 2021/0079758 | A1 | 3/2021 | Yeung et al. |
| 2021/0079851 | A1 | 3/2021 | Yeung et al. |
| 2021/0086851 | A1 | 3/2021 | Zhang et al. |
| 2021/0087883 | A1 | 3/2021 | Zhang et al. |
| 2021/0087916 | A1 | 3/2021 | Zhang et al. |
| 2021/0087925 | A1 | 3/2021 | Heidari et al. |
| 2021/0087943 | A1 | 3/2021 | Cui et al. |
| 2021/0088042 | A1 | 3/2021 | Zhang et al. |
| 2021/0123425 | A1 | 4/2021 | Cui et al. |
| 2021/0123434 | A1 | 4/2021 | Cui et al. |
| 2021/0123435 | A1 | 4/2021 | Cui et al. |
| 2021/0131409 | A1 | 5/2021 | Cui et al. |
| 2021/0140416 | A1 | 5/2021 | Buckley |

(56) References Cited

U.S. PATENT DOCUMENTS

| 2021/0148208 A1 | 5/2021 | Thomas et al. |
| 2021/0156240 A1 | 5/2021 | Cicci et al. |
| 2021/0156241 A1 | 5/2021 | Cook |
| 2021/0172282 A1 | 6/2021 | Wang et al. |
| 2021/0180517 A1 | 6/2021 | Zhou et al. |
| 2021/0190045 A1 | 6/2021 | Zhang et al. |
| 2021/0199110 A1 | 7/2021 | Albert et al. |
| 2021/0222690 A1 | 7/2021 | Beisel |
| 2021/0239112 A1 | 8/2021 | Buckley |
| 2021/0246774 A1 | 8/2021 | Cui et al. |
| 2021/0270261 A1 | 9/2021 | Zhang et al. |
| 2021/0270264 A1 | 9/2021 | Byrne et al. |
| 2021/0285311 A1 | 9/2021 | Ji et al. |
| 2021/0285432 A1 | 9/2021 | Ji et al. |
| 2021/0301807 A1 | 9/2021 | Cui et al. |
| 2021/0301815 A1 | 9/2021 | Chretien et al. |
| 2021/0306720 A1 | 9/2021 | Sandoval et al. |
| 2021/0308638 A1 | 10/2021 | Zhong et al. |
| 2021/0324718 A1 | 10/2021 | Anders |
| 2021/0348475 A1 | 11/2021 | Yeung et al. |
| 2021/0348476 A1 | 11/2021 | Yeung et al. |
| 2021/0348477 A1 | 11/2021 | Yeung et al. |
| 2021/0355927 A1 | 11/2021 | Jian et al. |
| 2021/0372394 A1 | 12/2021 | Bagulayan et al. |
| 2021/0372395 A1 | 12/2021 | Li et al. |
| 2021/0376413 A1 | 12/2021 | Asfha |
| 2021/0388760 A1 | 12/2021 | Feng et al. |
| 2022/0082007 A1 | 3/2022 | Zhang et al. |
| 2022/0090476 A1* | 3/2022 | Zhang ..................... E21B 43/26 |
| 2022/0090477 A1 | 3/2022 | Zhang et al. |
| 2022/0090478 A1 | 3/2022 | Zhang et al. |
| 2022/0112892 A1 | 4/2022 | Cui et al. |
| 2022/0120262 A1 | 4/2022 | Ji et al. |
| 2022/0145740 A1 | 5/2022 | Yuan et al. |
| 2022/0154775 A1 | 5/2022 | Liu et al. |
| 2022/0155373 A1 | 5/2022 | Liu et al. |
| 2022/0162931 A1 | 5/2022 | Zhong et al. |
| 2022/0162991 A1 | 5/2022 | Zhang et al. |
| 2022/0181859 A1 | 6/2022 | Ji et al. |
| 2022/0186724 A1 | 6/2022 | Chang et al. |
| 2022/0213777 A1 | 7/2022 | Cui et al. |
| 2022/0220836 A1 | 7/2022 | Zhang et al. |
| 2022/0224087 A1 | 7/2022 | Ji et al. |
| 2022/0228468 A1 | 7/2022 | Cui et al. |
| 2022/0228469 A1 | 7/2022 | Zhang et al. |
| 2022/0235639 A1 | 7/2022 | Zhang et al. |
| 2022/0235640 A1 | 7/2022 | Mao et al. |
| 2022/0235641 A1 | 7/2022 | Zhang et al. |
| 2022/0235642 A1 | 7/2022 | Zhang et al. |
| 2022/0235802 A1 | 7/2022 | Jiang et al. |
| 2022/0242297 A1 | 8/2022 | Tian et al. |
| 2022/0243613 A1 | 8/2022 | Ji et al. |
| 2022/0243724 A1 | 8/2022 | Li et al. |
| 2022/0250000 A1 | 8/2022 | Zhang et al. |
| 2022/0255319 A1 | 8/2022 | Liu et al. |
| 2022/0258659 A1 | 8/2022 | Cui et al. |
| 2022/0259947 A1 | 8/2022 | Li et al. |
| 2022/0259964 A1 | 8/2022 | Zhang et al. |
| 2022/0268201 A1 | 8/2022 | Feng et al. |
| 2022/0282606 A1 | 9/2022 | Zhong et al. |
| 2022/0282726 A1 | 9/2022 | Zhang et al. |
| 2022/0290549 A1 | 9/2022 | Zhang et al. |
| 2022/0294194 A1 | 9/2022 | Cao et al. |
| 2022/0298906 A1 | 9/2022 | Zhong et al. |
| 2022/0307359 A1 | 9/2022 | Liu et al. |
| 2022/0307424 A1 | 9/2022 | Wang et al. |
| 2022/0314248 A1 | 10/2022 | Ge et al. |
| 2022/0315347 A1 | 10/2022 | Liu et al. |
| 2022/0316306 A1 | 10/2022 | Liu et al. |
| 2022/0316362 A1 | 10/2022 | Zhang et al. |
| 2022/0316461 A1 | 10/2022 | Wang et al. |
| 2022/0325608 A1 | 10/2022 | Zhang et al. |
| 2022/0330411 A1 | 10/2022 | Liu et al. |
| 2022/0333471 A1 | 10/2022 | Zhong et al. |
| 2022/0339646 A1 | 10/2022 | Yu et al. |
| 2022/0341358 A1 | 10/2022 | Ji et al. |
| 2022/0341362 A1 | 10/2022 | Feng et al. |
| 2022/0341415 A1 | 10/2022 | Deng et al. |
| 2022/0345007 A1 | 10/2022 | Liu et al. |
| 2022/0349345 A1 | 11/2022 | Zhang et al. |
| 2022/0353980 A1 | 11/2022 | Liu et al. |
| 2022/0361309 A1 | 11/2022 | Liu et al. |
| 2022/0364452 A1 | 11/2022 | Wang et al. |
| 2022/0364453 A1 | 11/2022 | Chang et al. |
| 2022/0372865 A1 | 11/2022 | Lin et al. |
| 2022/0376280 A1 | 11/2022 | Shao et al. |
| 2022/0381126 A1 | 12/2022 | Cui et al. |
| 2022/0389799 A1 | 12/2022 | Mao et al. |
| 2022/0389803 A1 | 12/2022 | Zhang et al. |
| 2022/0389804 A1 | 12/2022 | Cui et al. |
| 2022/0389865 A1 | 12/2022 | Feng et al. |
| 2022/0389867 A1 | 12/2022 | Li et al. |
| 2022/0412196 A1 | 12/2022 | Cui et al. |
| 2022/0412199 A1 | 12/2022 | Mao et al. |
| 2022/0412200 A1 | 12/2022 | Zhang et al. |
| 2022/0412258 A1 | 12/2022 | Li et al. |
| 2022/0412379 A1 | 12/2022 | Wang et al. |
| 2023/0001524 A1 | 1/2023 | Jiang et al. |
| 2023/0003238 A1 | 1/2023 | Du et al. |
| 2023/0015132 A1 | 1/2023 | Feng et al. |
| 2023/0015529 A1 | 1/2023 | Zhang et al. |
| 2023/0015581 A1 | 1/2023 | Ji et al. |
| 2023/0017968 A1 | 1/2023 | Deng et al. |
| 2023/0029574 A1 | 2/2023 | Zhang et al. |
| 2023/0029671 A1 | 2/2023 | Han et al. |
| 2023/0036118 A1 | 2/2023 | Xing et al. |
| 2023/0040970 A1 | 2/2023 | Liu et al. |
| 2023/0042379 A1 | 2/2023 | Zhang et al. |
| 2023/0047033 A1 | 2/2023 | Fu et al. |
| 2023/0048551 A1 | 2/2023 | Feng et al. |
| 2023/0049462 A1 | 2/2023 | Zhang et al. |
| 2023/0064964 A1 | 3/2023 | Wang et al. |
| 2023/0074794 A1 | 3/2023 | Liu et al. |
| 2023/0085124 A1 | 3/2023 | Zhong et al. |
| 2023/0092506 A1 | 3/2023 | Zhong et al. |
| 2023/0092705 A1 | 3/2023 | Liu et al. |
| 2023/0106683 A1 | 4/2023 | Zhang et al. |
| 2023/0107300 A1 | 4/2023 | Huang et al. |
| 2023/0107791 A1 | 4/2023 | Zhang et al. |
| 2023/0109018 A1 | 4/2023 | Du et al. |
| 2023/0116458 A1 | 4/2023 | Liu et al. |
| 2023/0117362 A1 | 4/2023 | Zhang et al. |
| 2023/0119725 A1 | 4/2023 | Wang et al. |
| 2023/0119876 A1 | 4/2023 | Mao et al. |
| 2023/0119896 A1 | 4/2023 | Zhang et al. |
| 2023/0120810 A1 | 4/2023 | Fu et al. |
| 2023/0121251 A1 | 4/2023 | Cui et al. |
| 2023/0124444 A1 | 4/2023 | Chang et al. |
| 2023/0138582 A1 | 5/2023 | Li et al. |
| 2023/0144116 A1 | 5/2023 | Li et al. |
| 2023/0145963 A1 | 5/2023 | Zhang et al. |
| 2023/0151722 A1 | 5/2023 | Cui et al. |
| 2023/0151723 A1 | 5/2023 | Ji et al. |
| 2023/0152793 A1 | 5/2023 | Wang et al. |
| 2023/0160289 A1 | 5/2023 | Cui et al. |
| 2023/0160510 A1 | 5/2023 | Bao et al. |
| 2023/0163580 A1 | 5/2023 | Ji et al. |
| 2023/0167776 A1 | 6/2023 | Cui et al. |

FOREIGN PATENT DOCUMENTS

| CA | 2043184 C | 8/1994 |
| CA | 2737321 A1 | 11/2011 |
| CA | 2829762 A1 | 9/2012 |
| CA | 2737321 C | 9/2013 |
| CA | 2876687 A1 | 5/2014 |
| CA | 2693567 C | 9/2014 |
| CA | 2919175 A1 | 2/2015 |
| CA | 2964597 A1 | 10/2017 |
| CA | 2876687 C | 4/2019 |
| CA | 2964597 C | 10/2020 |
| CA | 3138533 A1 | 11/2020 |
| CA | 2919175 C | 3/2021 |
| CN | 2622404 Y | 6/2004 |

(56)       References Cited

FOREIGN PATENT DOCUMENTS

| CN | 2779054 | Y | 5/2006 |
| CN | 2890325 | Y | 4/2007 |
| CN | 200964929 | Y | 10/2007 |
| CN | 101323151 | A | 12/2008 |
| CN | 201190660 | Y | 2/2009 |
| CN | 201190892 | Y | 2/2009 |
| CN | 201190893 | Y | 2/2009 |
| CN | 101414171 | A | 4/2009 |
| CN | 201215073 | Y | 4/2009 |
| CN | 201236650 | Y | 5/2009 |
| CN | 201275542 | Y | 7/2009 |
| CN | 201275801 | Y | 7/2009 |
| CN | 201333385 | Y | 10/2009 |
| CN | 201443300 | U | 4/2010 |
| CN | 201496415 | U | 6/2010 |
| CN | 201501365 | U | 6/2010 |
| CN | 201507271 | U | 6/2010 |
| CN | 101323151 | B | 7/2010 |
| CN | 201560210 | U | 8/2010 |
| CN | 201581862 | U | 9/2010 |
| CN | 201610728 | U | 10/2010 |
| CN | 201610751 | U | 10/2010 |
| CN | 201618530 | U | 11/2010 |
| CN | 201661255 | U | 12/2010 |
| CN | 101949382 | A | 1/2011 |
| CN | 201756927 | U | 3/2011 |
| CN | 101414171 | B | 5/2011 |
| CN | 102128011 | A | 7/2011 |
| CN | 102140898 | A | 8/2011 |
| CN | 102155172 | A | 8/2011 |
| CN | 102182904 | A | 9/2011 |
| CN | 202000930 | U | 10/2011 |
| CN | 202055781 | U | 11/2011 |
| CN | 202082265 | U | 12/2011 |
| CN | 202100216 | U | 1/2012 |
| CN | 202100217 | U | 1/2012 |
| CN | 202100815 | U | 1/2012 |
| CN | 202124340 | U | 1/2012 |
| CN | 202140051 | U | 2/2012 |
| CN | 202140080 | U | 2/2012 |
| CN | 202144789 | U | 2/2012 |
| CN | 202144943 | U | 2/2012 |
| CN | 202149354 | U | 2/2012 |
| CN | 102383748 | A | 3/2012 |
| CN | 202156297 | U | 3/2012 |
| CN | 202158355 | U | 3/2012 |
| CN | 202163504 | U | 3/2012 |
| CN | 202165236 | U | 3/2012 |
| CN | 202180866 | U | 4/2012 |
| CN | 202181875 | U | 4/2012 |
| CN | 202187744 | U | 4/2012 |
| CN | 202191854 | U | 4/2012 |
| CN | 202250008 | U | 5/2012 |
| CN | 101885307 | B | 7/2012 |
| CN | 102562020 | A | 7/2012 |
| CN | 202326156 | U | 7/2012 |
| CN | 202370773 | U | 8/2012 |
| CN | 202417397 | U | 9/2012 |
| CN | 202417461 | U | 9/2012 |
| CN | 102729335 | A | 10/2012 |
| CN | 202463955 | U | 10/2012 |
| CN | 202463957 | U | 10/2012 |
| CN | 202467739 | U | 10/2012 |
| CN | 202467801 | U | 10/2012 |
| CN | 202531016 | U | 11/2012 |
| CN | 202544794 | U | 11/2012 |
| CN | 102825039 | A | 12/2012 |
| CN | 202578592 | U | 12/2012 |
| CN | 202579164 | U | 12/2012 |
| CN | 202594808 | U | 12/2012 |
| CN | 202594928 | U | 12/2012 |
| CN | 202596615 | U | 12/2012 |
| CN | 202596616 | U | 12/2012 |
| CN | 102849880 | A | 1/2013 |
| CN | 102889191 | A | 1/2013 |
| CN | 202641535 | U | 1/2013 |
| CN | 202645475 | U | 1/2013 |
| CN | 202666716 | U | 1/2013 |
| CN | 202669645 | U | 1/2013 |
| CN | 202669944 | U | 1/2013 |
| CN | 202671336 | U | 1/2013 |
| CN | 202673269 | U | 1/2013 |
| CN | 202751982 | U | 2/2013 |
| CN | 102963629 | A | 3/2013 |
| CN | 202767964 | U | 3/2013 |
| CN | 202789791 | U | 3/2013 |
| CN | 202789792 | U | 3/2013 |
| CN | 202810717 | U | 3/2013 |
| CN | 202827276 | U | 3/2013 |
| CN | 202833093 | U | 3/2013 |
| CN | 202833370 | U | 3/2013 |
| CN | 102140898 | B | 4/2013 |
| CN | 202895467 | U | 4/2013 |
| CN | 202926404 | U | 5/2013 |
| CN | 202935216 | U | 5/2013 |
| CN | 202935798 | U | 5/2013 |
| CN | 202935816 | U | 5/2013 |
| CN | 202970631 | U | 6/2013 |
| CN | 103223315 | A | 7/2013 |
| CN | 203050598 | U | 7/2013 |
| CN | 103233714 | A | 8/2013 |
| CN | 103233715 | A | 8/2013 |
| CN | 103245523 | A | 8/2013 |
| CN | 103247220 | A | 8/2013 |
| CN | 103253839 | A | 8/2013 |
| CN | 103277290 | A | 9/2013 |
| CN | 103321782 | A | 9/2013 |
| CN | 203170270 | U | 9/2013 |
| CN | 203172509 | U | 9/2013 |
| CN | 203175778 | U | 9/2013 |
| CN | 203175787 | U | 9/2013 |
| CN | 102849880 | B | 10/2013 |
| CN | 203241231 | U | 10/2013 |
| CN | 203244941 | U | 10/2013 |
| CN | 203244942 | U | 10/2013 |
| CN | 203303798 | U | 11/2013 |
| CN | 102155172 | B | 12/2013 |
| CN | 102729335 | B | 12/2013 |
| CN | 103420532 | A | 12/2013 |
| CN | 203321792 | U | 12/2013 |
| CN | 203412658 | U | 1/2014 |
| CN | 203420697 | U | 2/2014 |
| CN | 203480755 | U | 3/2014 |
| CN | 103711437 | A | 4/2014 |
| CN | 203531815 | U | 4/2014 |
| CN | 203531871 | U | 4/2014 |
| CN | 203531883 | U | 4/2014 |
| CN | 203556164 | U | 4/2014 |
| CN | 203558809 | U | 4/2014 |
| CN | 203559861 | U | 4/2014 |
| CN | 203559893 | U | 4/2014 |
| CN | 203560189 | U | 4/2014 |
| CN | 102704870 | B | 5/2014 |
| CN | 203611843 | U | 5/2014 |
| CN | 203612531 | U | 5/2014 |
| CN | 203612843 | U | 5/2014 |
| CN | 203614062 | U | 5/2014 |
| CN | 203614388 | U | 5/2014 |
| CN | 203621045 | U | 6/2014 |
| CN | 203621046 | U | 6/2014 |
| CN | 203621051 | U | 6/2014 |
| CN | 203640993 | U | 6/2014 |
| CN | 203655221 | U | 6/2014 |
| CN | 103899280 | A | 7/2014 |
| CN | 103923670 | A | 7/2014 |
| CN | 203685052 | U | 7/2014 |
| CN | 203716936 | U | 7/2014 |
| CN | 103990410 | A | 8/2014 |
| CN | 103993869 | A | 8/2014 |
| CN | 203754009 | U | 8/2014 |
| CN | 203754025 | U | 8/2014 |
| CN | 203754341 | U | 8/2014 |
| CN | 203756614 | U | 8/2014 |
| CN | 203770264 | U | 8/2014 |

(56) References Cited

FOREIGN PATENT DOCUMENTS

| | | | |
|---|---|---|---|
| CN | 203784519 | U | 8/2014 |
| CN | 203784520 | U | 8/2014 |
| CN | 104057864 | A | 9/2014 |
| CN | 203819819 | U | 9/2014 |
| CN | 203823431 | U | 9/2014 |
| CN | 203835337 | U | 9/2014 |
| CN | 104074500 | A | 10/2014 |
| CN | 203876633 | U | 10/2014 |
| CN | 203876636 | U | 10/2014 |
| CN | 203877364 | U | 10/2014 |
| CN | 203877365 | U | 10/2014 |
| CN | 203877375 | U | 10/2014 |
| CN | 203877424 | U | 10/2014 |
| CN | 203879476 | U | 10/2014 |
| CN | 203879479 | U | 10/2014 |
| CN | 203890292 | U | 10/2014 |
| CN | 203899476 | U | 10/2014 |
| CN | 203906206 | U | 10/2014 |
| CN | 104150728 | A | 11/2014 |
| CN | 104176522 | A | 12/2014 |
| CN | 104196464 | A | 12/2014 |
| CN | 104234651 | A | 12/2014 |
| CN | 203971841 | U | 12/2014 |
| CN | 203975450 | U | 12/2014 |
| CN | 204020788 | U | 12/2014 |
| CN | 204021980 | U | 12/2014 |
| CN | 204024625 | U | 12/2014 |
| CN | 204051401 | U | 12/2014 |
| CN | 204060661 | U | 12/2014 |
| CN | 104260672 | A | 1/2015 |
| CN | 104314512 | A | 1/2015 |
| CN | 204077478 | U | 1/2015 |
| CN | 204077526 | U | 1/2015 |
| CN | 204078307 | U | 1/2015 |
| CN | 204083051 | U | 1/2015 |
| CN | 204113168 | U | 1/2015 |
| CN | 104340682 | A | 2/2015 |
| CN | 104358536 | A | 2/2015 |
| CN | 104369687 | A | 2/2015 |
| CN | 104402178 | A | 3/2015 |
| CN | 104402185 | A | 3/2015 |
| CN | 104402186 | A | 3/2015 |
| CN | 204209819 | U | 3/2015 |
| CN | 204224560 | U | 3/2015 |
| CN | 204225813 | U | 3/2015 |
| CN | 204225839 | U | 3/2015 |
| CN | 104533392 | A | 4/2015 |
| CN | 104563938 | A | 4/2015 |
| CN | 104563994 | A | 4/2015 |
| CN | 104563995 | A | 4/2015 |
| CN | 104563998 | A | 4/2015 |
| CN | 104564033 | A | 4/2015 |
| CN | 204257122 | U | 4/2015 |
| CN | 204283610 | U | 4/2015 |
| CN | 204283782 | U | 4/2015 |
| CN | 204297682 | U | 4/2015 |
| CN | 204299810 | U | 4/2015 |
| CN | 103223315 | B | 5/2015 |
| CN | 104594857 | A | 5/2015 |
| CN | 104595493 | A | 5/2015 |
| CN | 104612647 | A | 5/2015 |
| CN | 104612928 | A | 5/2015 |
| CN | 104632126 | A | 5/2015 |
| CN | 204325094 | U | 5/2015 |
| CN | 204325098 | U | 5/2015 |
| CN | 204326983 | U | 5/2015 |
| CN | 204326985 | U | 5/2015 |
| CN | 204344040 | U | 5/2015 |
| CN | 204344095 | U | 5/2015 |
| CN | 104727797 | A | 6/2015 |
| CN | 204402414 | U | 6/2015 |
| CN | 204402423 | U | 6/2015 |
| CN | 204402450 | U | 6/2015 |
| CN | 103247220 | B | 7/2015 |
| CN | 104803568 | A | 7/2015 |
| CN | 204436360 | U | 7/2015 |
| CN | 204457524 | U | 7/2015 |
| CN | 204472485 | U | 7/2015 |
| CN | 204473625 | U | 7/2015 |
| CN | 204477303 | U | 7/2015 |
| CN | 204493095 | U | 7/2015 |
| CN | 204493309 | U | 7/2015 |
| CN | 103253839 | B | 8/2015 |
| CN | 104820372 | A | 8/2015 |
| CN | 104832093 | A | 8/2015 |
| CN | 104863523 | A | 8/2015 |
| CN | 204552723 | U | 8/2015 |
| CN | 204553866 | U | 8/2015 |
| CN | 204571831 | U | 8/2015 |
| CN | 204703814 | U | 10/2015 |
| CN | 204703833 | U | 10/2015 |
| CN | 204703834 | U | 10/2015 |
| CN | 105092401 | A | 11/2015 |
| CN | 103233715 | B | 12/2015 |
| CN | 103790927 | B | 12/2015 |
| CN | 105207097 | A | 12/2015 |
| CN | 204831952 | U | 12/2015 |
| CN | 204899777 | U | 12/2015 |
| CN | 102602323 | B | 1/2016 |
| CN | 105240064 | A | 1/2016 |
| CN | 204944834 | U | 1/2016 |
| CN | 205042127 | U | 2/2016 |
| CN | 205172478 | U | 4/2016 |
| CN | 103993869 | B | 5/2016 |
| CN | 105536299 | A | 5/2016 |
| CN | 105545207 | A | 5/2016 |
| CN | 205260249 | U | 5/2016 |
| CN | 103233714 | B | 6/2016 |
| CN | 104340682 | B | 6/2016 |
| CN | 205297518 | U | 6/2016 |
| CN | 205298447 | U | 6/2016 |
| CN | 205391821 | U | 7/2016 |
| CN | 205400701 | U | 7/2016 |
| CN | 103277290 | B | 8/2016 |
| CN | 104260672 | B | 8/2016 |
| CN | 205477370 | U | 8/2016 |
| CN | 205479153 | U | 8/2016 |
| CN | 205503058 | U | 8/2016 |
| CN | 205503068 | U | 8/2016 |
| CN | 205503089 | U | 8/2016 |
| CN | 105958098 | A | 9/2016 |
| CN | 205599180 | U | 9/2016 |
| CN | 106121577 | A | 11/2016 |
| CN | 205709587 | U | 11/2016 |
| CN | 104612928 | B | 12/2016 |
| CN | 106246120 | A | 12/2016 |
| CN | 205805471 | U | 12/2016 |
| CN | 106321045 | A | 1/2017 |
| CN | 205858306 | U | 1/2017 |
| CN | 106438310 | A | 2/2017 |
| CN | 205937833 | U | 2/2017 |
| CN | 104563994 | B | 3/2017 |
| CN | 206129196 | U | 4/2017 |
| CN | 104369687 | B | 5/2017 |
| CN | 106715165 | A | 5/2017 |
| CN | 106761561 | A | 5/2017 |
| CN | 104820372 | B | 6/2017 |
| CN | 105240064 | B | 6/2017 |
| CN | 206237147 | U | 6/2017 |
| CN | 206287832 | U | 6/2017 |
| CN | 206346711 | U | 7/2017 |
| CN | 104563995 | B | 9/2017 |
| CN | 107120822 | A | 9/2017 |
| CN | 107143298 | A | 9/2017 |
| CN | 107159046 | A | 9/2017 |
| CN | 107188018 | A | 9/2017 |
| CN | 206496016 | U | 9/2017 |
| CN | 104564033 | B | 10/2017 |
| CN | 107234358 | A | 10/2017 |
| CN | 107261975 | A | 10/2017 |
| CN | 206581929 | U | 10/2017 |
| CN | 105092401 | B | 12/2017 |
| CN | 107476769 | A | 12/2017 |
| CN | 107520526 | A | 12/2017 |

(56) References Cited

FOREIGN PATENT DOCUMENTS

| | | | |
|---|---|---|---|
| CN | 206754664 U | 12/2017 |
| CN | 107605427 A | 1/2018 |
| CN | 106438310 B | 2/2018 |
| CN | 107654196 A | 2/2018 |
| CN | 107656499 A | 2/2018 |
| CN | 107728657 A | 2/2018 |
| CN | 206985503 U | 2/2018 |
| CN | 207017968 U | 2/2018 |
| CN | 107849130 A | 3/2018 |
| CN | 107859053 A | 3/2018 |
| CN | 207057867 U | 3/2018 |
| CN | 207085817 U | 3/2018 |
| CN | 105545207 B | 4/2018 |
| CN | 107883091 A | 4/2018 |
| CN | 107902427 A | 4/2018 |
| CN | 107939290 A | 4/2018 |
| CN | 107956708 A | 4/2018 |
| CN | 207169595 U | 4/2018 |
| CN | 207194873 U | 4/2018 |
| CN | 207245674 U | 4/2018 |
| CN | 108034466 A | 5/2018 |
| CN | 108036071 A | 5/2018 |
| CN | 108087050 A | 5/2018 |
| CN | 207380566 U | 5/2018 |
| CN | 108103483 A | 6/2018 |
| CN | 108179046 A | 6/2018 |
| CN | 108254276 A | 7/2018 |
| CN | 108311535 A | 7/2018 |
| CN | 207583576 U | 7/2018 |
| CN | 207634064 U | 7/2018 |
| CN | 207648054 U | 7/2018 |
| CN | 207650621 U | 7/2018 |
| CN | 108371894 A | 8/2018 |
| CN | 207777153 U | 8/2018 |
| CN | 108547601 A | 9/2018 |
| CN | 108547766 A | 9/2018 |
| CN | 108555826 A | 9/2018 |
| CN | 108561098 A | 9/2018 |
| CN | 108561750 A | 9/2018 |
| CN | 108590617 A | 9/2018 |
| CN | 207813495 U | 9/2018 |
| CN | 207814698 U | 9/2018 |
| CN | 207862275 U | 9/2018 |
| CN | 108687954 A | 10/2018 |
| CN | 207935270 U | 10/2018 |
| CN | 207961582 U | 10/2018 |
| CN | 207964530 U | 10/2018 |
| CN | 108789848 A | 11/2018 |
| CN | 108799473 A | 11/2018 |
| CN | 108868675 A | 11/2018 |
| CN | 208086829 U | 11/2018 |
| CN | 208089263 U | 11/2018 |
| CN | 208169068 U | 11/2018 |
| CN | 108979569 A | 12/2018 |
| CN | 109027662 A | 12/2018 |
| CN | 109058092 A | 12/2018 |
| CN | 208179454 U | 12/2018 |
| CN | 208179502 U | 12/2018 |
| CN | 208253147 U | 12/2018 |
| CN | 208260574 U | 12/2018 |
| CN | 109114418 A | 1/2019 |
| CN | 109141990 A | 1/2019 |
| CN | 208313120 U | 1/2019 |
| CN | 208330319 U | 1/2019 |
| CN | 208342730 U | 1/2019 |
| CN | 208430982 U | 1/2019 |
| CN | 208430986 U | 1/2019 |
| CN | 109404274 A | 3/2019 |
| CN | 109429610 A | 3/2019 |
| CN | 109491318 A | 3/2019 |
| CN | 109515177 A | 3/2019 |
| CN | 109526523 A | 3/2019 |
| CN | 109534737 A | 3/2019 |
| CN | 208564504 U | 3/2019 |
| CN | 208564516 U | 3/2019 |
| CN | 208564525 U | 3/2019 |
| CN | 208564918 U | 3/2019 |
| CN | 208576026 U | 3/2019 |
| CN | 208576042 U | 3/2019 |
| CN | 208650818 U | 3/2019 |
| CN | 208669244 U | 3/2019 |
| CN | 109555484 A | 4/2019 |
| CN | 109682881 A | 4/2019 |
| CN | 208730959 U | 4/2019 |
| CN | 208735264 U | 4/2019 |
| CN | 208746733 U | 4/2019 |
| CN | 208749529 U | 4/2019 |
| CN | 208750405 U | 4/2019 |
| CN | 208764658 U | 4/2019 |
| CN | 109736740 A | 5/2019 |
| CN | 109751007 A | 5/2019 |
| CN | 208868428 U | 5/2019 |
| CN | 208870761 U | 5/2019 |
| CN | 109869294 A | 6/2019 |
| CN | 109882144 A | 6/2019 |
| CN | 109882372 A | 6/2019 |
| CN | 209012047 U | 6/2019 |
| CN | 209100025 U | 7/2019 |
| CN | 110080707 A | 8/2019 |
| CN | 110118127 A | 8/2019 |
| CN | 110124574 A | 8/2019 |
| CN | 110145277 A | 8/2019 |
| CN | 110145399 A | 8/2019 |
| CN | 110152552 A | 8/2019 |
| CN | 110155193 A | 8/2019 |
| CN | 110159225 A | 8/2019 |
| CN | 110159432 A | 8/2019 |
| CN | 110159433 A | 8/2019 |
| CN | 110208100 A | 9/2019 |
| CN | 110252191 A | 9/2019 |
| CN | 110284854 A | 9/2019 |
| CN | 110284972 A | 9/2019 |
| CN | 209387358 U | 9/2019 |
| CN | 110374745 A | 10/2019 |
| CN | 209534736 U | 10/2019 |
| CN | 110425105 A | 11/2019 |
| CN | 110439779 A | 11/2019 |
| CN | 110454285 A | 11/2019 |
| CN | 110454352 A | 11/2019 |
| CN | 110467298 A | 11/2019 |
| CN | 110469312 A | 11/2019 |
| CN | 110469314 A | 11/2019 |
| CN | 110469405 A | 11/2019 |
| CN | 110469654 A | 11/2019 |
| CN | 110485982 A | 11/2019 |
| CN | 110485983 A | 11/2019 |
| CN | 110485984 A | 11/2019 |
| CN | 110486249 A | 11/2019 |
| CN | 110500255 A | 11/2019 |
| CN | 110510771 A | 11/2019 |
| CN | 110513097 A | 11/2019 |
| CN | 209650738 U | 11/2019 |
| CN | 209653968 U | 11/2019 |
| CN | 209654004 U | 11/2019 |
| CN | 209654022 U | 11/2019 |
| CN | 209654128 U | 11/2019 |
| CN | 209656622 U | 11/2019 |
| CN | 107849130 B | 12/2019 |
| CN | 108087050 B | 12/2019 |
| CN | 110566173 A | 12/2019 |
| CN | 110608030 A | 12/2019 |
| CN | 110617187 A | 12/2019 |
| CN | 110617188 A | 12/2019 |
| CN | 110617318 A | 12/2019 |
| CN | 209740823 U | 12/2019 |
| CN | 209780827 U | 12/2019 |
| CN | 209798631 U | 12/2019 |
| CN | 209799942 U | 12/2019 |
| CN | 209800178 U | 12/2019 |
| CN | 209855723 U | 12/2019 |
| CN | 209855742 U | 12/2019 |
| CN | 209875063 U | 12/2019 |
| CN | 110656919 A | 1/2020 |
| CN | 107520526 B | 2/2020 |

(56) References Cited

FOREIGN PATENT DOCUMENTS

| | | | |
|----|----------------|---|---------|
| CN | 110787667 A | | 2/2020 |
| CN | 110821464 A | | 2/2020 |
| CN | 110833665 A | | 2/2020 |
| CN | 110848028 A | | 2/2020 |
| CN | 210049880 U | | 2/2020 |
| CN | 210049882 U | | 2/2020 |
| CN | 210097596 U | | 2/2020 |
| CN | 210105817 U | | 2/2020 |
| CN | 210105818 U | | 2/2020 |
| CN | 210105993 U | | 2/2020 |
| CN | 110873093 A | | 3/2020 |
| CN | 210139911 U | | 3/2020 |
| CN | 110947681 A | | 4/2020 |
| CN | 111058810 A | | 4/2020 |
| CN | 111075391 A | | 4/2020 |
| CN | 210289931 U | | 4/2020 |
| CN | 210289932 U | | 4/2020 |
| CN | 210289933 U | | 4/2020 |
| CN | 210303516 U | | 4/2020 |
| CN | 111089003 A | | 5/2020 |
| CN | 111151186 A | | 5/2020 |
| CN | 111167769 A | | 5/2020 |
| CN | 111169833 A | | 5/2020 |
| CN | 111173476 A | | 5/2020 |
| CN | 111185460 A | | 5/2020 |
| CN | 111185461 A | | 5/2020 |
| CN | 111188763 A | | 5/2020 |
| CN | 111206901 A | | 5/2020 |
| CN | 111206992 A | | 5/2020 |
| CN | 111206994 A | | 5/2020 |
| CN | 210449044 U | | 5/2020 |
| CN | 210460875 U | | 5/2020 |
| CN | 210522432 U | | 5/2020 |
| CN | 210598943 U | | 5/2020 |
| CN | 210598945 U | | 5/2020 |
| CN | 210598946 U | | 5/2020 |
| CN | 210599194 U | | 5/2020 |
| CN | 210599303 U | | 5/2020 |
| CN | 210600110 U | | 5/2020 |
| CN | 111219326 A | | 6/2020 |
| CN | 111350595 A | | 6/2020 |
| CN | 210660319 U | | 6/2020 |
| CN | 210714569 U | | 6/2020 |
| CN | 210769168 U | | 6/2020 |
| CN | 210769169 U | | 6/2020 |
| CN | 210769170 U | | 6/2020 |
| CN | 210770133 U | | 6/2020 |
| CN | 210825844 U | | 6/2020 |
| CN | 210888904 U | | 6/2020 |
| CN | 210888905 U | | 6/2020 |
| CN | 210889242 U | | 6/2020 |
| CN | 111397474 A | | 7/2020 |
| CN | 111412064 A | | 7/2020 |
| CN | 111441923 A | | 7/2020 |
| CN | 111441925 A | | 7/2020 |
| CN | 111503517 A | | 8/2020 |
| CN | 111515898 A | | 8/2020 |
| CN | 111594059 A | | 8/2020 |
| CN | 111594062 A | | 8/2020 |
| CN | 111594144 A | | 8/2020 |
| CN | 211201919 U | | 8/2020 |
| CN | 211201920 U | | 8/2020 |
| CN | 211202218 U | | 8/2020 |
| CN | 111608965 A | | 9/2020 |
| CN | 111664087 A | | 9/2020 |
| CN | 111677476 A | | 9/2020 |
| CN | 111677647 A | | 9/2020 |
| CN | 111692064 A | | 9/2020 |
| CN | 111692065 A | | 9/2020 |
| CN | 211384571 U | | 9/2020 |
| CN | 211397553 U | | 9/2020 |
| CN | 211397677 U | | 9/2020 |
| CN | 211412945 U | | 9/2020 |
| CN | 211500955 U | | 9/2020 |
| CN | 211524765 U | | 9/2020 |
| DE | 4004854 A1 | | 8/1991 |
| DE | 4241614 A1 | | 6/1994 |
| DE | 102009022859 A1 | | 12/2010 |
| DE | 102012018825 A1 | | 3/2014 |
| DE | 102013114335 A1 | | 11/2014 |
| DE | 102013111655 A1 | | 12/2014 |
| DE | 102015103872 A1 | | 10/2015 |
| DE | 102013114335 B4 | | 12/2020 |
| EP | 0835983 A2 | | 4/1998 |
| EP | 1378683 A2 | | 1/2004 |
| EP | 1378683 A3 | | 8/2004 |
| EP | 2143916 A1 | | 1/2010 |
| EP | 2613023 A2 | | 7/2013 |
| EP | 3049642 A1 | | 8/2016 |
| EP | 3095989 A1 | | 11/2016 |
| EP | 3211766 A1 | | 8/2017 |
| EP | 3049642 B1 | | 4/2018 |
| EP | 3354866 A1 | | 8/2018 |
| EP | 3075946 B1 | | 5/2019 |
| FR | 2795774 A1 | | 1/2001 |
| GB | 474072 A | | 10/1937 |
| GB | 1438172 A | | 6/1976 |
| JP | S57135212 A | | 8/1982 |
| KR | 20020026398 A | | 4/2002 |
| RU | 13562 U1 | | 4/2000 |
| WO | WO-9320328 A1 | | 10/1993 |
| WO | WO-2006025886 A2 | | 3/2006 |
| WO | WO-2009023042 A1 | | 2/2009 |
| WO | WO-2011133821 A2 | | 10/2011 |
| WO | WO-2012139380 A1 | | 10/2012 |
| WO | WO-2013158822 A1 | | 10/2013 |
| WO | WO-2013163786 A1 | | 11/2013 |
| WO | WO-2013185399 A1 | | 12/2013 |
| WO | WO-2015158020 A1 | | 10/2015 |
| WO | WO-2016014476 A1 | | 1/2016 |
| WO | WO-2016033983 A1 | | 3/2016 |
| WO | WO-2016078181 A1 | | 5/2016 |
| WO | WO-2016101374 A1 | | 6/2016 |
| WO | WO-2016112590 A1 | | 7/2016 |
| WO | WO-2016186790 A1 | | 11/2016 |
| WO | WO-2017123656 A2 | | 7/2017 |
| WO | WO-2017146279 A1 | | 8/2017 |
| WO | WO-2017123656 A3 | | 10/2017 |
| WO | WO-2017213848 A1 | | 12/2017 |
| WO | WO-2018031029 A1 | | 2/2018 |
| WO | WO-2018031031 A1 | | 2/2018 |
| WO | WO-2018038710 A1 | | 3/2018 |
| WO | WO-2018044293 A1 | | 3/2018 |
| WO | WO-2018044307 A1 | | 3/2018 |
| WO | WO-2018071738 A1 | | 4/2018 |
| WO | WO-2018075034 A1 | | 4/2018 |
| WO | WO-2018101909 A1 | | 6/2018 |
| WO | WO-2018101912 A1 | | 6/2018 |
| WO | WO-2018106210 A1 | | 6/2018 |
| WO | WO-2018106225 A1 | | 6/2018 |
| WO | WO-2018106252 A1 | | 6/2018 |
| WO | WO-2018132106 A1 | | 7/2018 |
| WO | WO-2018156131 A1 | | 8/2018 |
| WO | WO-2018187346 A1 | | 10/2018 |
| WO | WO-2019045691 A1 | | 3/2019 |
| WO | WO-2019046680 A1 | | 3/2019 |
| WO | WO-2019060922 A1 | | 3/2019 |
| WO | WO-2019117862 A1 | | 6/2019 |
| WO | WO-2019126742 A1 | | 6/2019 |
| WO | WO-2019147601 A1 | | 8/2019 |
| WO | WO-2019169366 A1 | | 9/2019 |
| WO | WO-2019195651 A1 | | 10/2019 |
| WO | WO-2019200510 A1 | | 10/2019 |
| WO | WO-2019210417 A1 | | 11/2019 |
| WO | WO-2020018068 A1 | | 1/2020 |
| WO | WO-2020046866 A1 | | 3/2020 |
| WO | WO-2020072076 A1 | | 4/2020 |
| WO | WO-2020076569 A1 | | 4/2020 |
| WO | WO-2020097060 A2 | | 5/2020 |
| WO | WO-2020104088 A1 | | 5/2020 |
| WO | WO-2020131085 A1 | | 6/2020 |
| WO | WO-2020211083 A1 | | 10/2020 |

(56) References Cited

FOREIGN PATENT DOCUMENTS

WO        WO-2020211086 A1    10/2020
WO        WO-2021038604 A1     3/2021
WO        WO-2021041783 A1     3/2021

OTHER PUBLICATIONS

US 11,555,493 B2, 01/2023, Chang et al. (withdrawn)
4-Star Hose & Supply: "Frac Tank Hose (FRAC)," 1 Page, [Retrieved on Nov. 10, 2019] Retrieved from URL: http://www.4starhose.com/product/frac_tank_hose_frac.aspx.
AFD Petroleum Ltd: "Automated Hot Zone Frac Refueling System," Dec. 2018, 2 Pages.
Afglobal Corporation: "Durastim Hydraulic Fracturing Pump," A Revolutionary Design for Continuous Duty Hydraulic Fracturing, 2018, 4 Pages.
Ahmadzadehtalatapeh M., et al., Performance Enhancement of Gas Turbine Units by Retrofitting With Inlet Air Cooling Technologies (IACTs): An Hour-by-Hour Simulation Study, Journal of the Brazilian Society of Mechanical Sciences and Engineering, Mar. 2020, 29 Pages.
Akita E., et al., "Mewbourne College of Earth & Energy," Society of Petroleum Engineers, Drilling Systems Automation Technical Section (DSATS), 2019, 105 Pages.
American Petroleum Institute: "Gas Turbines for the Petroleum, Chemical, and Gas Industry Services," API Standard 616, Fifth Edition, API Publishing Services, Washington, DC, Jan. 2011, 177 Pages.
American Petroleum Institute: "Positive Displacement Pumps-Reciprocating," API Standard 674, Third Edition, API Publishing Services, Washington, D.C, Dec. 2010, 104 Pages.
API: "2011 Publications Programs and Services," American Petroleum Institute, 2011, 260 Pages.
API: "About API," American Petroleum Institute, 8 Pages, Retrieved on [Dec. 30, 2021] Retrieved from URL: https://www.api.org/about.
"API's Global Industry Services," American Petroleum Institute, Copyright Aug. 2020, 2 Pages.
API Standard 671: "Special-Purpose Couplings for Petroleum, Chemical, and Gas Industry Services," 4th Edition, Sep. 2010, 64 Pages, (Aug. 2007).
Arop J.B., "Geomechanical Review of Hydraulic Fracturing Technology," Thesis (M. Eng) Massachusetts Institute of Technology, Department of Civil and Environmental Engineering, Cambridge, MA, Oct. 29, 2013, 291 Pages, Retrieved from URL: https://dspace.mit.edu/handle/1721.1/82176.
Atlas: "On-Site Fuel Services and Mobile Fuel Delivery," atlasoil.com, Mar. 6, 2019, 3 Pages, Retrieved from URL: https://www.atlasoil.com/nationwide-fueling/onsite-and-mobile-fueling.
Beer F.P., et al., "Mechanics of Materials," 6th Edition, McGraw Hill, 2012, 838 Pages.
Boman K., "Turbine Technology Powers Green Field Multi-Fuel Frack Pump," Rigzone, Mar. 7, 2015, 5 Pages, [Retrieved on Mar. 14, 2015] Retrieved from URL: https://web.archive.org/web/20150314203227/https://www.rigzone.com/news/oil-gas/a/124883/Turbine_Technology_Powers_Green_Field_MultiFuel_Frack_Pump.
Cabling: "Business Week: Fiber-Optic Cables Help Fracking," Cablinginstall.com, Jul. 12, 2013, 10 Pages, Retrieved from URL: https://www.cablinginstall.com/cable/article/16474208/businessweek-fiberoptic-cables-help-fracking.
Cameron Schlumberger Company: "Frac Manifold Systems," 2016, 16 Pages.
Candyne Pump Services Inc: "Q700 Pump," Weatherford, Calgary, Alberta, Canada, Aug. 15, 2015, 2 Pages, Retrieved from URL: http://candyne.com/wp-content/uploads/2014/10/181905-94921.q700-quintuplex-pump.pdf.
Capstone Turbine Corporation: "Capstone Receives Three Megawatt Order from Large Independent Oil & Gas Company in Eagle Ford Shale Play," Dec. 7, 2010, 2 Pages.

Chaichan M.T., "The Impact of Equivalence Ratio on Performance and Emissions of a Hydrogen-Diesel Dual Fuel Engine With Cooled Exhaust Gas Recirculation," International Journal of Scientific & Engineering Research, Jun. 2015, vol. 6, No. 6, pp. 938-941.
CNG Delivery: "Fracturing With Natural Gas, Dual-Fuel Drilling With CNG," Aug. 22, 2019, 7 Pages.
Cooper B., et al., "Jet Frac Porta-Skid—A New Concept in Oil Field Service Pump Equipment," Society of Petroleum Engineers of AIME, SPE-2706, Sep. 28-Oct. 1, 1969, 10 Pages.
De Gevigney J.D., et al., "Analysis of No-Load Dependent Power Losses in a Planetary Gear Train by Using Thermal Network Method," International Gear Conference 2014, Lyon, Aug. 26-28, 2014, pp. 615-624.
Dowell: "B908 Turbine Pumper," Operator's Manual, 9 Pages.
Dziubak T., "Experimental Studies of Dust Suction Irregularity from Multi-Cyclone Dust Collector of Two-Stage Air Filter," Energies, Jun. 16, 2021, vol. 14, No. 3577, 28 Pages.
Eberhard M., "Fracture Design and Stimulation: Monitoring Well Construction & Operations technical workshop In support of the EPA Hydraulic Fracturing Study," Halliburton, Mar. 10-11, 2011, 24 Pages.
Ecob D.J., et al., "Design and Development of a Landfill Gas Combustion System for the Typhoon Gas Turbine," ASME 1996 International Gas Turbine and Aeroengine Congress and Exhibition, American Society of Mechanical Engineers Digital Collection, Jun. 10-13, 1996, 8 Pages.
empengineering.com: "Hemp Resistant Electrical Generators / Hardened Structures HEMP/GMD Shielded Generators," Virginia, Nov. 3, 2012, 6 Pages.
energy.gov: "The Water-Energy Nexus: Challenges and Opportunities," Department of Energy, United States of America, Jun. 2014, 262 Pages, purenergypolicy.org.
Europump and Hydrualic Institute: "Variable Speed Pumping: A Guide to Successful Applications," Elsevier Ltd, 2004, 186 Pages.
Eygun C., et al., "Mitigating Shale Gas Developments Carbon Footprint: Evaluating and Implementing Solutions in Argentina," URTeC: 2687987, Copyright 2017, Unconventional Resources Technology Conference held in Austin, Texas, USA, Jul. 24-26, 2017, 14 Pages.
Filipovic I., et al., "Preliminary Selection of Basic Parameters of Different Torsional Vibration Dampers Intended for use in Medium-Speed Diesel Engines," Transactions of Famena XXXVI-3, 2012, 10 Pages.
Final Written decision of PGR2021-00102, dated Feb. 6, 2023, 43 Pages.
Final written decision of PGR2021-00103, dated Feb. 6, 2023, 40 Pages.
FMC Technologies: "Operation and Maintenance Manual, L06 Through L16 Triplex Pumps," Doc No. OMM50000903 Rev: E, Aug. 27, 2009, 66 Pages.
Frac Shack: "Bi-Fuel FracFueller," Brochure, 2011, 2 Pages.
FTS International: FTS International's Dual Fuel Hydraulic Fracturing Equipment Increases Operational Efficiencies, Provides Cost Benefits, Jan. 3, 2018, 3 Pages.
Gardner Denver: "GD-3000 Well Service Pump," Gardner Denver Hydraulic Fracturing Pumps, 2 Pages, Retrieved from URL: https://www.gardnerdenver.comien-usipumpsitriplex-fracking-pump-gd-3000.
Ginter T., et al., "Uprate Options for the MS6001 Heavy Duty Gas Turbine," GE paper GER-3808C, GE Energy 12, 2006, 64 Pages.
Gladstein: "High Horsepower HHP Summit 2012," Review of HHP Summit 2012, Gladstein, Neandross & Associates, Sep. 26-28, 2012, 4 Pages, Retrieved from URL: https://www.gladstein.orgigna-conferences/high-horsepower-summit-2012/.
Green Field Energy Services: "Green Field Energy Services Deploys Third New Hydraulic Fracturing Spread," Jul. 11, 2012, 3 Pages, Retrieved from URL: https://www.prnewswire.cominews-releases/green-field-energy-services-deploys-third-new-hydraulic-facturing-spread-162113425.
Green Field Energy Services: "Green Field Energy Services Natural Gas Driven Turbine Frac Pumps," HHP Summit Presentation, Yumpu, Sep. 2012, 15 Pages, (Green Field), Retrieved from URL: https://www.yumpu.com/en/document/read/49685291/turbine-frac-pump-assembly-hhp.

(56)        References Cited

OTHER PUBLICATIONS

Halliburton: "Vessel-Based Modular Solution," Production Enhancement, 2015, 4 Pages.

Hausfeld T., et al., "TM2500+ Power for Hydraulic Fracturing," Evolution Well Services, GE Imagination at Work, 2013, 20 Pages.

HHP Summit 2012: "Natural Gas for High Horsepower Applications," High Horsepower Summit Agenda, Sep. 5, 2012, 8 Pages.

Hydrocarbons Technology: "Mee Industries: Inlet Air Fogging Systems for Oil, Gas and Petrochemical Processing," Verdict Media Limited, Copyright 2020, 2 Pages.

Ibragimov E.S., "Use of Gas-Turbine Engines in Oil Field Pumping Units," Chemical and Petroleum Engineering, 1994, vol. 30, pp. 530-532, (Translated from Khimicheskaya i Neftyanoe Mashinostroenie, Nov. 1994, No. 11, pp. 24-26).

Ide N., "The Right Valve for Controlling Flow Direction? Check.," Swagelok, Oct. 27, 2016, 7 Pages.

IHS Markit Standards Store: "Positive Displacement Pumps Reciprocating," API STD 674, 3rd Edition, Dec. 2010, [Retrieved on Dec. 30, 2021] Retrieved from URL: https://global.ihs.com/doc_detail.cfm?document_name=API%20STD%20674&item_s_key=00010672#doc-detail-history-anchor and "Special Purpose Coupling for Petroleum, Chemical, and Gas Industry Services," API STD 671, 4th Edition, Aug. 2007, 6 Pages, [Retrieved on Dec. 30, 2021] Retrieved from URL: https://global.ihs.com/doc_detail.cfm?&input_doc_number=671&input_doc_title=&document_name=API%20STD%20671&item_s_key=00010669&item_key_date=890331&origin=DSSC.

II-VI Marlow Blog: "Thermoelectric Technologies in Oil, Gas, and Mining Industries," II-VI Marlow Industries, Jul. 24, 2019, 7 Pages, (blog.marlow.com).

Integrated Flow: "Modular Process Skid Manufacturers," Jul. 15, 2017, 6 Pages, Retrieved from URL: https://ifsolutions.com/why-modular/.

International Search Report and Written Opinion for International Application No. PCT/US2022/030647, mailed Oct. 7, 2022, 16 Pages.

ISM: "What is Cracking Pressure," Jun. 4, 2019, 9 Pages.

JBG Enterprises Inc: "WS-Series Blowout Prevention Safety Coupling-Quick Release Couplings," Sep. 11, 2015, 8 Pages, Retrieved from URL: http://www.jgbhose.com/products/WS-Series-Blowout-Prevention-Safety-Coupling.asp.

Jereh Group: "35% Economy Increase, Dual-fuel System Highlighting Jereh Apollo Frac Pumper," Apr. 13, 2015, 2 Pages, Retrieved from URL: https://www.jereh.com/en/news/press-release/news-detail-7345.html.

Jereh Group: "Jereh Apollo 4500 Turbine Frac Pumper Finishes Successful Field Operation in China," Feb. 13, 2015, 2 Pages, [Retrieved on 2015-04-20] Retrieved from URL: https://web.archive.org/web/20150420220625/https://www.prnewswire.com/news-releases/jereh-apollo-4500-turbine-frac-pumper-finishes-successful-field-operation-in-china-300035829.html.

Jereh Group: "Jereh Apollo Turbine Fracturing Pumper Featured on China Central Television," Mar. 9, 2018, 2 Pages, Retrieved from URL: https://www.jereh.com/en/news/press-release/news-detail-7267.html.

Jereh Group: "Jereh Unveiled New Electric Fracturing Solution at OTC 2019," May 7, 2019, 3 Pages, [Retrieved on 2019-05-28] Retrieved from URL: https://web.archive.org/web/20190528183906/https://www.prnewswire.com/news-releases/jereh-unveiled-new-electric-fracturing-solution-at-otc-2019-300845028.html.

Jereh Oilfield Services Group: "Jereh Debut's Super Power Turbine Fracturing Pump, Leading the Industrial Revolution," Jereh Oilfield Services Group, Mar. 19, 2014, 3 Pages, Retrieved from URL: https://www.prnewswire.com/news-releases/jereh-debuts-super-power-turbine-fracturing-pump-leading-the-industrial-revolution-250992111.html.

Karassik I.J., et al., "Pump Handbook," 4th Edition, McGraw-Hill Education, New York, 2008, 431 Pages.

Kas'yanov A.D., et al., "Application of Gas-turbine Engines in Pumping Units Complexes of Hydraulic Fracturing of Oil and Gas Reservoirs," Exposition Oil & Gas, Oct. 24, 2012, 3 Pages, (Published in Russian).

Lekontsev Y.M., et al., "Two-Side Sealer Operation," Journal of Mining Science, 2013, vol. 49, No. 5, pp. 757-762.

Lord Sensing: "Advances in Popular Torque-Link Solution Offer OEMs Greater Benefit," Jun. 21, 2018, 1 Page.

Mahlalela B.M., et al., "Electric Power Generation Potential Based on Waste Heat and Geothermal Resources in South Africa," Proceedings 44th Workshop on Geothermal Reservoir Engineering, pangea.Stanford.edu, Feb. 11-13, 2019, 13 Pages.

Mancuso J., "General Purpose vs Special Purpose Couplings," Proceedings of the Twenty-Third TurboMachinery Symposium, 1994, 12 Pages.

Mancuso J.R et al., "The Application of Flexible Couplings for Turbomachinery," Proceedings of the Eighteenth Turbomachinery Symposium, 1989, 24 Pages.

Marine Turbine Technologies: "1 MW Power Generation Package," The Leader in Turbine Technology, 2017, 9 Pages, Retrieved from URL: http://marineturbine.com/power-generation.

Marine Turbine Technologies: "Turbine Powered Frac Units," Marine Turbine, Franklin, Louisiana, 2020, 15 Pages.

Minovski B., "Coupled Simulations of Cooling and Engine Systems for Unsteady Analysis of the Benefits of Thermal Engine Encapsulation," Department of Applied Mechanics, Chalmers University of Technology, Goteborg, Sweden, 2015, 47 Pages.

Moliere M., et al., "Heavy Duty Gas Turbines in Petrochemical Plants: Samsung's Daesan Plant (Korea) Beats Fuel Flexibility Records With Over 95% Hydrogen in Process Gas," Proceedings of PowerGen Asia Conference, Singapore, Sep. 1999, 7 Pages.

Mutua D.C., et al., "Fracking Companies Switch to Electric Motors to Power Pumps," iadd-intl.org, International Association of Diecutting and Diemaking in Houston, Texas, USA, Jun. 27, 2019, 5 Pages, Retrieved from URL: https://www.iadd-intl.org/articlesffracking-companies-switch-to-electric-motors-to-power-pumps/.

Neal J.C., (Gulf Oil Corp Odessa Texas)., "Gas Turbine Driven Centrifugal Pumps for High Pressure Water Injection," American Institute of Mining, Metallurgical and Petroleum Engineers, Inc, SPE-1888-MS, 1967, 2 Pages.

nooutage.com LLC: "PowerShelter Kit II," Sep. 6, 2019, 4 Pages.

"Overview of Industry Guidance/Best Practices on Hydraulic Fracturing (HF)," American Petroleum Institute, 2012, 3 Pages.

PBNG: "Natural Gas Fuel for Drilling and Hydraulic Fracturing," Diesel Displacement / Dual Fuel & Bi-Fuel, May 2014, 8 Pages.

Pettigrew D., et al., "High Pressure Multi-Stage Centrifugal Pump for 10,000 psi Frac Pump-HPHPS FRAC Pump," Society of Petroleum Engineers, SPE 166191, Copyright 2013, SPE Annual Technical Conference and Exhibition held in New Orleans, Louisiana, USA, Sep. 30-Oct. 2, 2013, 8 Pages.

Porteiro J., et al., "Feasibility of a New Domestic CHP Trigeneration With Heat Pump: II. Availability Analysis," Design and Development, Applied Thermal Engineering, 2004, vol. 24, pp. 1421-1429.

Porter J.A., (Solar Division International Harvester Co.)., "Modern Industrial Gas Turbines for the Oil Field," American Petroleum Institute, Drilling and Production Practice, Solar Division International Harvester Co, API-67-243, Jan. 1, 1967, 2 Pages.

"Procedures for Standards Development," American Petroleum Institute, Third Edition, May 2006, 24 Pages, (Sep. 2006).

RESEARCHGATE: "Answer by Byron Woolridge," AES Deepwater Inc, Jan. 1, 2013, 1 Page, Retrieved from URL: https://www.researchgate.net/post/How_can_we_improve_the_efficiency_ofthe_gas_turbine_cycles.

Rigmaster Machinery Ltd: "Model: 2000 RMP-6-PLEX," Brochure, 5 Pages, Retrieved from URL: https://www.rigmastermachinery.com/_files/ugd/431e62_eaecd77c9fe54af8b13d08396072da67.pdf.

Rotating Right: "Quintuplex Power Pump Model Q700," Weatherford International Ltd, Edmonton, Alberta, Canada, 2021, 2 Pages, Retrieved from URL: https://www.rotatingrightcom/pdf/weatherford/RR%2026-Weatherford%20Model%20Q700.

Scott K., "Honghua Developing New-Generation Shale-Drilling Rig, Plans Testing of Frac Pump," Drilling Contractor, May 23,

(56)　　　　References Cited

OTHER PUBLICATIONS 2013, 4 Pages, Retrieved from URL: https://www.drillingcontractor. org/honghua-developing-new-generation-shale-drilling-rig-plans-testing-of-frac-pump-23278.

Seybold E., et al., "Evolution of Dual Fuel Pressure Pumping for Fracturing: Methods, Economics, Field Trial Results and Improvements in Availability of Fuel," Society of Petroleum Engineers, SPE 166443, Copyright 2013, SPE Annual Technical Conference and Exhibition held in New Orleans, Louisiana, USA, Sep. 30-Oct. 2, 2013, 18 Pages.

Shandong Saigao Group Corporation: "Q400 (5W115) Quintuplex Plunger Pump," Jinan City, Shandong Province, China, Saigao, Oct. 20, 2014, 11 Pages, Retrieved from URL: https://www.saigaogroup. com/product/q400-5w115-quintuplex-plunger-pump.html.

Sun Coast Resources: "The Leader in Frac Fueling," Fueling Services, Jun. 29, 2015, 4 Pages, Retrieved from URL: https://web. archive.org/web/20150629220609/https://www.suncoastresources. comioilfield/fueling-services/.

technology.org: "Check Valves: How Do they Work and What are the Main Types?," Dec. 6, 2018, 10 Pages.

The Wayback Machine: "About API," WaybackMachine Capture, Captured Apr. 22, 2011, 2 Pages, Retrieved from URL: https://web. archive.org/web/20110422104346// http://api.org/aboutapi/.

The Wayback Machine: "Publications," American Petroleum Institute, WaybackMachine Capture, Captured Apr. 27, 2011, 2 Pages, Retrieved from URL: https://web.archive.org/web/20110427043936 http://www.api.org:80/Publications/.

The Wayback Machine: "Standards," American Petroleum Institute, WaybackMachine Capture, 2 Pages, Captured Feb. 7, 2011, Retrieved from URL: https://web.archive.org/web/20110207195046/ http:/wwww.api.org/Standards/ and Captured Feb. 4, 2011, Retrieved from URL: https://web.archive.org/web/20110204112554/ http://global.ihs.com/?RID=API1.

The Weir Group Inc: "Weir SPM Pump Product Catalog," S.P.M. Flow Control Inc, Fort Worth, Texas, Oct. 30, 2017, 40 Pages, Retrieved from URL: https://manage.global.weiriassets/files/product% 20brochures/SPM_2P140706_Pump_Product_Catalogue_View. pdf.

Tiwari A., "Design of a Cooling System for a Hydraulic Fracturing Equipment," The Pennsylvania State University, The Graduate School, College of Engineering, Aug. 2015, 96 Pages.

Tory K., "Pump Control With Variable Frequency Drives," Pumps & Systems: Advances in Motors and Drives, Reprint from Jun. 2008, 4 Pages.

Turk L., "Green Field Asset Sale Called 'Largest Disposition Industry Has Seen'," The INDsider Media, Mar. 19, 2014, 3 Pages, Retrieved from URL: http://theind.com/article-16497- green-field-asset-sale-called-%E2%80%98largest-disposition-industry-has-seen% 60.html.

Vericor: "Hydraulic Fracturing: Gas Turbine Proves Successful in Shale Gasfield Operations," 2017, 2 Pages, (Vericor Case Study), Retrieved from URL: https://www.vericor.com/wp-content/uploads/ 2020/02/7.-Fracing-4500hp-Pump-China-En.pdf.

Waizel B., "Oil, Gas Industry Discovers Innovative Solutions to Environmental Concerns," Hart Energy, Health, Safety & Environment, Dec. 10, 2018, 11 Pages.

Wallace E.M., et al., "Associated Shale Gas: From Flares to Rig Power," Society of Petroleum Engineers, SPE-173491-MS, Copyright 2015, SPE E&P Health, Safety, Security and Environmental Conference-Americas held in Denver, Colorado, USA, Mar. 16-18, 2015, 13 Pages.

Wang G., et al., "Dynamic Behavior of Reciprocating Plunger Pump Discharge Valve Based on Fluid Structure Interaction and Experimental Analysis," PLOS One, Oct. 21, 2015, vol. 10, No. 10, 20 Pages.

Wayback Machine: "API Member Companies," American Petroleum Institute, WaybackMachine Capture, 23 Pages, [Retrieved on Jan. 4, 2021-01-04] Retrieved from URL: https://web.archive.org/ web/20130424080625/ http://api.org/globalitems/globalheaderpages/ membership/api-member-companies.

Weir Group: "Weir Oil & Gas Introduces Industry's First Continuous Duty 5000-Horsepower Pump," Jul. 25, 2019, 5 Pages, Retrieved from URL: https://www.global.weir/newsroom/news-articles/weir-oil-and-gas-introduces-industrys-first-continuous-duty-5000-horsepower-pump/.

Weir: "SPM QEM 5000 E-Frac Pump," Specification Sheet, Weir Group, Weir 5000, 2019, 2 Pages.

Weir SPM: "Weir SPM General Catalog: Well Service Pumps, Flow Control Products, Manifold Trailers, Safety Products, Post Sale Services," Weir Oil & Gas, Fort Worth, Texas, May 28, 2016, 40 Pages, Retrieved from URL: https://www.pumpfundamentals.com/ pumpdatabase2/weir-spm-general.pdf.

Wikipedia: "Union Pacific GTELs," 1950, 7 Pages, Retrieved from URL: https://en.wikipedia.org/wiki/Union_Pacific_GTELs.

Wikipedia: "Westinghouse Combustion Turbine Systems Division," 1960, 33 Pages, Retrieved from URL: https://en.wikipedia.org/wiki/ Westinghouse_Combustion_Turbine_Systems_Division.

Williams C.W (Gulf Oil Corp. Odessa Texas)., "The Use of Gas-Turbine Engines in an Automated High-Pressure Water-Injection Station," American Petroleum Institute, Drilling and Production Practice, API-63-144, Jan. 1, 1963, 2 Pages.

WMD Squared: "Turbine Frac Units," 2012, 4 Pages, Retrieved from URL: https://wmdsquared.com/work/gfes-turbine-frac-units/.

Wolf J.J., et al., "Safety Aspects and Environmental Considerations for a 10 MW Cogeneration Heavy Duty Gas Turbine Burning Coke Oven Gas with 60% Hydrogen Content," ASME 1992 International Gas Turbine and Aeroengine Congress and Exposition, American Society of Mechanical Engineers Digital Collection, Jun. 1-4, 1992, 8 Pages.

Worldcat: "WorldCat Library Collections Database Records for API Standard 671 and API Standard 674," 3 Pages, [Retrieved on Dec. 30, 2021] Retrieved from URL: https://www.worldcat.org/title/ positive-displacement-pumps-reciprocating/ocic/858692269&referer= brief_results [Retrieved on Dec. 22, 2021] Retrieved from URL: https://www.worldcat.org/title/special-purpose-couplings-for-petroleum-chemical-and-gas-industry-services/ocic/871254217&referer=brief_ results.

Yadav J.P., et al., "Power Enhancement of Gas Turbine Plant by Intake Air Fog Cooling," ResearchGate, Jun. 2015, vol. 3, No. 1, 15 Pages.

Youtube: "HCI Jet Frac," Screenshots from YouTube, Dec. 11, 2010, 6 Pages, Retrieved from URL: https://www.youtube.com/ watch?v=6HjXkdbFaFQ.

Youtube: "Jereh Fracturing Equipment," Jereh Group, Jun. 8, 2015, 1 Page, Retrieved from URL: https://www.youtube.com/watch?v= m0vMiq84P4Q.

Youtube: "Jereh Fracturing Equipment," Transcript of Jereh Group, Jun. 8, 2015, 1 Page, Retrieved from URL: https://www.youtube. com/watch?v=m0vMiq84P4Q.

Youtube: "Jereh Fracturing Unit, Fracturing Spread," Jereh Group, Mar. 30, 2015, 1 Page, Retrieved from URL: https://www.youtube. com/watch?v=PIkDbU5dE00.

Youtube: "Jereh Fracturing Unit, Fracturing Spread," Transcript of Jereh Group, Mar. 30, 2015, 3 Pages.

ZSI-Foster: "Energy | Solar | Fracking | Oil and Gas," Aug. 2020, 2 Pages, Retrieved from URL: https://www.zsi-foster.com/energy-solar-fracking-oil-and-gas.html.

* cited by examiner

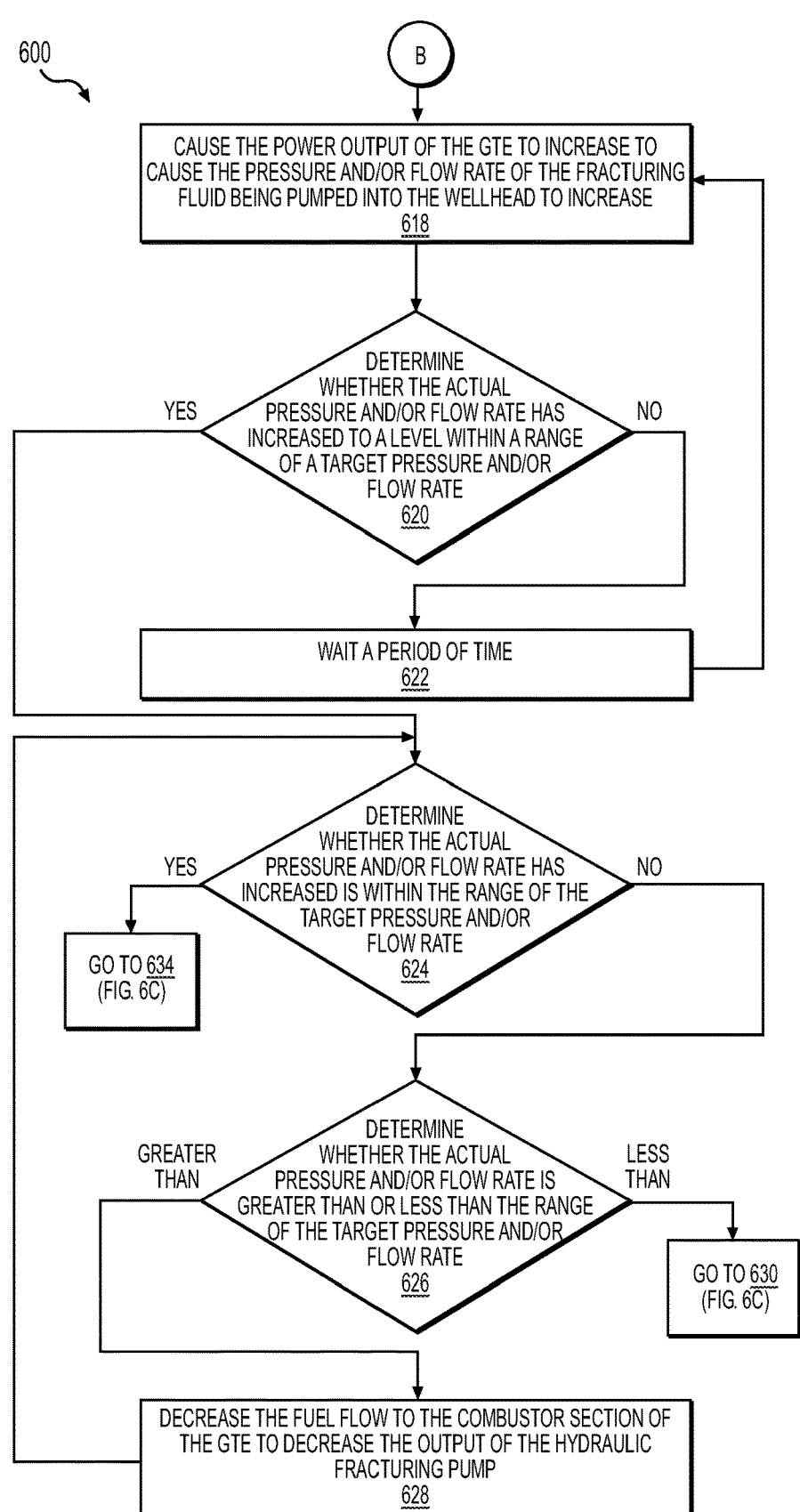

600

B

CAUSE THE POWER OUTPUT OF THE GTE TO INCREASE TO
CAUSE THE PRESSURE AND/OR FLOW RATE OF THE FRACTURING
FLUID BEING PUMPED INTO THE WELLHEAD TO INCREASE
618

DETERMINE
WHETHER THE ACTUAL
PRESSURE AND/OR FLOW RATE HAS
INCREASED TO A LEVEL WITHIN A RANGE
OF A TARGET PRESSURE AND/OR
FLOW RATE
620

YES          NO

WAIT A PERIOD OF TIME
622

DETERMINE
WHETHER THE ACTUAL
PRESSURE AND/OR FLOW RATE HAS
INCREASED IS WITHIN THE RANGE OF THE
TARGET PRESSURE AND/OR
FLOW RATE
624

YES          NO

GO TO 634
(FIG. 6C)

DETERMINE
WHETHER THE ACTUAL
PRESSURE AND/OR FLOW RATE IS
GREATER THAN OR LESS THAN THE RANGE
OF THE TARGET PRESSURE AND/OR
FLOW RATE
626

GREATER
THAN          LESS
THAN

GO TO 630
(FIG. 6C)

DECREASE THE FUEL FLOW TO THE COMBUSTOR SECTION OF
THE GTE TO DECREASE THE OUTPUT OF THE HYDRAULIC
FRACTURING PUMP
628

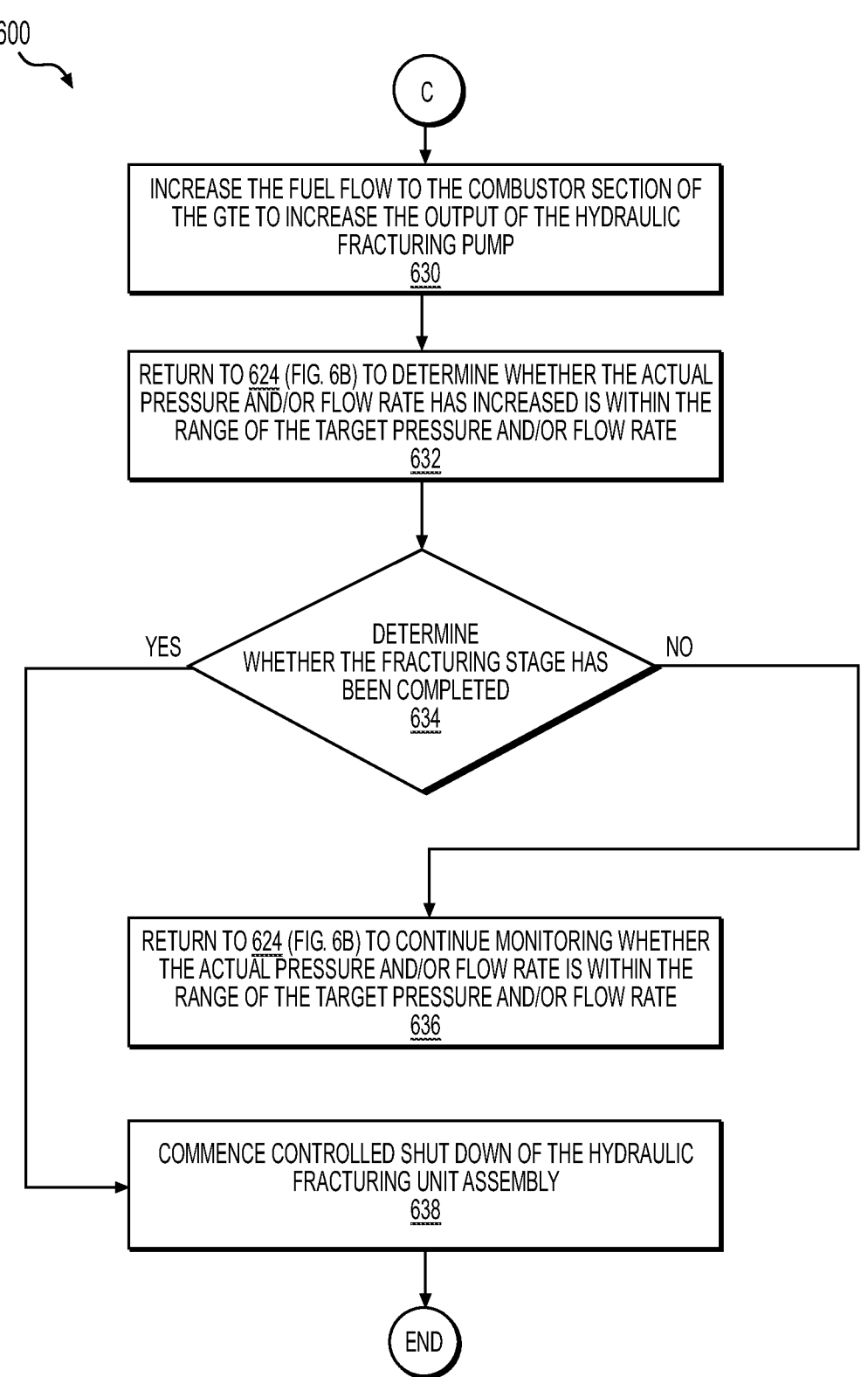

C

INCREASE THE FUEL FLOW TO THE COMBUSTOR SECTION OF THE GTE TO INCREASE THE OUTPUT OF THE HYDRAULIC FRACTURING PUMP
630

RETURN TO 624 (FIG. 6B) TO DETERMINE WHETHER THE ACTUAL PRESSURE AND/OR FLOW RATE HAS INCREASED IS WITHIN THE RANGE OF THE TARGET PRESSURE AND/OR FLOW RATE
632

DETERMINE WHETHER THE FRACTURING STAGE HAS BEEN COMPLETED
634

YES

NO

RETURN TO 624 (FIG. 6B) TO CONTINUE MONITORING WHETHER THE ACTUAL PRESSURE AND/OR FLOW RATE IS WITHIN THE RANGE OF THE TARGET PRESSURE AND/OR FLOW RATE
636

COMMENCE CONTROLLED SHUT DOWN OF THE HYDRAULIC FRACTURING UNIT ASSEMBLY
638

END

*FIG. 6C*

SYSTEMS AND METHODS TO OPERATE A DUAL-SHAFT GAS TURBINE ENGINE FOR HYDRAULIC FRACTURING

PRIORITY CLAIM

This is a continuation of U.S. Non-Provisional application Ser. No. 18/138,319, filed Apr. 24, 2023, titled "SYSTEMS AND METHODS TO OPERATE A DUAL-SHAFT GAS TURBINE ENGINE FOR HYDRAULIC FRACTURING," which is a continuation of U.S. Non-Provisional application Ser. No. 18/064,699, filed Dec. 12, 2022, titled "SYSTEMS AND METHODS TO OPERATE A DUAL-SHAFT GAS TURBINE ENGINE FOR HYDRAULIC FRACTURING," now U.S. Pat. No. 11,832,565 issued Aug. 22, 2023 which is a continuation of U.S. Non-Provisional application Ser. No. 17/684,613, filed Mar. 2, 2022, titled "SYSTEMS AND METHODS TO OPERATE A DUAL-SHAFT GAS TURBINE ENGINE FOR HYDRAULIC FRACTURING," now U.S. Pat. No. 11,639,655, issued May 2, 2022, which is a continuation of U.S. Non-Provisional application Ser. No. 17/396,914, filed Aug. 9, 2021, titled "SYSTEMS AND METHODS TO OPERATE A DUAL-SHAFT GAS TURBINE ENGINE FOR HYDRAULIC FRACTURING," now U.S. Pat. No. 11,572,774, issued Feb. 7, 2023, which is a continuation of U.S. Non-Provisional application Ser. No. 17/173,475, filed Feb. 11, 2021, titled "SYSTEMS AND METHODS TO OPERATE A DUAL-SHAFT GAS TURBINE ENGINE FOR HYDRAULIC FRACTURING," now U.S. Pat. No. 11,125,066, issued Sep. 21, 2021, which claims priority to and the benefit of, under 35 U.S.C. § 119(e), U.S. Provisional Application No. 62/705,334, filed Jun. 22, 2020, titled "METHOD AND SYSTEM OF OPERATING A DUAL SHAFT GAS TURBINE IN A DIRECT DRIVE TURBINE FRACKING UNIT," the disclosures of which are incorporated herein by reference in their entireties.

TECHNICAL FIELD

The present disclosure relates to systems and methods for operating a dual-shaft gas turbine engine for hydraulic fracturing and, more particularly, to systems and methods for operating a dual-shaft gas turbine engine to pump fracturing fluid into a wellhead.

BACKGROUND

Hydraulic fracturing is an oilfield operation that stimulates production of hydrocarbons, such that the hydrocarbons may more easily or readily flow from a subsurface formation to a well. For example, a hydraulic fracturing system may fracture a formation by pumping a fracturing fluid into a well at high pressure and high flow rates. Some fracturing fluids may take the form of a slurry including water, proppants, and/or other additives, such as thickening agents and/or gels. The slurry may be forced via one or more pumps into the formation at rates faster than can be accepted by the existing pores, fractures, faults, or other spaces within the formation. As a result, pressure may build rapidly to the point where the formation may fail and may begin to fracture. By continuing to pump the fracturing fluid into the formation, existing fractures in the formation are caused to expand and extend in directions farther away from a well bore, thereby creating additional flow paths for hydrocarbons to flow to the well bore. The proppants may serve to prevent the expanded fractures from closing or may reduce the extent to which the expanded fractures contract when pumping of the fracturing fluid is ceased. Once the formation is fractured, large quantities of the injected fracturing fluid are allowed to flow out of the well, and the production stream of hydrocarbons may be obtained from the formation.

Prime movers may be used to supply power to hydraulic fracturing pumps for pumping the fracturing fluid into the formation. For example, internal combustion engines may each be mechanically connected to a corresponding hydraulic fracturing pump and operated to drive the hydraulic fracturing pump. The prime mover, hydraulic fracturing pump, and auxiliary components associated with the prime mover and hydraulic fracturing pump may be connected to a common platform or trailer for transportation and set-up as a hydraulic fracturing unit at the site of a fracturing operation, which may include up to a dozen or more of such hydraulic fracturing units operating together to perform the fracturing operation.

Hydraulic fracturing units have traditionally used diesel engines as the prime movers to drive the hydraulic fracturing pumps. In order to reduce the consumption of diesel fuel, a recent trend has developed for using electrically-powered fracturing pumps. For example, a gas turbine engine may be used to drive an electric generator, which supplies power to electric motors used to drive the hydraulic fracturing pumps. Such systems may result in the production of power using cleaner energy sources relative to the combustion of diesel fuel, thereby reducing undesirable emissions. However, the deployment and use of electrically-powered fracturing units may suffer from possible drawbacks.

For example, in order to supply electric power in an amount sufficient to operate the large number of hydraulic fracturing pumps that may often be required to successfully complete a fracturing operation, the gas turbine engine may need to be extremely large. Because fracturing equipment must often be transported to a relatively remote wellsite and be assembled on-site, the assembly and preparation of a sufficiently large gas turbine engine may be cumbersome and complex, for example, often requiring the assembly of large components, such as the exhaust and intake systems, as well as connection of numerous and complex electrical components across the fracturing site. Moreover, using a single gas turbine engine to generate electrical power and transfer of the electrical power to each of the hydraulic fracturing units may be relatively inefficient, for example, depending on ambient conditions. For example, in high temperature climates and high altitude environments, the gas turbine engine may produce relatively less power. In addition, the efficiency of electrical power generation and transfer of the electrical power to the fracturing units may be relatively lower at high temperatures. In addition, in high-temperature environments, additional cooling for the gas turbine engine, electrical components, and the hydraulic fracturing pumps may be needed, which may result in additional inefficiencies. When combined, such inefficiencies may result in reducing the amount of power available for performing the fracturing operation. In addition, electrically-powered fracturing operations may still require a large foot-print at the wellsite, which may be magnified by the need of supplemental electric power generation and conditioning trailers, as well as large and complex cable assemblies for supplying power to the electric motors of the hydraulic fracturing units. For example, an electrically-powered fracturing operation may include electrical transfer and conditioning equipment, such as drive trailers and transformer systems, which may be connected to one another by relatively large and complex interconnecting cable assemblies.

Accordingly, Applicant has recognized a need for systems and methods that reduce undesirable emissions common to diesel-powered fracturing operations, while still providing a relatively efficient set-up and a fracturing operation that provides sufficient power for the multiple hydraulic fracturing pumps of a fracturing operation. The present disclosure may address one or more of the above-referenced drawbacks, as well as other possible drawbacks.

SUMMARY

As referenced above, in order to reduce the consumption of diesel fuel and the resulting undesirable emissions, a recent trend has developed for using electrically-powered fracturing units, which use electric motors to drive hydraulic fracturing pumps for performing fracturing operations. However, electrically-powered fracturing units may use a large gas turbine engine to drive an electrical generator and convert mechanical power into electrical power supplied to the electric motors driving the fracturing pumps. As noted above, this may result in several possible drawbacks, including difficult and complex on-site assembly of the gas turbine engine and electrical equipment necessary to perform the fracturing operation, and reduced operational efficiencies in some environments, such in high-temperature or high-altitude environments.

The present disclosure generally is directed to systems and methods for operating a dual-shaft gas turbine engine for hydraulic fracturing and, more particularly, to systems and methods for operating a dual-shaft gas turbine engine to pump fracturing fluid into a wellhead. For example, in some embodiments, a hydraulic fracturing unit assembly to pump fracturing fluid into a wellhead may include a dual-shaft gas turbine engine connected to a hydraulic fracturing pump by a transmission, and a fracturing unit controller configured to control operation of the gas turbine engine, the transmission, and/or the hydraulic fracturing pump of the hydraulic fracturing unit assembly, for example, during start-up, operation, and/or completion of a hydraulic fracturing operation.

According to some embodiments, a hydraulic fracturing unit assembly to pump fracturing fluid into a wellhead may include a chassis and a gas turbine engine connected to the chassis. The gas turbine engine may include a compressor positioned to compress air, and a combustor section positioned to receive compressed air from the compressor and fuel. The combustor section may be positioned to combust at least a portion of the compressed air and fuel to provide heated combustion gas. The gas turbine engine also may include a compressor turbine shaft connected to the compressor, such that the compressor turbine shaft rotates with the compressor, and a compressor turbine connected to the compressor turbine shaft, such that the compressor turbine shaft and the compressor turbine rotate a first rotational speed. The gas turbine engine further may include a power turbine positioned downstream relative to the compressor turbine, such that the heated combustion gas causes the power turbine to rotate at a second rotational speed. The gas turbine engine still further may include a power turbine output shaft connected to the power turbine, such that the power turbine output shaft rotates with the power turbine at the second rotational speed. The compressor turbine shaft and the power turbine output shaft may be rotatable at different rotational speeds. The hydraulic fracturing unit assembly also may include a transmission including a transmission input shaft connected to the power turbine output shaft, such that the transmission input shaft rotates at the second rotational speed, and a transmission output shaft positioned to be driven by the transmission input shaft at a third rotational speed. The hydraulic fracturing unit assembly further may include a hydraulic fracturing pump positioned to pump fracturing fluid into the wellhead. The hydraulic fracturing pump may include a pump drive shaft connected to the transmission output shaft, such that the transmission output shaft drives the pump drive shaft at the third rotational speed. The hydraulic fracturing unit assembly also may include a fracturing unit controller in communication with one or more of the gas turbine engine, the transmission, or the hydraulic fracturing pump. The fracturing unit controller may be configured to receive one or more target signals indicative of one or more of a target pressure associated with the fracturing fluid pumped into the wellhead or a target flow rate associated with the fracturing fluid pumped into the wellhead. The fracturing unit controller further may be configured to receive one or more fluid flow signals indicative of one or more of an actual pressure associated with the fracturing fluid pumped into the wellhead or an actual flow rate associated with the fracturing fluid pumped into the wellhead. The fracturing unit controller still further may be configured to control, based at least in part on one or more of the one or more target signals or the one or more fluid flow signals, one or more of the first rotational speed, the second rotational speed, or the third rotational speed.

According some embodiments, a method for pumping fracturing fluid into a wellhead may include receiving, via a fracturing unit controller, one or more target signals indicative of one or more of a target pressure associated with pumping fracturing fluid into a wellhead or a target flow rate associated with the fracturing fluid pumped into the wellhead. The method also may include receiving, via the fracturing unit controller, one or more fluid flow signals indicative of one or more of an actual pressure associated with pumping the fracturing fluid into the wellhead or an actual flow rate associated with pumping the fracturing fluid into the wellhead. The method further may include controlling, via the fracturing unit controller, based at least in part on one or more of the one or more target signals or the one or more fluid flow signals, one or more of: a first rotational speed associated with a compressor turbine shaft connected to a compressor and a compressor turbine of a gas turbine engine; a second rotational speed associated with a power turbine output shaft connected to a power turbine of the gas turbine engine; or a third rotational speed associated with a transmission output shaft connected to a pump drive shaft of a hydraulic fracturing pump positioned to pump the fracturing fluid into the wellhead.

According to some embodiments, a powertrain to supply power to a hydraulic fracturing unit assembly to pump fracturing fluid into a wellhead may include a gas turbine engine, which may include a compressor positioned to compress air and a combustor section positioned to receive compressed air from the compressor and fuel. The combustor section may be positioned to combust at least a portion of the compressed air and fuel to provide heated combustion gas. The gas turbine engine also may include a compressor turbine shaft connected to the compressor, such that the compressor turbine shaft rotates with the compressor, and a compressor turbine connected to the compressor turbine shaft, such that the compressor turbine shaft and the compressor turbine rotate a first rotational speed. The gas turbine engine further may include a power turbine positioned downstream relative to the compressor turbine, such that the heated combustion gas causes the power turbine to rotate at a second rotational speed, and a power turbine output shaft connected to the power turbine, such that the power turbine output shaft rotates with the power turbine at the second rotational speed. The compressor turbine shaft and the power turbine output shaft may be rotatable at different rotational speeds. The powertrain also may include a transmission including a transmission input shaft connected to the power turbine output shaft, such that the transmission input shaft rotates at the second rotational speed, and a transmission output shaft positioned to be driven by the transmission input shaft at a third rotational speed and to drive a pump drive shaft. The powertrain further may include a fracturing unit controller in communication with one or more of the gas turbine engine or the transmission. The fracturing unit controller may be configured to receive one or more target signals indicative of one or more of a target pressure associated with fracturing fluid pumped into a wellhead or a target flow rate associated with the fracturing fluid pumped into the wellhead. The fracturing unit controller also may be configured to receive one or more fluid flow signals indicative of one or more of an actual pressure associated with the fracturing fluid pumped into the wellhead or an actual flow rate associated with the fracturing fluid pumped into the wellhead. The fracturing unit controller further may be configured to control, based at least in part on one or more of the one or more target signals or the one or more fluid flow signals, one or more of the first rotational speed, the second rotational speed, or the third rotational speed.

Still other aspects and advantages of these exemplary embodiments and other embodiments, are discussed in detail herein. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they can be practiced. According to common practice, the various features of the drawings discussed below are not necessarily drawn to scale. Dimensions of various features and elements in the drawings can be expanded or reduced to more clearly illustrate embodiments of the disclosure.

FIG. 6B is a continuation of the example method for pumping fracturing fluid into a wellhead of the block diagram of FIG. 6A according to embodiments of the disclosure.

FIG. 6C is a continuation of the example method for pumping fracturing fluid into a wellhead of the block diagrams of FIGS. 6A and 6B according to embodiments of the disclosure.

DETAILED DESCRIPTION

The drawings include like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described can be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

Figure 1:
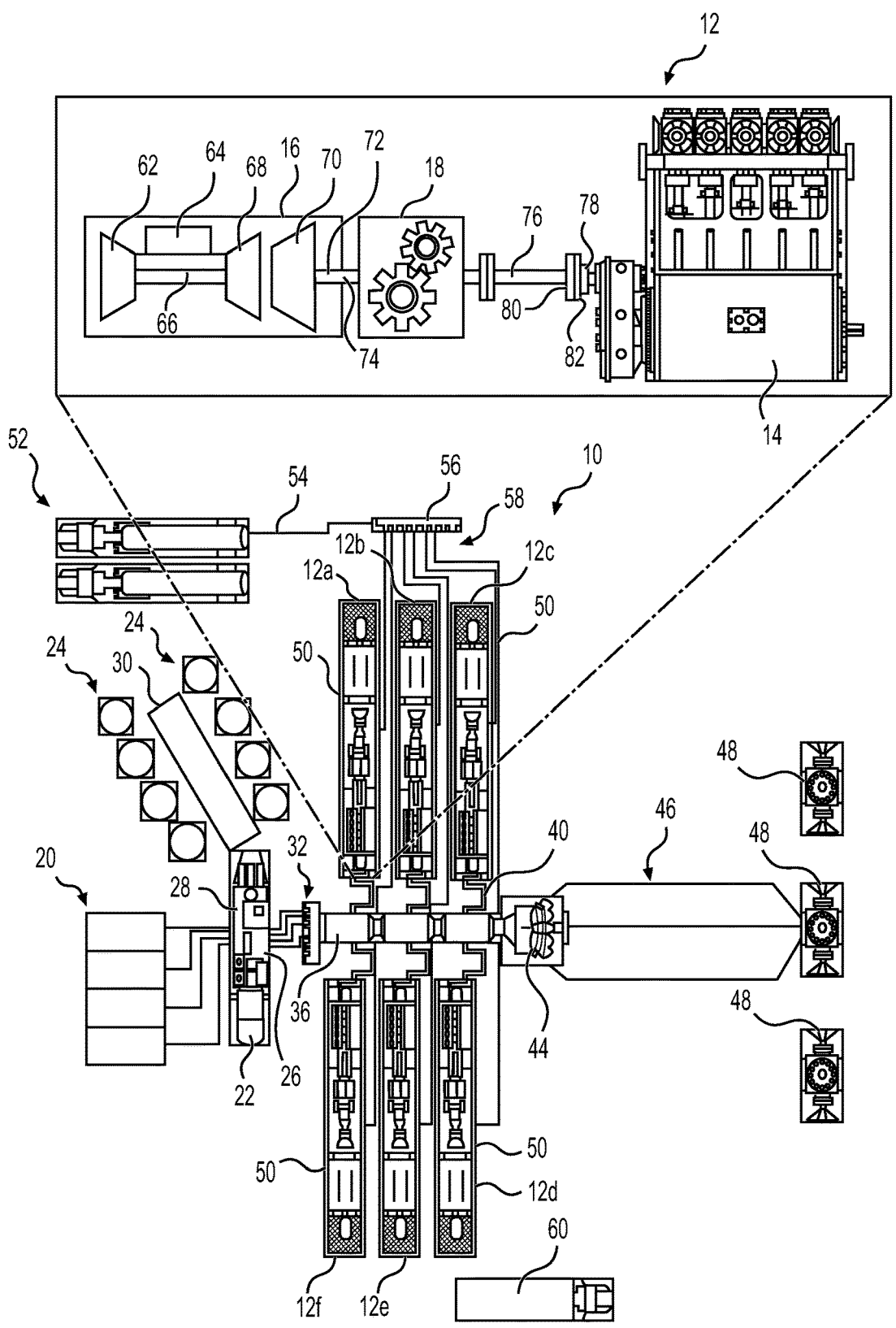
FIG. 1 schematically illustrates an example hydraulic fracturing system including a plurality of hydraulic fracturing unit assemblies, and including a schematic side view of an example hydraulic fracturing unit assembly according to embodiments of the disclosure.

FIG. 1 schematically illustrates a top view of an example hydraulic fracturing system 10 including a plurality of hydraulic fracturing unit assemblies 12 (depicted individually as 12a-12f), and including a block diagram of an example hydraulic fracturing unit assembly 12 according to embodiments of the disclosure. Although FIG. 1 shows six hydraulic fracturing unit assemblies 12, other numbers and/or other arrangements of hydraulic fracturing unit assemblies are contemplated, as will be understood by those skilled in the art. In some embodiments, one or more of the hydraulic fracturing unit assemblies 12a-12f may include a hydraulic fracturing pump 14 driven by an internal combustion engine 16, such as a gas turbine engine (GTE). For example, in some embodiments, each of the hydraulic fracturing unit assemblies 12a-12f may include a dual-shaft directly-driven turbine (DDT) hydraulic fracturing pump 14, in which the hydraulic fracturing pump 14 is connected to one or more GTEs 16 that supply power to the respective hydraulic fracturing pump 14 for supplying fracturing fluid at high pressure and high flow rates to a formation for fracturing. For example, the GTE 16 may be connected to a respective hydraulic fracturing pump 14 via a transmission 18, for example, as explained in more detail herein.

In some embodiments, one or more of the GTEs 16 may be a dual-fuel or bi-fuel GTE, for example, capable of being operated using of two or more different types of fuel, such as natural gas and diesel fuel, although other types of fuel are contemplated. For example, a dual-fuel or bi-fuel GTE may be capable of being operated using a first type of fuel, a second type of fuel, and/or a combination of the first type of fuel and the second type of fuel. For example, the fuel may include gaseous fuels, such as compressed natural gas (CNG), natural gas, field gas, pipeline gas, methane, propane, butane, and/or liquid fuels, such as, for example, diesel fuel (e.g., #2 diesel), bio-diesel fuel, bio-fuel, alcohol, gasoline, gasohol, aviation fuel, and other fuels. Gaseous fuels may be supplied by CNG bulk vessels, a gas compressor, a liquid natural gas vaporizer, line gas, and/or well-gas produced natural gas. Other types and associated fuel supply sources are contemplated as will be understood by those skilled in the art. The one or more GTEs 16 may be operated to provide horsepower to drive the transmission 18 connected to one or more of the hydraulic fracturing pumps 14 to safely and successfully fracture a formation during a well stimulation project or fracturing operation.

In some embodiments, the fracturing fluid may include, for example, water, proppants, and/or other additives, such as thickening agents and/or gels. For example, proppants may include grains of sand, ceramic beads or spheres, shells, and/or other particulates, and may be added to the fracturing fluid, along with gelling agents to create a slurry as will be understood by those skilled in the art. The slurry may be forced via the hydraulic fracturing pumps 14 into the formation at rates faster than can be accepted by the existing pores, fractures, faults, or other spaces within the formation. As a result, pressure may build rapidly to the point where the formation may fail and begin to fracture. By continuing to pump the fracturing fluid into the formation, existing fractures in the formation may be caused to expand and extend in directions farther away from a well bore, thereby creating additional flow paths for hydrocarbons to flow to the well. The proppants may serve to prevent the expanded fractures from closing or may reduce the extent to which the expanded fractures contract when pumping of the fracturing fluid is ceased. Once the well is fractured, large quantities of the injected fracturing fluid may be allowed to flow out of the well, and the water and any proppants not remaining in the expanded fractures may be separated from hydrocarbons produced by the well to protect downstream equipment from damage and corrosion. In some instances, the production stream may be processed to neutralize corrosive agents in the production stream resulting from the fracturing process.

In the example shown in FIG. 1, the hydraulic fracturing system 10 may include one or more water tanks 20 for supplying water for fracturing fluid, one or more chemical additive units 22 for supplying gels or agents for adding to the fracturing fluid, and one or more proppant tanks 24 (e.g., sand tanks) for supplying proppants for the fracturing fluid. The example fracturing system 10 shown also includes a hydration unit 26 for mixing water from the water tanks 20 and gels and/or agents from the chemical additive units 22 to form a mixture, for example, gelled water. The example shown also includes a blender 28, which receives the mixture from the hydration unit 26 and proppants via conveyers 30 from the proppant tanks 24. The blender 28 may mix the mixture and the proppants into a slurry to serve as fracturing fluid for the hydraulic fracturing system 10. FIG. 1 schematically depicts the chemical additive tanks 22, the hydration unit 26, and the blender 28 as single unit, but it is contemplated that they may be separate from one another as will be understood by those skilled in the art. Once combined, the slurry may be discharged through low-pressure hoses 32, which convey the slurry into two or more low-pressure lines in a fracturing manifold 36. In some embodiments, the low-pressure lines in the fracturing manifold 36 feed the slurry to the hydraulic fracturing pumps 14 through low-pressure suction hoses as will be understood by those skilled in the art.

The hydraulic fracturing pumps 14, driven by the respective internal GTEs 16, discharge the slurry (e.g., the fracturing fluid including the water, agents, gels, and/or proppants) at high flow rates and/or high pressures through individual high-pressure discharge lines 40 into two or more high-pressure flow lines, sometimes referred to as "missiles," on the fracturing manifold 36. The flow from the high-pressure flow lines is combined at the fracturing manifold 36, and one or more of the high-pressure flow lines provide fluid flow to a manifold assembly 44, sometimes referred to as a "goat head." The manifold assembly 44 delivers the slurry into a wellhead manifold 46. The wellhead manifold 46 may be configured to selectively divert the slurry to, for example, one or more wellheads 48 via operation of one or more valves. Once the fracturing process is ceased or completed, flow returning from the fractured formation discharges into a flowback manifold, and the returned flow may be collected in one or more flowback tanks as will be understood by those skilled in the art.

As schematically depicted in FIG. 1, one or more of the components of the fracturing system 10 may be configured to be portable, so that the hydraulic fracturing system 10 may be transported to a well site, quickly assembled, operated for a relatively short period of time, at least partially disassembled, and transported to another location of another well site for use. For example, the components may be connected to and/or supported on a chassis 50, for example, a trailer and/or a support incorporated into a truck, so that they may be easily transported between well sites. In some embodiments, the GTE 16, the transmission 18, and/or the hydraulic fracturing pump 14 may be connected to the chassis 50. In some embodiments, the transmission 18 may be connected to the chassis 50, and the GTE 16 may be connected to the transmission 18, without also connecting the GTE 16 directly to the chassis 50, which may result in fewer support structures being needed for supporting the GTE 16, transmission 18, and/or hydraulic fracturing pump 14 on the chassis 50.

As shown in FIG. 1, some embodiments of the hydraulic fracturing system 10 may include one or more fuel supplies 52 for supplying the GTEs 16 and any other fuel-powered components of the hydraulic fracturing system 10, such as auxiliary equipment, with fuel. The fuel supplies 52 may include gaseous fuels, such as compressed natural gas (CNG), natural gas, field gas, pipeline gas, methane, pro-pane, butane, and/or liquid fuels, such as, for example, diesel fuel (e.g., #2 diesel), bio-diesel fuel, bio-fuel, alcohol, gasoline, gasohol, aviation fuel, and other fuels as will be understood by those skilled in the art. Gaseous fuels may be supplied by CNG bulk vessels, such as fuel tanks coupled to trucks, a gas compressor, a liquid natural gas vaporizer, line gas, and/or well-gas produced natural gas. The fuel may be supplied to the hydraulic fracturing unit assemblies 12 by one of more fuel lines 54 supplying the fuel to a fuel manifold 56 and unit fuel lines 58 between the fuel manifold 56 and the hydraulic fracturing unit assemblies 12. Other types and associated fuel supply sources and arrangements are contemplated as will be understood by those skilled in the art.

As shown in FIG. 1, some embodiments also may include one or more data centers 60 configured to facilitate receipt and transmission of data communications related to opera-tion of one or more of the components of the hydraulic fracturing system 10. Such data communications may be received and/or transmitted via hard-wired communications cables and/or wireless communications, for example, according to known communications protocols. For example, the data centers 60 may contain at least some components of a hydraulic fracturing control assembly, such as a supervisory controller configured to receive signals from components of the hydraulic fracturing system 10 and/or communicate control signals to components of the hydraulic fracturing system 10, for example, to at least partially control operation of one or more components of the hydraulic fracturing system 10, such as, for example, the GTEs 16, the transmissions 18, and/or the hydraulic frac-turing pumps 14 of the hydraulic fracturing unit assemblies 12, the chemical additive units 22, the hydration units 26, the blender 28, the conveyers 30, the fracturing manifold 36, the manifold assembly 44, the wellhead manifold 46, and/or any associated valves, pumps, and/or other components of the hydraulic fracturing system 10.

FIG. 1 also shows a block diagram of an example hydrau-lic fracturing unit assembly 12 according to embodiments of the disclosure. As shown in FIG. 1, some embodiments of the hydraulic fracturing unit assembly 12 may include a chassis 50, for example, a trailer and/or a support incorpo-rated into a truck, so that the hydraulic fracturing unit assembly 12 may be more easily transported between well sites. The GTE 16 may be connected to the chassis 50, and the GTE 16 may include a compressor 62 configured and positioned to compress air, and a combustor section 64 positioned downstream relative to the compressor 62 and configured to receive compressed air from the compressor 62 and fuel for combustion. The combustor section 64 may be positioned and configured to combust at least a portion of the compressed air and fuel to provide heated combustion gas as will be understood by those skilled in the art. The GTE 16 also may include a compressor turbine shaft 66 connected to the compressor 62, such that the compressor turbine shaft 66 rotates with the compressor 62, and the compressor turbine shaft 66 may be connected to a compressor turbine 68, such that the compressor turbine shaft 66 and the compressor turbine 68 rotate, for example, as a unit, at the same rotational speed.

As shown in FIG. 1, in some embodiments, the GTE 16 may further may include a power turbine 70 positioned downstream relative to the compressor turbine 68, such that the heated combustion gas causes the power turbine 70 to rotate at a rotational speed, for example, different than the rotational speed of the compressor turbine 68, as explained in more detail herein. The GTE 16 still further may include a power turbine output shaft 72 connected to the power turbine 70, such that the power turbine output shaft 72 rotates with the power turbine 70, for example, as a unit, at the same rotational speed. As explained in more detail herein, the compressor turbine shaft 66 and the power turbine output shaft 72 may be rotatable at different rota-tional speeds.

In some embodiments, the compressor 62, combustor section 64, and/or the compressor turbine 68 may form a gas generator. The compressor 62 may be configured to rotate and compress air drawn into the GTE 16, such that com-pressed air is supplied to the combustor section 64 for combustion. The combustor section 64 may be configured to receive the compressed air and fuel and combust an air fuel mixture to generate heated combustion gas. In some embodiments, the combustor section 64 may receive fuel from a fuel feed system having at least one independently controlled fuel line to regulate the combustion process. In some embodiments, control of each respective fuel line may be provided by at least one actuator-controlled fuel valve positioned and configured to regulate fuel flow to a com-bustor stage of the combustor section 64.

The power turbine 70, located downstream of the com-bustor section 64, may receive the heated combustion gas, causing the power turbine 70 to rotate, except as otherwise described herein, thereby driving the power turbine output shaft 72. In some embodiments, for example, as shown, the compressor 62, the compressor turbine shaft 66, the com-pressor turbine 68, the power turbine 70, and the power turbine output shaft 72 are concentrically arranged, and in some embodiments, the compressor turbine shaft 66 and the power turbine output shaft 72 may rotate independently of one another. In some embodiments, changing the amount of compressed air and/or fuel supplied to the combustor section 64 for combustion may be used to at least partially control the output of the GTE 16 and/or to change the rotational speed of the power turbine 70 and power turbine output shaft 72.

As shown in FIG. 1, in some embodiments, the hydraulic fracturing unit assembly 12 also may include a transmission 18 including a transmission input shaft 74 connected to the power turbine output shaft 72, such that the transmission input shaft 74 rotates at the same rotational speed as the power turbine output shaft 72. The transmission 18 may also include a transmission output shaft 76 positioned to be driven by the transmission input shaft 74 at a different rotational speed than the transmission input shaft 74. In some embodiments, the transmission 18 may be a reduction transmission, which results in the transmission output shaft 76 having a relatively slower rotational speed than the transmission input shaft 74, as explained herein. The trans-mission 18 may include a continuously variable transmis-sion, an automatic transmission including one or more planetary gear trains, a transmission shiftable between dif-ferent ratios of input-to-output, etc., or any other suitable of types of transmissions as will be understood by those skilled in the art.

As shown in FIG. 1, in some embodiments, the hydraulic fracturing unit assembly 12 further may include the hydraulic fracturing pump 14 positioned and configured to pump fracturing fluid into the wellhead 48. In some embodiments, the hydraulic fracturing pump 14 may be, for example, a reciprocating, in-line fluid pump as will be understood by those skilled in the art. In some embodiments, the hydraulic fracturing pump 14 may include a pump drive shaft 78 connected to the transmission output shaft 76, such that the transmission output shaft 76 drives the pump drive shaft 78 at a desired rotational speed. For example, as shown, the transmission output shaft 76 may include an output shaft connection flange 80, and the pump drive shaft 78 may include a drive shaft connection flange 82, and the output shaft connection flange 80 and the drive shaft connection flange 82 may be coupled to one another, for example, directly connected to one another. In some embodiments, the transmission output shaft 76 and the pump drive shaft 78 may be connected to one another via any known coupling types as will be understood by those skilled in the art (e.g., such as a universal joint and/or a torsional coupling).

Figure 2:
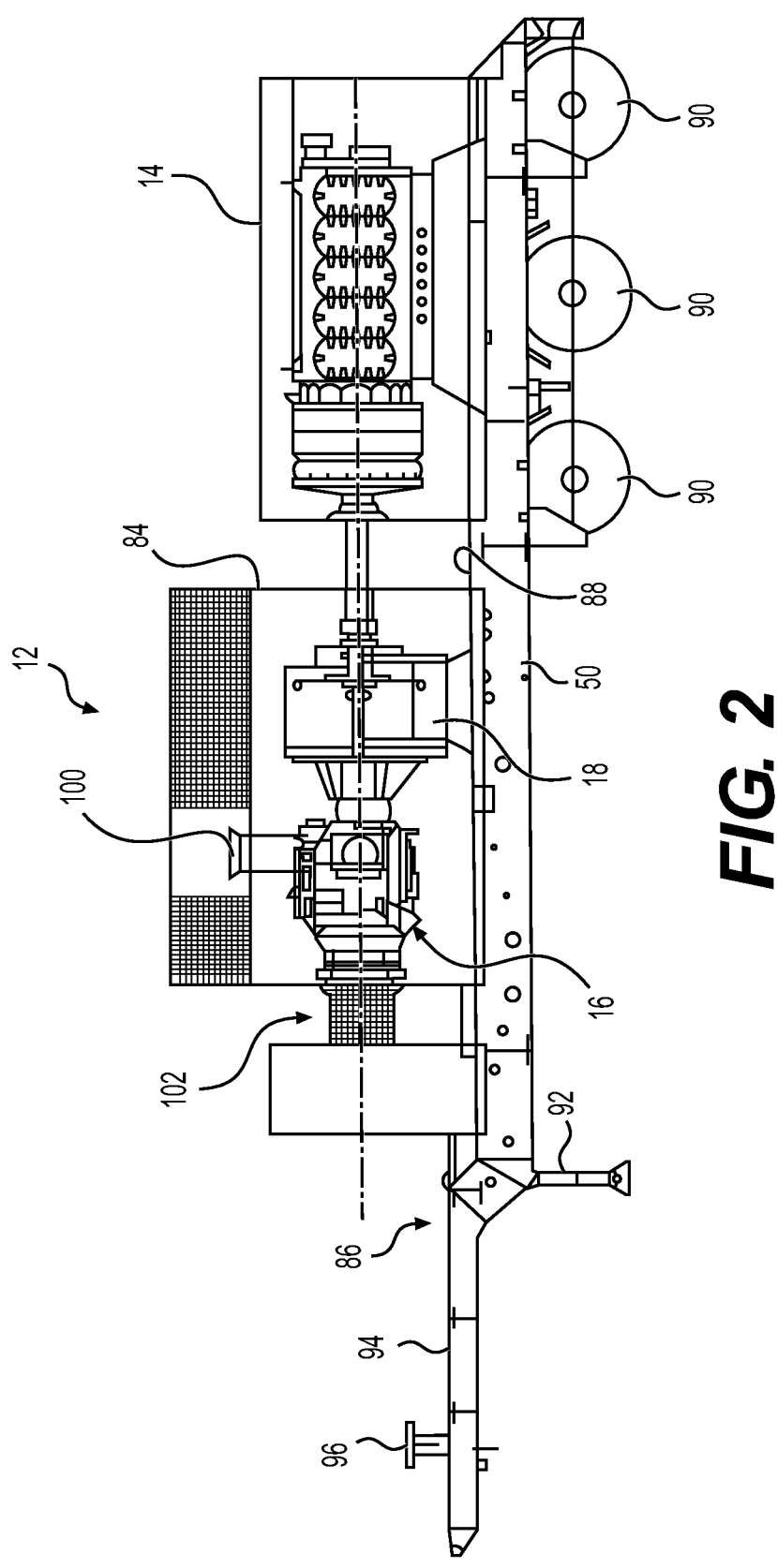
FIG. 2 is a schematic side view of an example hydraulic fracturing unit assembly according to embodiments of the disclosure.

As shown in FIG. 2, in some embodiments, is a schematic side view of an example hydraulic fracturing unit assembly 12 according to embodiments of the disclosure. In the embodiment shown, the chassis 50 may be a trailer 86 including a bed 88 for supporting components of the hydraulic fracturing unit assembly 12, one or more pairs of wheels 90 facilitating movement of the trailer 86, a pair of retractable supports 92 to support the hydraulic fracturing unit assembly 12 during use, and a tongue 94 including a coupler 96 for connecting the trailer 86 to a truck for transport of the hydraulic fracturing unit assembly 12 between well sites to be incorporated into a hydraulic fracturing system 10 of a well site fracturing operation, as will be understood by those skilled in the art.

As shown in FIG. 2, one or more of the hydraulic fracturing unit assemblies 12 may include an enclosure 100 connected to and supported by the chassis 50 according to embodiments of the disclosure. In some embodiments, as shown in FIG. 1, the GTE 16 may be connected to the transmission 18 via the power turbine output shaft 72 and the transmission input shaft 74, both of which may be substantially contained within the enclosure 100. The GTE 16 may include an air intake duct 102 and a turbine exhaust duct 104 passing through walls of the enclosure 100 and connected to the GTE 16. The GTE 16 may be connected to the hydraulic fracturing pump 14 via the transmission 18, with the transmission output shaft 72 connected to the pump drive shaft 78, for example, as explained herein.

Figure 3:
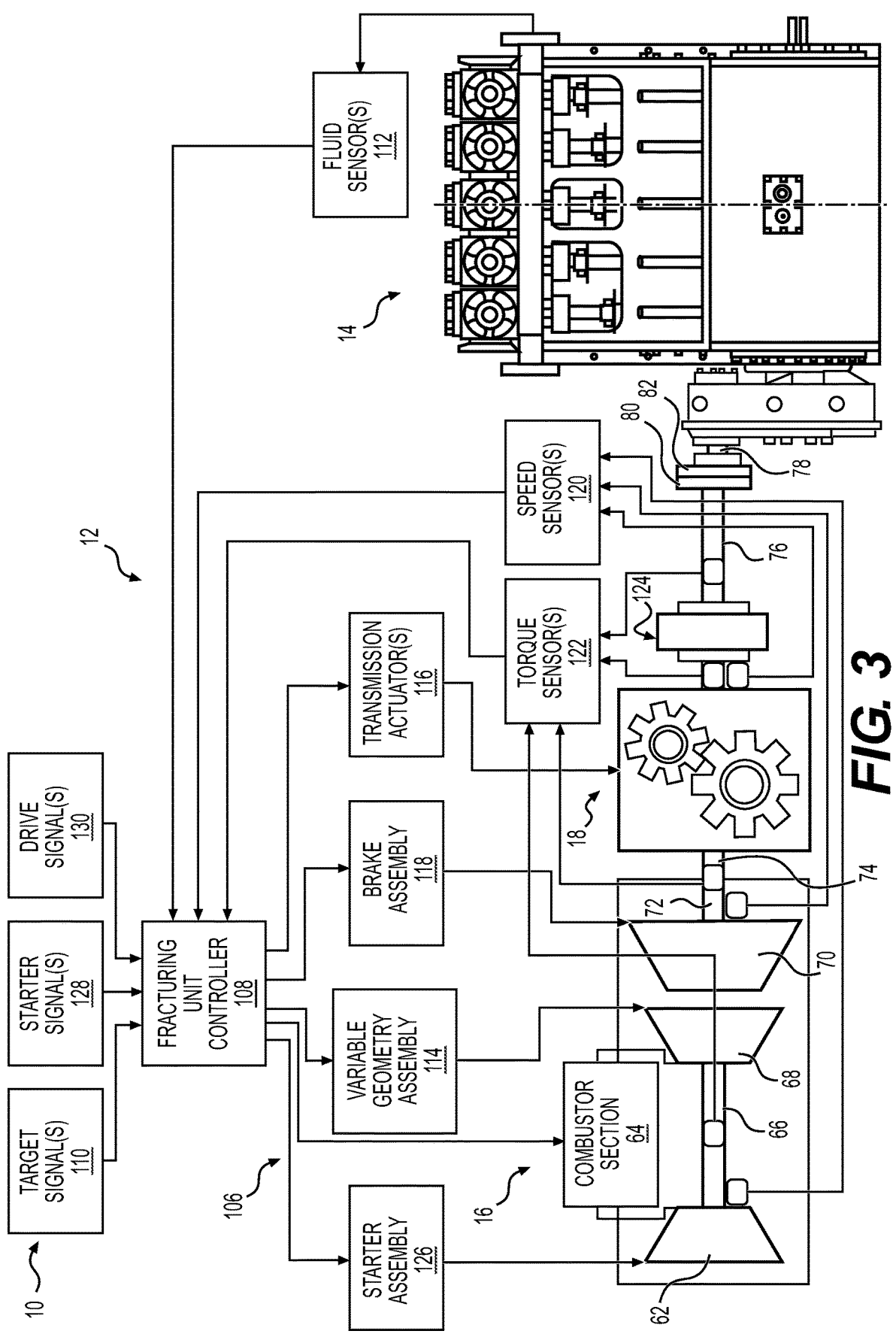
FIG. 3 is a block diagram of an example hydraulic fracturing unit assembly according to embodiments of the disclosure.

FIG. 3 is a block diagram of an example hydraulic fracturing unit assembly 12 according to embodiments of the disclosure. As shown in FIG. 3, some embodiments of the hydraulic fracturing unit assembly 12 may include a powertrain 106 positioned and configured to supply power to the hydraulic fracturing pump 14. The powertrain 106 may include the GTE 16, the transmission 18, and/or a fracturing unit controller 108 in communication with one or more of the GTE 16, the transmission 18, or the hydraulic fracturing pump 14, and configured to control operation of one or more of the GTE 16, the transmission 18, or hydraulic fracturing pump 14. The communication may be provided by any known hard-wired and/or wireless communications protocols as will be understood by those skilled in the art.

In some embodiments, for example, as shown in FIG. 3, the fracturing unit controller 108 may be configured to receive one or more target signals 110 indicative of one or more of a target pressure associated with fracturing fluid pumped into a wellhead 48 or a target flow rate associated with the fracturing fluid pumped into the wellhead 48. For example, the hydraulic fracturing system 10 (e.g., the hydraulic fracturing unit assemblies 12, the data center 60, and/or a remotely located control center) may include an input device including a user interface (e.g., a display device, a keyboard, touch-sensitive screen, and/or a voice-command component) configured to provide operational parameters for operating the hydraulic fracturing system 10 and/or the hydraulic fracturing unit assemblies 12. The fracturing unit controller 108 may be configured to receive one or more fluid flow signals indicative of one or more of an actual pressure associated with the fracturing fluid pumped into the wellhead 48 or an actual flow rate associated with the fracturing fluid pumped into the wellhead 48. For example, the hydraulic fracturing system 10 may include one or more fluid sensor(s) 112 configured to generate signals indicative of the pressure of the fracturing fluid pumped into the wellhead 48 and/or the flow rate of the fracturing fluid pumped into the wellhead 48 by one or more of the hydraulic fracturing unit assemblies 12. In some embodiments, one or more of the fluid sensor(s) 112 may be located in, for example, the high-pressure discharge lines 40, the high-pressure flow lines 42, the manifold assembly 44, the wellhead manifold 46, and/or the wellhead 48. The fracturing unit controller 108 may be configured to control, based at least in part on one or more of the target signals 110 and/or the one or more fluid flow signals, (1) one or more of a rotational speed of the compressor 62, a rotational speed of the compressor turbine shaft 66, and/or a rotational speed of the compressor turbine 68, (2) a rotational speed of the power turbine 70, a rotational speed of the power turbine output shaft 72, and/or a rotational speed of the transmission input shaft 74, or (3) a rotational speed of transmission output shaft 76 and/or a rotational speed of the pump drive shaft 78. In some embodiments, the respective rotational speeds of one or more of the following may be controlled independently from one another: (1) the compressor 62, the compressor turbine shaft 66, and/or the compressor turbine 68, (2) the power turbine 70, the power turbine output shaft 72, and/or the transmission input shaft 74, or (3) the transmission output shaft 76 and/or the pump drive shaft 78.

For example, a user or operator of the hydraulic fracturing system 10, using a user interface, may input a desired or target fracturing pressure and/or a desired or target fracturing flow rate for one or more hydraulic fracturing unit assemblies 12 for one or more stages of the fracturing operation, for example, to achieve the desired results of the fracturing operation. The fracturing unit controller 108 may be configured to receive one or more target signals 110 indicative of the target pressure and/or target flow rate and control operation of the GTE 16, the transmission 18, and/or the hydraulic fracturing pump 14, based at least in part on the one or more target signals 110. For example, the fracturing unit controller 108 may be configured to control the output of the GTE 16 (e.g., the rotational speed and/or torque output of the power turbine output shaft 72), the ratio of the rotational speed of the transmission input shaft 74 to the rotational speed of the transmission output shaft 76, and/or operation of the hydraulic fracturing pump 14 to substantially achieve and/or substantially maintain the target pressure and/or target flow rate of the fracturing fluid, for example, within a range of the target pressure and/or target flow rate. For example, the range may be within less than 10% of the target pressure and/or target flow rate, within less than 7.5% of the target pressure and/or target flow rate, or within less than 5% of the target pressure and/or target flow rate.

In some embodiments, the hydraulic fracturing unit assembly 12 may be incorporated into a hydraulic fracturing system 10 to perform high pressure, high volume hydraulic fracturing operations. Such operations may involve fluid pressures greater than 13,000 pounds per square inch (psi) and/or flow rates in excess of 100 barrels per minute (bpm). In some embodiments, the GTE 16 may be a dual-shaft DDT gas turbine engine able to produce, for example, from about 4,100 hydraulic horsepower (hhp) to about 4,400 hhp, although GTEs 16 of different types and/or having different power output capabilities are contemplated. In some embodiments, the GTE 16 may be a dual-shaft gas turbine engine, which may facilitate an ability to operate the GTE 16 at a relatively elevated power output level known as Maximum Intermittent Power (MIP). In such embodiments, the GTE 16 may be operated at about 90% load, with a maximum continuous power output being 100% and the MIP power output being about 108% load, although other MIP levels are contemplated. In some embodiments, the ability of the GTE 16 to be selectively operated at MIP may facilitate mitigating a loss of power from one GTE 16 of the hydraulic fracturing system 10 by at least partially offsetting the power loss by operating one or more other GTEs 16 of the hydraulic fracturing system 10 at MIP, for example, while the GTE 16 experiencing the power loss may be serviced or replaced, and in some instances, without necessarily discontinuing the fracturing operation. In at least some such instances, when the GTE 16 experiencing the power loss has been repaired or replaced, it may be brought back online, and the power output of the remaining GTEs 16 may be reduced from the respective MIP levels to respective rated power output levels.

In some embodiments, the transmission 18 may be configured to convert the rotational speed of the power turbine output shaft 72 to a rotational speed of the pump drive shaft 78 that enhances efficiency and/or operation of the hydraulic fracturing unit assembly 12 and the hydraulic fracturing pump 14. For example, the GTE 16 may be configured to be operated such that the rotational speed of the power turbine output shaft 72 is up to about 16,500 revolutions per minute (rpm). The transmission 18, in some embodiments, may be configured to provide a reduction ratio ranging from about 15:1 to about 5:1 (e.g., about 11:1), such that the resulting rotational speed of the pump drive shaft is reduced to about 1,500 rpm, which may be a more efficient rotational speed for operation of the hydraulic fracturing pump 14 and which may facilitate operation of the hydraulic fracturing pump 14 at a desired or target output, for example, depending on the fracturing operation conditions. Other ratios (and/or variable ratios) are contemplated. For example, the transmission 18 may be a continuously variable transmission, a transmission including one or more planetary gear trains, and/or a transmission shiftable between discrete input-to-output ratios. In some embodiments, if the GTE 16 is operated at rotational speeds greater than, or otherwise different from, 16,500 rpm, the transmission 18 may be configured to provide a different input-to-output ratio, for example, to more efficiently or effectively utilize the power generated by the GTE 16 to efficiently operate the hydraulic fracturing pump 14.

In some embodiments, the hydraulic fracturing pump 14 may be rated for operation to be greater than or equal to the maximum power output of the GTE 16, for example, so that the GTE 16 may be efficiently utilized with the maximum hydraulic horsepower output capacity of the hydraulic fracturing pump 14. For example, if the hydraulic fracturing pump 14 is rated at 5,000 hp, in some embodiments, the GTE 16 may be rated, at iso conditions, at 5,000 hp. In some embodiments, the hydraulic fracturing pump 14 may be rated for operation to be greater than the maximum power output of the GTE 16, for example, so that the GTE 16 may be selectively operated at relatively higher power output levels, such as at MIP.

In some embodiments, the GTE 16 may have a rated shaft horsepower (shp) of 5,100 at standard conditions, and the transmission 18 may be a reduction helical gearbox that has a constant running power rating of 5,500 shp and an intermittent power output of 5,850 shp, although other suitable transmission types having the same or other ratings are contemplated. For example, example, the hydraulic fracturing pump 14 may be a high-pressure, high-power, reciprocating positive-displacement pump rated at 5,000 hp, although the hydraulic fracturing pump 14 may be rated for a relatively elevated power output above the rating of the GTE 16 (e.g., 7,000 hp). In some embodiments, during operation, the GTE 16 may be subjected to dynamic and/or rapid load changes, such as for example, step-load changes of the hydraulic fracturing pump 14 as will be understood by those skilled in the art.

In some embodiments, as shown in FIG. 3, the hydraulic fracturing unit assembly 12 may include one or more variable geometry assemblies 114 configured to at least partially control the rotational speed of the power turbine output shaft 72. For example, the one or more variable geometry assemblies 114 may include one or more air bleed devices, for example, in the form of one or more bleed valves positioned and configured to divert air from the compressor 62, for example, such that a lower volume of compressed air from the compressor 62 reaches the combustor section 64 for combustion. In some embodiments, the one or more air bleed devices may act or serve as high-pressure compressor inter-stage bleeds, high pressure compressor exit bleeds, and/or power turbine bleeds. Air bleed devices having other configurations and or positions are contemplated as will be understood by those skilled in the art.

In some embodiments, the one or more variable geometry assemblies 114 may include one or more variable position/orientation vanes, for example, in the form of variable inlet guide vanes, which may be provided for compressor turbine 68 and/or the power turbine 70. In some embodiments, variable position/orientation vanes may be positioned and configured to control the amount of air flowing through the compressor turbine 68 and/or the power turbine 70, which may be used to at least partially control the output of the GTE 16 and/or to change the rotational speed of the power turbine 70 and power turbine output shaft 72. Other forms and/or positions of variable geometry assemblies 114 are contemplated.

In some embodiments, as shown in FIG. 3, the fracturing unit controller 108 may be configured to generate, based at least in part on one or more of the one or more target signals 110 or the one or more fluid flow signals received from the one or more fluid sensor(s) 112, one or more geometry signals configured to control operation of the one or more variable geometry assemblies 114 to at least partially control the rotational speed and/or torque output of the power turbine 70 and power turbine output shaft 72. For example, the fracturing unit controller 108 may determine that the fracturing fluid pressure and/or the fracturing fluid flow rate provide to the wellhead 48 is outside a prescribed range of the target pressure and/or target flow rate, and at least partially control the output of the GTE 16 by adjusting one or more of the variable geometry assemblies 114, so that the fracturing fluid pressure and/or the fracturing fluid flow rate provided to the wellhead 48 is within a prescribed range of the target pressure and/or target flow rate.

In some embodiments, as shown in FIG. 3, the hydraulic fracturing unit assembly 12 may include one or more transmission actuators 116 positioned and configured to control a ratio of the rotational speed of the transmission input shaft 74 to the rotational speed of the transmission output shaft 76. For example, in some embodiments, the transmission 18 may be a type of transmission capable of changing the effective ratio of the transmission input shaft speed to the transmission output shaft speed, which may be used to at least partially control the output of the hydraulic fracturing pump 14, for example, by changing the ratio. In some embodiments, the fracturing unit controller 108 may be configured to generate, based at least in part on the one or more target signals 110 and/or the one or more fluid flow signals received from the fluid sensor(s) 112, one or more ratio signals to one or more transmission actuators 116 configured to control the ratio of the rotational speed of the transmission input shaft 74 to the rotational speed of the transmission output shaft 76 of the transmission 18. For example, the fracturing unit controller 108 may determine that the fracturing fluid pressure and/or the fracturing fluid flow rate provide to the wellhead 48 is outside a prescribed range of the target pressure and/or target flow rate, and at least partially control the output of the hydraulic fracturing pump 14 by changing the ratio of the transmission 18 (e.g., by changing gears and/or controlling one or more planetary gear trains), so that the fracturing fluid pressure and/or the fracturing fluid flow rate provided to the wellhead 48 is within a prescribed range of the target pressure and/or target flow rate.

As shown in FIG. 3, in some embodiments, the hydraulic fracturing unit assembly 12 may include a brake assembly 118 connected to the hydraulic fracturing unit assembly 12 and configured to at least partially control the rotational speed of the power turbine 70 and the power turbine output shaft 72, for example, independent from the rotational speed of the compressor turbine shaft 66 and the compressor turbine 68. In some embodiments, the brake assembly 118 may include a disc brake connected to the power turbine output shaft 72 and configured to at least partially control the speed of rotation of the power turbine output shaft 72. In some embodiments, the fracturing unit controller 108 may be configured to generate one or more brake control signals configured to at least partially control operation of the brake assembly 118. As explained herein, activation of the brake assembly 118 may be used during an initial power-up of the GTE 16 to prevent the power turbine 70 and power turbine output shaft 72 from rotating until operation of the hydraulic fracturing pump 14 is initiated. In some embodiments, the braking assembly 18 may be activated to reduce the output of the GTE 16 and/or reduce the output of the hydraulic fracturing pump 14.

As shown in FIG. 3, in some embodiments, the hydraulic fracturing unit assembly 12 may include one or more speed sensors 120 associated with (e.g., connected to) the compressor turbine shaft 66, the power turbine output shaft 72, and/or the pump drive shaft 78. The speed sensor(s) 120 may be positioned and configured to generate one or more rotational signals indicative of the rotational speed of the compressor turbine shaft 66, the power turbine output shaft 72, and/or the pump drive shaft 78. In some embodiments, the fracturing unit controller 108 may be configured to receive the one or more rotational signals and at least partially control, based at least in part on the one or more rotational signals, the rotational speed of the pump drive shaft 78. For example, the rotational speed of the pump drive shaft 78 may be indicative of the output of the hydraulic fracturing pump 14, such as the fracturing fluid pressure and/or the fracturing fluid flow rate. The rotational speed of the compressor turbine shaft 66 and/or the rotational speed of the power turbine output shaft 72 may be indicative of the output of the GTE 16. In some embodiments, the fracturing unit controller 108 may be configured to determine whether the fracturing fluid pressure and/or the fracturing fluid flow are within a desired range of the target pressure and/or target flow rate, and control operation of the GTE 16 and/or the transmission 18 to achieve a fracturing fluid pressure and/or fracturing fluid flow rate within the desired range.

As shown in FIG. 3, in some embodiments, the hydraulic fracturing unit assembly 12 may include one or more torque sensors 122 associated with (e.g., connected to) the compressor turbine shaft 66, the power turbine output shaft 72, the transmission input shaft 74, the transmission output shaft 76, and/or the pump drive shaft 78. The torque sensor(s) 122 may be positioned and configured to generate one or more torque signals indicative of torque at a respective location of the torque sensor(s) 122. In some embodiments, the torque sensor(s) 122 may include strain gauges and related instrumentation configured to generate signals indicative of torque experienced by one or more of the compressor turbine shaft 66, the power turbine output shaft 72, the transmission input shaft 74, the transmission output shaft 76, and/or the pump drive shaft 78. In some embodiments, the fracturing unit controller 108 may be configured to control, based at least in part on the one or more torque signals, one or more of the rotational speed of the compressor turbine shaft 66, the rotational speed of the power turbine output shaft 72, the rotational speed of the transmission input shaft 74, and/or the rotational speed of the transmission output shaft 76 and/or the rotational speed of the pump drive shaft 78.

For example, the torque sensor(s) 122 may be positioned on the pump drive shaft 78 between the hydraulic fracturing pump 14 transmission 18, for example, so that torque signals may be generated during operation of the hydraulic fracturing unit assembly 12. The fracturing unit controller 12 may be configured to monitor the torque signals and detect whether the torque associated with the compressor turbine shaft 66, the power turbine output shaft 72, the transmission input shaft 74, the transmission output shaft 76, and/or the pump drive shaft 78, is greater than a threshold torque above which may result in excessive wear rates and/or damage to components of the hydraulic fracturing unit assembly 12. For example, upon detection of a torque level beyond the threshold torque level, the fracturing unit controller 108 may be configured to reduce the output of the GTE 16, alter the ratio of the transmission 18, and/or reduce the output of the hydraulic fracturing pump 14, to thereby protect one or more of the components of the hydraulic fracturing unit assembly 12.

In some embodiments, as shown in FIG. 3, the hydraulic fracturing unit assembly 12 may include a vibration damping assembly 124 associated with (e.g., connected to) the transmission output shaft 76 and/or the pump drive shaft 78 and configured to damp vibrations associated with operation of the hydraulic fracturing pump 14. In some embodiments, the vibration damping assembly 124 may be configured to damp torsional vibration and may include a torsional vibration damper and/or a flywheel.

In some embodiments, the hydraulic fracturing pump 14 may be a reciprocating pump. During operation, the GTE 16 may be operated to cause the transmission output shaft 76 to drive the pump drive shaft 78 of the hydraulic fracturing pump 14, such that the hydraulic fracturing pump 14 pumps slugs of fracturing fluid into the high-pressure discharge lines 40, for example, such that the hydraulic fracturing pump 14 provides a relatively constant flow of fracturing fluid into the wellhead 48. As the hydraulic fracturing pump 14 pumps slugs of fracturing fluid, pulses of the slugs of fluid being pumped by cylinders of the reciprocating pump create a pulsating pressure increase superimposed onto the nominal operating fluid pressure supplied by the hydraulic fracturing pump 14. The pulsating pressure increase may be transmitted through the powertrain 106 from the pump drive shaft 78, to the transmission output shaft 76 and transmission 18, and/or to the power turbine output shaft 72. For example, the pulsating pressure increase may result in torque variations in the crank shaft of the hydraulic fracturing pump 14 that may be transferred as torque output variations at the pump drive shaft 78. These torque output variations may generate minor and/or significant torsional shocks that may reduce the service life or damage components of the hydraulic fracturing unit assembly 12.

In some embodiments, the vibration damping assembly 124 may be positioned and configured to reduce transmission of torsional shocks to the transmission output shaft 76, any gear trains or similar structures in the transmission 18, the transmission input shaft 74, the power turbine output shaft 72, and/or the GTE 16. The vibration damping assembly 124 may include one or more flywheels coupled to the pump drive shaft 78, the transmission output shaft 76, the transmission 18, the transmission input shaft 74, the power turbine output shaft 72, and/or the GTE 16. The one or more flywheels may dampen torsional vibrations transmitted to components of the powertrain 106 caused by the pulsating pressure increases generated by operation of the hydraulic fracturing pump 14. Such pulsating pressure increases may be relatively low frequency and relatively high amplitude. In some embodiments, a torsional vibration damper may be connected to the pump drive shaft 78 and/or may be connected to a downstream side of a flywheel. In some embodiments, the torsional vibration damper may be connected directly to a flywheel or directly to the pump drive shaft 78. It is contemplated that the torsional vibration damper(s) and/or the flywheel(s) may be connected to the hydraulic fracturing unit assembly 12 at multiple and/or different locations.

In some embodiments, the torsional vibration damper(s) 140 (see FIG. 5) may be positioned and configured to prevent torsional resonance within the powertrain 106 that may lead to a reduced service life or damage (e.g., due to fatigue) of components of the GTE 16, the power turbine output shaft 72, the transmission input shaft 74, the transmission 18, the transmission output shaft 76, the pump drive shaft 78, and/or the hydraulic fracturing pump 14. Torsional vibration damper(s) 140 may be configured to dampen relatively high frequency and relatively low amplitude torsional vibrations transmitted to the hydraulic fracturing unit assembly 12 caused by forced excitations from operation of the components (e.g., the synchronous machinery). In some embodiments, the torsional vibration damper(s) 140 may include a viscous, a spring-viscous, and/or a spring torsional vibration damper. Examples of suitable torsional vibration dampers may include, but are not limited to, a Geislinger® damper, a Geislinger® Vdamp®, a Metaldyne® viscous damper, a Kendrion® torsional vibration damper, a Riverhawk® torsional vibration damper, and the like.

As shown in FIG. 3, some embodiments of the hydraulic fracturing unit assembly 12 may include a starter assembly 126 associated with (e.g., connected to) the compressor 62 (e.g., the compressor turbine shaft 66) of the GTE 16. The fracturing unit controller 108 may be positioned and configured to receive one or more starter signals 128 indicative of starting the GTE 16, and generate one or more idle signals to cause the starter assembly 126 to cause the compressor 62 and the compressor turbine 68 to rotate at a target idle speed while the power turbine 70 and power turbine output shaft 72 remain stationary (e.g., at zero rotational speed).

For example, the GTE 16 may be commanded to achieve an idle status. The starter signal(s) 128 may be generated in response to an operator or a master controller entering into a user interface an idle command for the GTE 16. In some embodiments, the fracturing unit controller 108 may generate the one or more idle signals commanding, for example, a hydraulic starter to selectively, mechanically couple to the compressor turbine shaft 66 of the GTE 16 to rotate the compressor turbine shaft 66 while sequencing a fuel feed system and igniters of the combustor section 64. In some embodiments, at idle, the compressor turbine shaft 72 may be controlled by the fracturing unit controller 108 to rotate at a rotational speed ranging from about 40% to about 80% of rated speed (e.g., about 60% of rated speed). In some embodiments, the fracturing unit controller 108 may be configured to determine whether the compressor turbine shaft 66 is rotating at a speed consistent with the GTE 16 being idle mode. In some embodiments, the fracturing unit controller 12 may be configured to continue to operate the GTE at idle, while maintaining the power turbine 70 and the power turbine output shaft 72 in a static, non-rotating condition.

As explained above, some embodiments of the hydraulic fracturing unit assembly 12 may include a brake assembly 118 associated with the hydraulic fracturing unit assembly 12 (e.g., with the GTE 16) and configured to at least partially control the rotational speed of the power turbine 70 and power turbine output shaft 72, for example, independent from the rotational speed of the compressor 62, the compressor turbine shaft 66, and the compressor turbine 68. In some embodiments, the fracturing unit controller 108 may be configured to generate one or more brake control signals causing the brake assembly 118 to prevent rotation of the power turbine 70 and power turbine output shaft 72 while the GTE 16 is idling with the compressor 62, the compressor turbine shaft 66, and the compressor turbine 68 rotating at idle speed.

In some embodiments, as shown in FIG. 3, the fracturing unit controller 108 may be configured to receive one or more drive signals 130 indicative of supplying power to the hydraulic fracturing pump 14, and generate, based at least in part on the one or more drive signals 130, one or more pump actuation signals to cause the power turbine 70 and power turbine output shaft 72 to rotate and drive the transmission input shaft 74 of the transmission 18, such that the hydraulic fracturing pump 14 pumps fracturing fluid into the wellhead 48. For example, the one or more one or more drive signals 130 may be configured to cause the brake assembly 118 connected to the hydraulic fracturing unit assembly 12 to release and permit the power turbine 70 and power turbine output shaft 72 to rotate and drive the transmission input shaft 74. In some embodiments, the fracturing unit controller 108 may be configured to control, based at least in part on the target signal(s) 110 and/or the fluid flow signal(s)

received from the fluid sensor(s) 112, the rotational speed of the pump drive shaft 78. In some embodiments, the fracturing unit controller 108 may be configured to at least partially control operation of the hydraulic fracturing unit assembly 12, including operation of the GTE 16, the transmission 18, and/or the hydraulic fracturing pump 14, for example, by generating control signals controlling the output of the GTE 16, the ratio of the transmission 18, and/or the output of the hydraulic fracturing pump 14. For example, the fracturing unit controller 108 may be configured to control the combustor section 64, the variable geometry assembly 114, the brake assembly 118, and/or the transmission actuators 116, for example, as explained herein.

Figure 4:
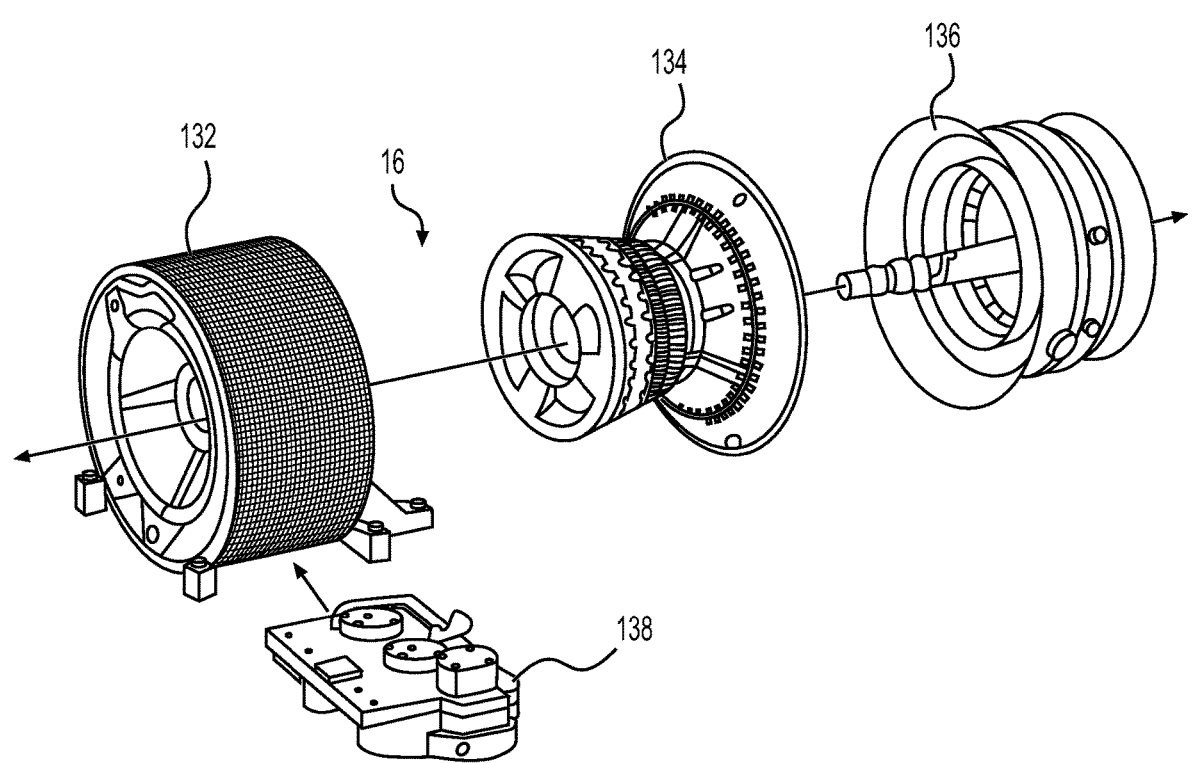
FIG. 4 is a schematic exploded perspective view of components of an example gas turbine engine according to embodiments of the disclosure.

FIG. 4 is a schematic exploded perspective view of an example of components of an example GTE 16 according to embodiments of the disclosure according to embodiments of the disclosure. As shown in FIG. 4, some embodiments of the GTE 16 may have an at least semi-modular construction, which may facilitate relative ease of assembly, disassembly, service, repair, and/or inspection of components of the GTE 16. For example, in embodiments in which the GTE 16 is a dual-shaft GTE, for example, as shown in FIGS. 1, 2, and 3, an inlet housing 132 for receiving the intake duct 102 (see FIG. 2), a gas generation assembly 134, and combustor turbine 136, as well as other components, may be configured to be assembled and/or disassembled in modules. As shown in FIG. 4, some embodiments of the GTE 16 may also include an accessory transmission 138, which provides a power take-off facilitating operation of other components associated with the hydraulic fracturing unit assembly 12.

Figure 5:
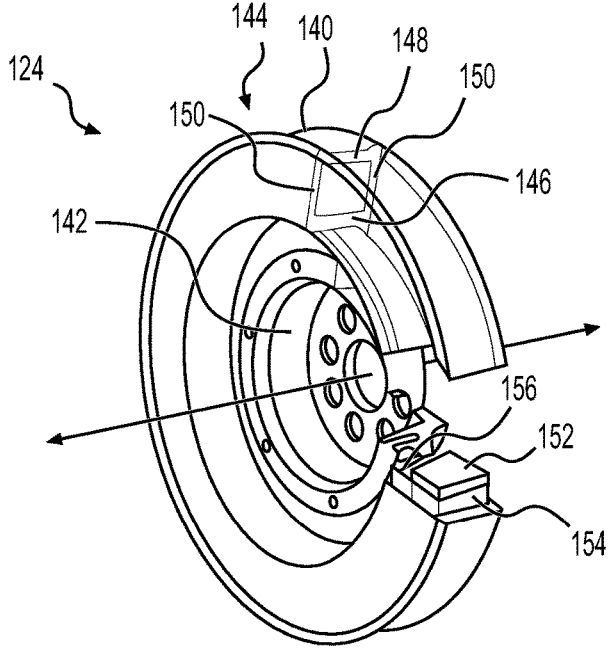
FIG. 5 is a schematic perspective cutaway view of an example torsional vibration damper according to embodiments of the disclosure.

FIG. 5 is a schematic perspective cutaway view of an example vibration damping assembly 124 including a torsional vibration damper 140 according to embodiments of the disclosure. As shown in FIG. 5, some embodiments of the torsional vibration damper 140 may include a hub 142 configured to be coupled to the pump drive shaft 78 (see, e.g. FIG. 3), the transmission output shaft 76, the transmission input shaft 74, and/or the power turbine output shaft 72. As shown in FIG. 5, the hub 142 may extend radially outward to a housing 144 including an annular inner ring 146, an annular outer ring 148, and opposing side covers 150. A cavity may be at least partially defined by the annular inner ring 146, the annular outer ring 148, and the opposing side covers 150, and the cavity may receive therein an inertia ring 152 at least partially covered by a silicone cover 154. In some embodiments a slide bearing 156 may be included at a radially inner edge of the inertia ring 152.

As discussed above with respect to FIG. 3, the torsional vibration damper 140 may be configured to prevent torsional resonance within the powertrain 106 (see FIG. 3) that may lead to a reduced service life or damage (e.g., due to fatigue) of components of the GTE 16, the power turbine output shaft 72, the transmission input shaft 74, the transmission 18, the transmission output shaft 76, the pump drive shaft 78, and/or the hydraulic fracturing pump 14. In some embodiments, the torsional vibration damper(s) 140 may be configured to dampen relatively high frequency and relatively low amplitude torsional vibrations transmitted to the hydraulic fracturing unit assembly 12 caused by forced excitations from operation of the components (e.g., the synchronous machinery).

In some embodiments, during operation, the fracturing unit controller 108 may be configured to control the output of the hydraulic fracturing pump 14, for example, by controlling the output (the rotational speed and/or torque) of the GTE 16 and/or the input-to-output ratio of the transmission 18 (e.g., in transmissions having a changeable input-tooutput ratio). For example, the fracturing unit controller 108 may be configured to control the rotational speed of the GTE 16 by controlling a fuel feed system associated with the combustor section 64 to increase or decrease the flow rate of fuel supplied to the combustor section 64. In some embodiments, the fracturing unit controller 108 may be configured to control the rotational speed of the GTE 16 (e.g., the power turbine 70 and the power turbine output shaft 72) by controlling the variable geometry assembly 114, for example, to change the degree to which blades or vanes and/or other structures of the variable geometry assembly 114 obstruct or allow the flow of air through the GTE 16 (e.g., through the compressor 62 and/or the compressor turbine 68).

In some embodiments, as the load on the hydraulic fracturing pump 14 increases, for example, due to an increase in resistance to the flow of fracturing fluid into the wellhead 48 and into the formation of the well, the rotational speed of the pump drive shaft 78, the transmission output shaft 76, the transmission input shaft 74, the power turbine output shaft 72, and the fluid pressure and/or the flow rate of the fracturing fluid may decrease. In some such instances, the fracturing unit controller 108 may be configured to increase the flow rate of fuel supplied by the fuel feed system to the combustor section 64 of the GTE 16, for example, based at least in part on a difference between the target pressure and/or the target flow rate and the actual pressure and/or the actual flow rate, respectively. The rotational speed of the pump drive shaft 78 may be selectively controlled so that the actual pressure and/or flow rate of the fracturing fluid substantially stays within a range of the target pressure and/or target flow rate of the fracturing fluid.

In contrast, if the load on the hydraulic fracturing pump 14 decreases, for example, due to a decrease in the resistance to the flow of fracturing fluid into the wellhead 48 and into the formation of the well, the rotational speed of the pump drive shaft 78, the transmission output shaft 76, the transmission input shaft 74, the power turbine output shaft 72, and the fluid pressure and/or the flow rate of the fracturing fluid may increase. In some such instances, the fracturing unit controller 108 may be configured to decrease the flow rate of fuel supplied by the fuel feed system to the combustor section 64 of the GTE 16, for example, based at least in part on a difference between the target pressure and/or the target flow rate and the actual pressure and/or the actual flow rate, respectively. The rotational speed of the pump drive shaft 78 may be selectively controlled, so that the actual pressure and/or flow rate of the fracturing fluid substantially stays within a range of the target pressure and/or target flow rate of the fracturing fluid.

In some embodiments, as the load on the hydraulic fracturing pump 14 changes and causes the output of the hydraulic fracturing pump 14 to begin to change, the fracturing unit controller 108 may be configured to adjust the variable geometry assembly 114 based at least in part on a difference between the target pressure and/or the target flow rate and the actual pressure and/or the actual flow rate, respectively. This may substantially offset or mitigate changing loads on the hydraulic fracturing pump 14.

In some embodiments, the fracturing unit controller 108 may be configured to determine (or may be provided with) a target rotational speed for the hydraulic fracturing pump 14 that generally corresponds to the target pressure and/or the target flow rate. In some such embodiments, the fracturing unit controller 108 may be configured control the output (e.g., the rotational speed and/or the torque) of the GTE 16 and/or the input-to-output ratio of the transmission 18, for example, as described herein, so that the rotational speed of the pump drive shaft 78 and the hydraulic fracturing pump 14 is substantially maintained within a range of the target rotational speed.

In some embodiments, as the load increases on the hydraulic fracturing pump 14 and causes the rotational speed of the pump drive shaft 78, the power turbine output shaft 72, power turbine 70, and the resulting output pressure and/or flow rate provided by the hydraulic fracturing pump 14 may begin to drop, the fracturing unit controller 108 may be configured to raise the flow rate of the fuel supplied by the fuel feed system to the combustor section 64 of the GTE 16. For example, the fracturing unit controller 108 may raise the fuel flow rate based at least in part on a difference between a target rotational speed of the compressor 62 and/or the compressor turbine shaft 66, which is suitable for substantially maintaining a target rotational speed for the pump drive shaft 78 of the hydraulic fracturing pump 14 for the applied load, and an actual rotational speed of the pump drive shaft 78, which may be determined based at least in part on speed signals generated by one of more of the speed sensor(s) 120. For example, the actual rotational speed of the pump drive shaft 78 may be substantially maintained within a range of the target speed of the pump drive shaft 78. In contrast, if the load on the hydraulic fracturing pump 14 decreases, the fracturing unit controller 108 may be configured to reduce the flow rate of the fuel suppled to the combustor section 64 based at least in part on the difference between the target rotational speed of the pump drive shaft 78 and the actual rotational speed of the pump drive shaft 78.

In some embodiments, the fracturing unit controller 108 may be configured to control the rotational speed of the pump drive shaft 78 by monitoring the torque applied to the power turbine shaft 72, the transmission input shaft 74, the transmission output shaft 76, and/or pump drive shaft 78, for example, based on torque signals received from the one or more torque sensors 122. For example, the fracturing unit controller 108 may be configured to determine (and/or receive) a target torque, for example, which may be based at least in part on a value of the target pressure and/or the target flow rate of the hydraulic fracturing pump 14, and/or which may be input by an operator via an input device such as a user interface. The fracturing unit controller 108 may be configured to adjust the flow rate of the fuel supplied by the fuel feed system to the combustor section 64 based, for example, on actual torque applied to the power turbine shaft 72, the transmission input shaft 74, the transmission output shaft 76, and/or pump drive shaft 78, for example, based on torque signals received from the one or more torque sensors 122. If the fracturing unit controller 108 determines that a difference exists between the actual torque value and the target torque, the fracturing unit controller 108 may be configured to selectively cause a change the rotational speed of the power turbine shaft 72, the transmission input shaft 74, the transmission output shaft 76, and/or the pump drive shaft 78, such that the actual torque is substantially maintained within a range of the target torque, for example, as described herein, so that the that target pressure and/or target flow rate is substantially maintained.

Figure 6A:
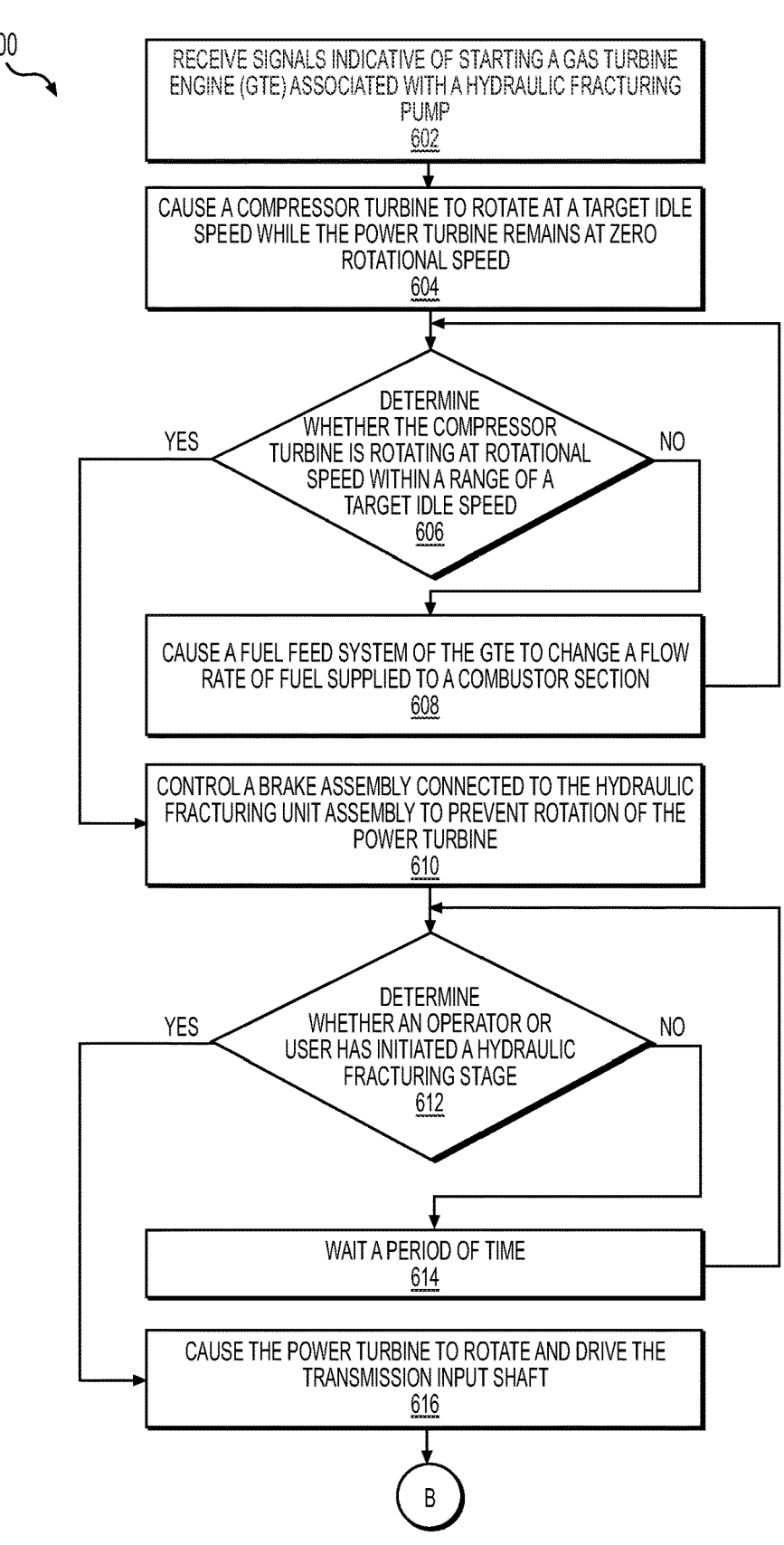
FIG. 6A is a block diagram of an example method for pumping fracturing fluid into a wellhead according to embodiments of the disclosure.

FIGS. 6A, 6B, and 6C are block diagrams of an example method 600 for pumping fracturing fluid into a wellhead according to embodiments of the disclosure, illustrated as a collection of blocks in a logical flow graph, which represent a sequence of operations. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described blocks can be combined in any order and/or in parallel to implement the methods.

FIGS. 6A, 6B, and 6C depict a flow diagram of an embodiment of a method 600 for pumping fracturing fluid in to a wellhead, according to embodiments of the disclosure. For example, the example method 600 may be configured to initiate a process for pumping fracturing fluid into a wellhead, which may control operation of one or more hydraulic fracturing unit assemblies 12, for example, as previously described herein.

The example method 600, at 602, may include receiving one or more starter signals indicative of starting a gas turbine engine associated with a hydraulic fracturing pump. For example, one or more starter signals indicative of an operator or user's desire to start the gas turbine engine may be communicated to a fracturing unit controller, for example, via an operator or user using an input device, such as a user interface, for example, as described herein At 604, the example method may include causing, based at least in part on the one or more starter signals, a compressor turbine of the gas turbine engine to rotate at a target idle speed while the power turbine remains at zero rotational speed (e.g., at a static, non-rotational condition). For example, the fracturing unit controller may be configured to cause a starter assembly, which may include a hydraulic starter, to cause rotation of the compressor turbine, for example, by mechanically coupling to the compressor turbine shaft and rotating the compressor turbine shaft while sequencing a fuel feed system and igniters of the combustor section, for example, as described herein.

At 606, the example process 600 may include determining whether the compressor turbine is rotating at a rotational speed within a range of a target idle speed, which may range from about 40% to about 80% (e.g., about 60%) of the rated speed of the compressor turbine shaft, for example, when the gas turbine engine is operating to drive the hydraulic fracturing pump to pump fracturing fluid into the wellhead at a target pressure and/or target flow rate.

If at 606, it is determined that the compressor turbine shaft is not rotating at a rotational speed within the range of the target idle speed, at 608, the example method 600 may include causing the fuel feed system of the gas turbine engine to change the flow rate of fuel supplied to the combustor section to change the rotational speed of the compressor turbine shaft. In some examples, the fracturing unit controller may communicate one or more fuel signals to the fuel feed system indicative of the flow rate of fuel to be supplied to the combustor section and to cause the rotational speed of the compressor turbine shaft to change toward the target idle speed.

Thereafter, the example method 600, may return to 606 to determine whether the compressor turbine is rotating at rotational speed within a range of a target idle speed and repeat the process until it has been determined that the compressor turbine is rotating at rotational speed within a range of a target idle speed, for example, by the fracturing unit controller.

If at 606, it is determined that the compressor turbine shaft is rotating at a rotational speed within the range of the target idle speed, at 610, the example method 600 may include controlling a brake assembly connected to the hydraulic fracturing unit assembly to prevent rotation of the power turbine. For example, the gas turbine engine may include a brake assembly positioned and configured to at least partially control the rotational speed of the power turbine output shaft, for example, independent from the rotational speed of the compressor turbine shaft, which may be rotating according to an idle speed setting, for example, as described herein. The fracturing unit controller may be configured to generate one or more brake control signals configured to at least partially control operation of the brake assembly, and the one or more brake control signals may cause the brake assembly to prevent the power turbine shaft from rotating while the compressor turbine shaft is rotating at idle speed.

The example method 600, at 612, may include determining whether an operator or user of the hydraulic fracturing system has initiated a hydraulic fracturing stage. For example, the fracturing unit controller may determine whether it has received one or more drive signals indicative of commencement of the pumping of fracturing fluid into the wellhead using the hydraulic fracturing unit assembly.

If, at 612, it is determined that an operator or user of the hydraulic fracturing system has not initiated a hydraulic fracturing stage, at 614, the example method 600 may include waiting a period of time and returning to 612 to determine whether an operator or user of the hydraulic fracturing system has initiated a hydraulic fracturing stage.

If, at 612, it is determined that an operator or user of the hydraulic fracturing system has initiated a hydraulic fracturing stage, at 616, the example method 600 may include causing, based at least in part on the one or more drive signals, the power turbine to rotate and drive the transmission input shaft. For example, the fracturing unit controller, upon receipt of the one or more drive signals, may communicate one or more brake release signals to the brake assembly causing the brake assembly to release the power turbine output shaft, permitting the power turbine to rotate, thereby driving the transmission input shaft, the transmission output shaft, and the pump drive shaft, such that the hydraulic fracturing pump begins to pump fracturing fluid into the wellhead.

The example method 600, at 618 (see FIG. 6B), may include causing the power output of the gas turbine engine to increase, thereby causing the pressure and/or flow rate of the fracturing fluid being pumped into the wellhead to increase. For example, the fracturing unit controller may communicate one or more fuel signals to the fuel feed system of the gas turbine engine to increase the flow rate of fuel supplied to the combustor section to increase the rotational speed of the compressor turbine shaft, for example, as described herein.

At 620, the example method 600 may include determining whether the actual pressure and/or the actual flow rate of the fracturing fluid has increased to a level within a range of a target pressure and/or target flow rate. For example, the fracturing unit controller may be configured to receive one or more fluid signals from one or more fluid sensors positioned and configured to generate signals indicative of the pressure and/or flow rate of the fracturing fluid flowing into the wellhead. Based at least in part on the one or more fluid signals, the fracturing unit controller may determine whether the actual pressure and/or the actual flow rate of the fracturing fluid has increased to a level within the range of the target pressure and/or target flow rate.

If, at 620, it is determined that the actual pressure and/or the actual flow rate of the fracturing fluid has not increased to the level within the range of the target pressure and/or target flow rate, the example method 600, at 622, may include waiting a period of time and returning to 618 to increase the fuel flow rate to the combustor section of the gas turbine engine. For example, the fracturing unit controller may communicate one or more fuel signals to the fuel feed system of the gas turbine engine to increase the flow rate of fuel supplied to the combustor section to increase the rotational speed of the compressor turbine shaft, for example, as described herein.

If, at 620, it is determined that the actual pressure and/or the actual flow rate of the fracturing fluid has increased to the level within the range of the target pressure and/or target flow rate, the example method 600, at 624, may include determining whether the actual pressure and/or the actual flow rate of the fracturing fluid is within the range of the target pressure and/or target flow rate.

If, at 624, it is determined that the actual pressure and/or the actual flow rate of the fracturing fluid is not within the range of the target pressure and/or target flow rate, the example method 600, at 626, may include determining whether the actual pressure and/or the actual flow rate of the fracturing fluid is greater than or less than the range of the target pressure and/or target flow rate. For example, the fracturing unit controller may be configured to receive the one or more fluid signals from one or more fluid sensors positioned and configured to generate signals indicative of the pressure and/or flow rate of the fracturing fluid flowing into the wellhead. Based at least in part on the one or more fluid signals, the fracturing unit controller may determine whether the actual pressure and/or the actual flow rate of the fracturing fluid is greater than or less than the range of the target pressure and/or target flow rate.

If, at 626, it is determined that the actual pressure and/or the actual flow rate of the fracturing fluid is greater than the range of the target pressure and/or target flow rate, at 628, the example method 600 may include decreasing the fuel flow rate to the combustor section of the gas turbine engine to decrease the rotational speed of the pump drive shaft and the output of the hydraulic fracturing pump. For example, the fracturing unit controller may communicate one or more fuel signals to the fuel feed system of the gas turbine engine to decrease the flow rate of fuel supplied to the combustor section to decrease the rotational speed of the compressor turbine shaft, for example, as described herein. In some embodiments, the fracturing unit controller may be configured to alternatively, or additionally, control operation of one or more variable geometry assemblies associated with the power turbine, for example, by communicating variable geometry signals to the variable geometry assemblies to cause them to reduce the amount of air supplied to the combustor section and/or power turbine to reduce the rotational speed and/or torque output of the gas turbine engine (e.g., at the power turbine output shaft). In some embodiments, the fracturing unit controller may be configured to alternatively, or additionally, control operation of brake assembly, for example, by communicating brake signals to the brake assembly causing the brake assembly to at least partially slow the rotational speed of power turbine output shaft to reduce the rotational speed and/or torque output of the gas turbine engine (e.g., at the power turbine output shaft) and the output of the hydraulic fracturing pump. Thereafter, the example method may return to 624 to determine whether the actual pressure and/or the actual flow rate of the fracturing fluid is within the range of the target pressure and/or target flow rate.

If, at 626, it is determined that the actual pressure and/or the actual flow rate of the fracturing fluid is less than the range of the target pressure and/or target flow rate, at 630

(FIG. 6C), the example method 600 may include increasing the fuel flow rate to the combustor section of the gas turbine engine to increase the rotational speed of the pump drive shaft and the output of the hydraulic fracturing pump. For example, the fracturing unit controller may communicate one or more fuel signals to the fuel feed system of the gas turbine engine to increase the flow rate of fuel supplied to the combustor section to decrease the rotational speed of the compressor turbine shaft, for example, as described herein.

At 632, the example method 600 may include returning to 624 (FIG. 6B) to determine whether the actual pressure and/or the actual flow rate of the fracturing fluid is within the range of the target pressure and/or target flow rate.

If, at 624, it is determined that the actual pressure and/or the actual flow rate of the fracturing fluid is within the range of the target pressure and/or target flow rate, at 634, the example method 600 may include determining whether the fracturing stage has been completed. This may be determined, for example, by receipt of one or more signals indicative of the completion of the fracturing stage by the fracturing unit controller, for example, as will be understood by those skilled in the art.

If, at 634, it has been determined that the fracturing stage has not been completed, the example method 600, at 636, may include returning to 624 to continue monitoring whether the actual pressure and/or the actual flow rate of the fracturing fluid is within the range of the target pressure and/or target flow rate.

If, at 634, it has been determined that the fracturing stage has been completed, the example method 600, at 638 may include commencing a controlled shut down of the hydraulic fracturing unit assembly, for example, as will be understood by those skilled in the art.

It should be appreciated that subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Figure 7:
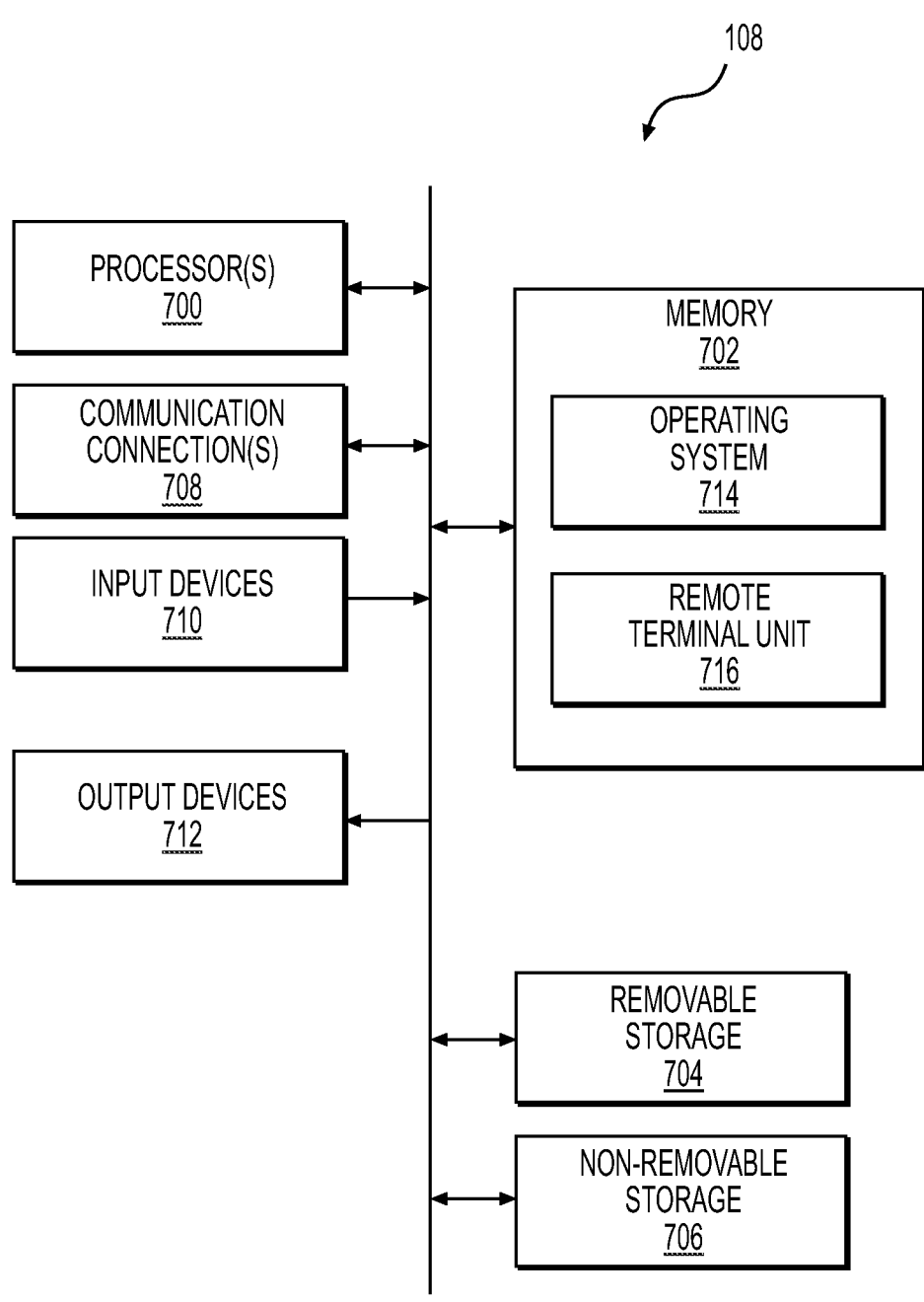
FIG. 7 is a schematic diagram of an example fracturing unit controller configured to operate a hydraulic fracturing unit assembly according to embodiments of the disclosure.

FIG. 7 illustrates an example fracturing unit controller 108 configured for implementing certain systems and methods for pumping fracturing fluid into a wellhead according to embodiments of the disclosure, for example, as described herein. The fracturing unit controller 108 may include one or more processor(s) 700 configured to execute certain operational aspects associated with implementing certain systems and methods described herein. The processor(s) 700 may communicate with a memory 702. The processor(s) 700 may be implemented and operated using appropriate hardware, software, firmware, or combinations thereof. Software or firmware implementations may include computer-executable or machine-executable instructions written in any suitable programming language to perform the various functions described. In some examples, instructions associated with a function block language may be stored in the memory 702 and executed by the processor(s) 700.

The memory 702 may be used to store program instructions that are loadable and executable by the processor(s) 700, as well as to store data generated during the execution of these programs. Depending on the configuration and type of the fracturing unit controller 108, the memory 702 may be volatile (such as random access memory (RAM)) and/or non-volatile (such as read-only memory (ROM), flash memory, etc.). In some examples, the memory devices may include additional removable storage 704 and/or non-removable storage 706 including, but not limited to, magnetic storage, optical disks, and/or tape storage. The disk drives and their associated computer-readable media may provide non-volatile storage of computer-readable instructions, data structures, program modules, and other data for the devices. In some implementations, the memory 702 may include multiple different types of memory, such as static random access memory (SRAM), dynamic random access memory (DRAM), or ROM.

The memory 702, the removable storage 704, and the non-removable storage 706 are all examples of computer-readable storage media. For example, computer-readable storage media may include volatile and non-volatile, removable and non-removable media implemented in any method or technology for storage of information such as computer-readable instructions, data structures, program modules or other data. Additional types of computer storage media that may be present may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which may be used to store the desired information and which may be accessed by the devices. Combinations of any of the above should also be included within the scope of computer-readable media.

The fracturing unit controller 108 may also include one or more communication connection(s) 708 that may facilitate a control device (not shown) to communicate with devices or equipment capable of communicating with the fracturing unit controller 108. The fracturing unit controller 108 may also include a computer system (not shown). Connections may also be established via various data communication channels or ports, such as USB or COM ports to receive cables connecting the fracturing unit controller 108 to various other devices on a network. In some examples, the fracturing unit controller 108 may include Ethernet drivers that enable the fracturing unit controller 108 to communicate with other devices on the network. According to various examples, communication connections 708 may be established via a wired and/or wireless connection on the network.

The fracturing unit controller 108 may also include one or more input devices 710, such as a keyboard, mouse, pen, voice input device, gesture input device, and/or touch input device. The one or more input device(s) 710 may correspond to the one or more input devices described herein. It may further include one or more output devices 712, such as a display, printer, and/or speakers. In some examples, computer-readable communication media may include computer-readable instructions, program modules, or other data transmitted within a data signal, such as a carrier wave or other transmission. As used herein, however, computer-readable storage media may not include computer-readable communication media.

Turning to the contents of the memory 702, the memory 702 may include, but is not limited to, an operating system (OS) 714 and one or more application programs or services for implementing the features and embodiments disclosed herein. Such applications or services may include remote terminal units for executing certain systems and methods for controlling operation of the hydraulic fracturing unit assemblies 12 (e.g., semi- or full-autonomously controlling operation of the hydraulic fracturing unit assemblies 12), for example, upon receipt of one or more control signals generated by the fracturing unit controller 108. In some embodiments, each of the hydraulic fracturing unit assemblies 12 may include a remote terminal unit 716. The remote terminal units 716 may reside in the memory 702 or may be independent of the fracturing unit controller 108. In some examples, the remote terminal unit 716 may be implemented by software that may be provided in configurable control block language and may be stored in non-volatile memory. When executed by the processor(s) 700, the remote terminal unit 716 may implement the various functionalities and features associated with the fracturing unit controller 108 described herein.

As desired, embodiments of the disclosure may include a fracturing unit controller 108 with more or fewer components than are illustrated in FIG. 7. Additionally, certain components of the example fracturing unit controller 108 shown in FIG. 7 may be combined in various embodiments of the disclosure. The fracturing unit controller 108 of FIG. 7 is provided by way of example only.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a non-transitory computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide task, acts, actions, or operations for implementing the functions specified in the block or blocks.

One or more components of the systems and one or more elements of the methods described herein may be implemented through an application program running on an operating system of a computer. They may also be practiced with other computer system configurations, including hand-held devices, multiprocessor systems, microprocessor-based or programmable consumer electronics, mini-computers, mainframe computers, and the like.

Application programs that are components of the systems and methods described herein may include routines, programs, components, data structures, etc. that may implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks can be performed by remote processing devices linked through a communications network.

This is a continuation of U.S. Non-Provisional application Ser. No. 18/064,699, filed Dec. 12, 2022, titled "SYSTEMS AND METHODS TO OPERATE A DUAL-SHAFT GAS TURBINE ENGINE FOR HYDRAULIC FRACTURING," which is a continuation of U.S. Non-Provisional application Ser. No. 17/684,613, filed Mar. 2, 2022, titled "SYSTEMS AND METHODS TO OPERATE A DUAL-SHAFT GAS TURBINE ENGINE FOR HYDRAULIC FRACTURING," now U.S. Pat. No. 11,639,655, issued May 2, 2022, which is a continuation of U.S. Non-Provisional application Ser. No. 17/396,914, filed Aug. 9, 2021, titled "SYSTEMS AND METHODS TO OPERATE A DUAL-SHAFT GAS TURBINE ENGINE FOR HYDRAULIC FRACTURING," now U.S. Pat. No. 11,572,774, issued Feb. 7, 2023, which is a continuation of U.S. Non-Provisional application Ser. No. 17/173,475, filed Feb. 11, 2021, titled "SYSTEMS AND METHODS TO OPERATE A DUAL-SHAFT GAS TURBINE ENGINE FOR HYDRAULIC FRACTURING," now U.S. Pat. No. 11,125,066, issued Sep. 21, 2021, which claims priority to and the benefit of, under 35 U.S.C. § 119(e), U.S. Provisional Application No. 62/705,334, filed Jun. 22, 2020, titled "METHOD AND SYSTEM OF OPERATING A DUAL SHAFT GAS TURBINE IN A DIRECT DRIVE TURBINE FRACKING UNIT," the disclosures of which are incorporated herein by reference in their entireties.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

What is claimed is:

1. A hydraulic fracturing unit assembly to pump a fracturing fluid into a wellhead, the hydraulic fracturing unit assembly comprising:

a gas turbine engine including:

a compressor, a combustor section positioned to receive compressed air from the compressor, a compressor turbine connected to the compressor such that the compressor turbine rotates with the compressor at a first rotational speed, and a power turbine positioned such that heated combustion gas output from the combustor section causes the power turbine to rotate at a second rotational speed;

a transmission including:
an input shaft connected to the power turbine such that the input shaft rotates at the second rotational speed, and
an output shaft positioned to be driven by the input shaft at a third rotational speed;
a hydraulic fracturing pump positioned to pump fracturing fluid into the wellhead, the hydraulic fracturing pump connected to the output shaft;
a brake assembly configured to at least partially control the second rotational speed of the power turbine independent from the first rotational speed of the compressor turbine; and
a fracturing unit controller configured to:
control one or more of the first rotational speed, the second rotational speed, or the third rotational speed,
generate one or more idle signals to cause the compressor turbine to rotate within a range of a target idle speed, and
generate one or more brake control signals based on a determination that the compressor turbine is rotating within the range of the target idle speed, the brake control signals configured to at least partially control operation of the brake assembly in response to the determination.

2. The hydraulic fracturing unit assembly of claim 1, wherein the fracturing unit controller is configured to control one or more of the first rotational speed, the second rotational speed, or the third rotational speed based at least in part on one or more of a target pressure or a target flow rate associated with fracturing fluid pumped into the wellhead.

3. The hydraulic fracturing unit assembly of claim 1, wherein the one or more brake control signals are configured to cause the brake assembly to prevent rotation of the power turbine after the compressor turbine approaches the target idle speed.

4. The hydraulic fracturing unit assembly of claim 1, further comprising one or more variable geometry assemblies configured to at least partially control the second rotational speed of the power turbine, wherein the fracturing unit controller is configured to generate one or more geometry signals configured to control operation of the one or more variable geometry assemblies to at least partially control the second rotational speed.

5. The hydraulic fracturing unit assembly of claim 1, further comprising one or more transmission actuators configured to control a ratio of the second rotational speed to the third rotational speed, wherein the fracturing unit controller is configured to generate one or more ratio signals configured to control the ratio of the second rotational speed to the third rotational speed.

6. The hydraulic fracturing unit assembly of claim 1, further comprising one or more speed sensors configured to generate one or more rotational signals indicative of one or more of the first rotational speed, the second rotational speed, or the third rotational speed, wherein the fracturing unit controller is configured to:
receive the one or more rotational signals, and at least partially control, based at least in part on the one or more rotational signals, the third rotational speed.

7. The hydraulic fracturing unit assembly of claim 1, further comprising one or more fluid sensors associated with a discharge conduit of the hydraulic fracturing unit assembly and configured to generate one or more fluid flow signals indicative of one or more of an actual pressure or an actual flow rate associated with the fracturing fluid pumped into the wellhead, wherein the fracturing unit controller is configured to control the one or more of the first rotational speed, the second rotational speed, or the third rotational speed based at least in part the one or more fluid flow signals.

8. The hydraulic fracturing unit assembly of claim 1, further comprising one or more torque sensors associated with the compressor turbine, the power turbine, the input shaft, the output shaft, or the hydraulic fracturing pump, the one or more torque sensors being configured to generate one or more torque signals indicative of torque at a respective location of the one or more torque sensors, wherein the fracturing unit controller is configured to control, based at least in part on one or more of the one or more torque signals, the one or more of the first rotational speed, the second rotational speed, or the third rotational speed.

9. The hydraulic fracturing unit assembly of claim 1, wherein the fracturing unit controller is further configured to:
receive one or more drive signals indicative of supplying power to the hydraulic fracturing pump; and generate, based at least in part on the one or more drive signals, one or more pump actuation signals to cause the power turbine to rotate and drive the input shaft.

10. The hydraulic fracturing unit assembly of claim 1, further comprising one or more speed sensors configured to generate one or more rotational signals indicative of one or more of the first rotational speed, the second rotational speed, or the third rotational speed, wherein the fracturing unit controller is configured to:
receive the one or more rotational signals and cause the brake assembly to prevent rotation of the power turbine in response to the one or more rotational signals.

11. The hydraulic fracturing unit assembly of claim 1, further comprising a vibration damping assembly positioned to damp vibration associated with operation of the hydraulic fracturing pump, and wherein the vibration damping assembly comprises:
a hub connected to either the output shaft or a pump shaft of the hydraulic fracturing pump;
and a housing connected to the hub such that the housing rotates with the hub, the housing including:
an annular inner ring, an annular outer ring, a pair of opposing side covers extending between the annular inner ring and the annular outer ring, and
an annular cavity.

12. A method for pumping a fracturing fluid into a wellhead, the method comprising:
controlling, via a fracturing unit controller, based at least in part on one or more of a target pressure, a target flow rate, an actual pressure, or an actual flow rate associated with the fracturing fluid pumped into the wellhead by a hydraulic fracturing pump, one or more of:
a first rotational speed associated with a compressor and a compressor turbine of a gas turbine engine, the compressor positioned to provide compressed air to a combustor section of the gas turbine engine,
a second rotational speed associated with a power turbine of the gas turbine engine, the power turbine positioned such that heated combustion gas output from the combustor section causes the power turbine to rotate at the second rotational speed, or
a third rotational speed associated with an output shaft of a transmission of the gas turbine engine, the output shaft connected to a hydraulic fracturing pump positioned to pump the fracturing fluid into the wellhead, and the transmission having an input shaft connected to the power turbine such that the input shaft rotates at the second rotational speed to drive the hydraulic fracturing pump;

generating, via one or more speed sensors, one or more speed signals indicative of one or more of the first rotational speed, the second rotational speed, or the third rotational speed;

generating, based on a determination that the compressor turbine is rotating within the range of the target idle speed, one or more brake control signals, the brake control signals configured to at least partially control operation of a brake assembly of the gas turbine engine in response to the determination, the brake assembly configured to at least partially control the second rotational speed of the power turbine independent from the first rotational speed of the compressor turbine.

13. The method of claim 12, further comprising controlling, based at least in part on one or more of the target pressure, the target flow rate, the actual pressure, or the actual flow rate, operation of one or more variable geometry assemblies associated with the power turbine so as to control, at least partially, the second rotational speed of the power turbine.

14. The method of claim 12, further comprising controlling, based at least in part on one or more of the target pressure, the target flow rate, the actual pressure, or the actual flow rate, operation of one or more transmission actuators associated with the transmission and configured to control a ratio of the second rotational speed to the third rotational speed.

15. The method of claim 12, further comprising:

receiving, via the fracturing unit controller, one or more drive signals indicative of supplying power to the hydraulic fracturing pump; and causing, based at least in part on the one or more drive signals, the power turbine to rotate and drive the input shaft of the transmission.

16. The method of claim 12, further comprising causing the brake assembly to release and permit the power turbine to rotate and drive the input shaft.

17. The method of claim 12, further comprising:

receiving, via the fracturing unit controller, one or more starter signals indicative of starting the gas turbine engine; and causing, based at least in part on the one or more starter signals, the compressor turbine to rotate at a target idle speed while the power turbine remains at zero rotational speed.

18. A hydraulic fracturing unit assembly comprising:

a chassis;

a gas turbine engine connected to the chassis, the gas turbine engine including:

a compressor positioned to compress air, a starter assembly connected to the compressor, a compressor turbine connected to the compressor such that the compressor turbine and the compressor rotate a first rotational speed, and a power turbine positioned such that heated combustion gas causes the power turbine to rotate at a second rotational speed;

a brake assembly to prevent rotation of the power turbine independent from rotation of the compressor turbine;

a transmission including:

an input shaft connected to the power turbine such that the input shaft rotates at the second rotational speed, and an output shaft positioned to be driven by the input shaft at a third rotational speed;

a hydraulic fracturing pump connected to the chassis and positioned to pump fracturing fluid into a wellhead, the hydraulic fracturing pump connected to the output shaft such that the output shaft drives the hydraulic fracturing pump at the third rotational speed; and a fracturing unit controller configured to:

generate one or more idle signals to cause the compressor turbine to rotate within a range of a target idle speed, and generate one or more brake control signals based on a determination that the compressor turbine is rotating within the range of the target idle speed, the brake control signals configured to at least partially control operation of the brake assembly in response to the determination.

19. The hydraulic fracturing unit assembly of claim 18, further comprising a vibration damping assembly positioned to damp vibration associated with operation of the hydraulic fracturing pump, and wherein the vibration damping assembly comprises:

a hub connected to either the output shaft or a pump shaft of the hydraulic fracturing pump; and a housing connected to the hub such that the housing rotates with the hub, the housing including:

an annular inner ring, an annular outer ring, a pair of opposing side covers extending between the annular inner ring and the annular outer ring, and an annular cavity.

20. The hydraulic fracturing unit assembly of claim 18, further comprising one or more torque sensors associated with the compressor turbine, the power turbine, the input shaft, the output shaft, or the hydraulic fracturing pump, the one or more torque sensors being configured to generate one or more torque signals indicative of torque at a respective location of the one or more torque sensors, wherein the fracturing unit controller is configured to control, based at least in part on one or more of the one or more torque signals, one or more of the first rotational speed, the second rotational speed, or the third rotational speed.

* * * * *